US006668211B1

(12) United States Patent
Fujita et al.

(10) Patent No.: US 6,668,211 B1
(45) Date of Patent: *Dec. 23, 2003

(54) ARITHMETIC PROCESSING DEVICE, OBJECT-TO-OBJECT COMMUNICATION METHOD AND ROBOT

(75) Inventors: Masahiro Fujita, Saitama (JP); Takayuki Sakamoto, Kanagawa (JP); Kotaro Sabe, Tokyo (JP); Tsuyoshi Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/623,972

(22) PCT Filed: Jan. 13, 2000

(86) PCT No.: PCT/JP00/00123

§ 371 (c)(1),
(2), (4) Date: Oct. 23, 2000

(87) PCT Pub. No.: WO00/42504

PCT Pub. Date: Jul. 20, 2000

(30) Foreign Application Priority Data

Jan. 13, 1999 (JP) ............................................. 11-006491
Jan. 13, 1999 (JP) ............................................. 11-006757
Jan. 11, 2000 (JP) ........................................ 2000-006032

(51) Int. Cl.[7] ............................................. G06F 19/00
(52) U.S. Cl. ....................... 700/245; 700/230; 700/248; 700/249; 700/250; 700/258; 700/260; 700/261; 700/262; 198/571; 198/575; 198/577; 318/568.12; 707/4; 74/490.03; 294/88
(58) Field of Search ................................. 700/230, 245, 700/248, 249, 250, 258, 260, 261, 262; 198/571, 575, 577; 318/568.12; 707/4; 74/490.03; 294/88

(56) References Cited

U.S. PATENT DOCUMENTS 6,415,222 B1 * 7/2002 Sato et al. ................... 701/208
6,446,055 B1 * 9/2002 Grand .......................... 706/10
6,505,097 B1 * 1/2003 Fujita et al. ................. 700/245

OTHER PUBLICATIONS

Liu et al., Information monitoring on the Web: A scalable solution, 2000, Internet. pp. 1–43.*

Proceedings of the 1998 IEEE International Conference on Robotics & Automation (1998–5), H. Kitano, et al. "Sony Legged Robot for RoboCup Challenge", P. 2605–2612.

IEEE Transactions on Software Engineering, vol. 23, No. 12, (1997–12), D.B. Stewart, et al., "Design of Dynamically Reconfigurable Real–Time Software Using Port–Based Objects" P 759–776.

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Glenn F. Savit

(57) ABSTRACT

An arithmetic processing device, an object-to-object communication method and a robot, such as an entertainment robot, in which software suited to a current robot configuration is set. The software is changed corresponding to the configuration based on a comparison result of information corresponding to a component detection result stored for each configuration and a component detection result associated with the current configuration. Objects are connected so that data can be exchanged based on the connection data.

23 Claims, 50 Drawing Sheets

| INPUT \ CONDITION | SLEEP | REST | WAKEUP | MOVE |
|---|---|---|---|---|
| NOTHING DETECTED IN 1 MIN. | SLEEP | SLEEP | WAKEUP | MOVE |
| RED, SIZE < 10 CONTINUED MORE THAN 10 SEC. | REST | WAKEUP | REST | MOVE |
| RED, SIZE >=10 | WAKEUP | MOVE | MOVE | MOVE |

FIG. 6

```
DRX-4Legged{
    DRX Head;
    DRX RightFrontLeg;
    DRX LeftFrontLeg;
    DRX RightRearLeg;
    DRX LeftRearLeg;
}
DRX Wheel{
    DRX Head;
    DRX RightFrontLeg;
    DRX LeftFrontLeg;
    DRX RightRearWheel;
    DRX LeftRearWheel;
}
DRX Head{
    DRX CameraLink;
}
Virtual CameraLink{
    DRX CameraLink;
    Camera;
    Coordinate:/
}
DRX RightFrontLeg{
    Coordinate:/C1/C0-Joint;
    Coordinate:/C1/C0/C0-Joint;
    Coordinate:/C1/C0/C0/C0-Joint;
    Coordinate:/C1/C0/C0/C0-TouchSensor;
}
DRX LeftFrontLeg{
    Coordinate:/C2/C0-Joint;
    Coordinate:/C2/C0/C0-Joint;
    Coordinate:/C2/C0/C0/C0-Joint;
    Coordinate:/C2/C0/C0/C0-TouchSensor;
}
DRX RightRearLeg{
    Coordinate:/C3/C0-Joint;
    Coordinate:/C3/C0/C0-Joint;
    Coordinate:/C3/C0/C0/C0-Joint;
    Coordinate:/C3/C0/C0/C0-TouchSensor;
}
DRX LeftRearLeg{
    Coordinate:/C4/C0-Joint;
    Coordinate:/C4/C0/C0-Joint;
    Coordinate:/C4/C0/C0/C0-Joint;
    Coordinate:/C4/C0/C0/C0-TouchSensor;
}
DRX RightRearWheel{
    Coordinate:/C3/C0-wheel;
}
DRX LeftRearWheel{
    Coordinate:/C4/C0-wheel;
}
```

FIG. 8

```
CPC Current Information{
    Coordinate:/C0/C0-Joint;
    Coordinate:/C0/C0/C0-Joint;
    Coordinate:/C0/C0/C0/C0-Joint;
    Coordinate:/C0/C0/C/C0/C0-Camera;
    Coordinate:/C1/C0-Joint;
    Coordinate:/C1/C0/C0-Joint;
    Coordinate:/C1/C0/C0/C0-Joint;
    Coordinate:/C1/C0/C0/C0/C0-TouchSensor;
    Coordinate:/C2/C0-Joint;
    Coordinate:/C2/C0/C0-Joint;
    Coordinate:/C2/C0/C0/C0-Joint;
    Coordinate:/C2/C0/C0/C0/C0-TouchSensor;
    Coordinate:/C3/C0-Joint;
    Coordinate:/C3/C0/C0-Joint;
    Coordinate:/C3/C0/C0/C0-Joint;
    Coordinate:/C3/C0/C0/C0/C0-TouchSensor;
    Coordinate:/C4/C0-Joint;
    Coordinate:/C4/C0/C0-Joint;
    Coordinate:/C4/C0/C0/C0-Joint;
    Coordinate:/C4/C0/C0/C0/C0-TouchSensor;
}
```

FIG. 9

FooB. Image. RightCamera. S, FooA. Image. RightCamera. O
ASSOCIATIVE MEMORY 1 
    Key:"FooA. Image. RightCamera. O"
    OUTPUT:"FooB. Image. RightCamera. S"
FIG. 20
FooB. Image. RightCamera. 1, 5. S
ASSOCIATIVE MEMORY 2 
    Key:FooB. Image. RightCamera. S
    OUTPUT:1, 5
FooA. Image. RightCamera. 2, 5. O
ASSOCIATIVE MEMORY 2 
    Key:FooA. Image. RightCamera. O
    OUTPUT:2, 5
FIG. 21

Explanation of Reference Numerals

1... ... robot, 2... ... main unit, 3... ... mobile unit, 17... ... battery

ARITHMETIC PROCESSING DEVICE, OBJECT-TO-OBJECT COMMUNICATION METHOD AND ROBOT

TECHNICAL FIELD

The present invention relates to an arithmetic processing device, object-to-object communication method and a robot, and can be applied to such as a pet-type robot. The present invention can simply set the suitable software corresponding to the current configuration by changing the software corresponding to the configuration based on the comparison result between the information corresponding to the component detection result stored in each configuration and the component detection result relating to the current configuration. Moreover, the present invention can increase the independence of object as compared with the past by connecting objects so that data can be exchanged based on the connection data.

BACKGROUND ART

Heretofore, such as in a pet-type robot, object-oriented software has been formed, and various data are processed according to the communications between objects and the robot can conduct the motion similar to those of animals, for example.

However, in this pet-type robot, it is considered that this pet type robot can become more common if the components, such as legs, could be set to the user desired configuration by exchanging these components as required.

And also in this cases, it is desirous that the software can be exchanged simply corresponding to the configuration.

DISCLOSURE OF THE INVENTION

The present invention has been done considering the above points and firstly, is proposing a robot capable of setting appropriate software simply corresponding to the present configuration.

Furthermore, in the case of exchanging components such as legs as occasion demands and setting to the user desired form, it is considered that objects would be reconstructed and the software would be changed corresponding to the configuration change in the software to control the whole operations.

However, in the conventional object-oriented software, since the software is designed on the precondition of the clear relationship between objects, objects are highly dependent each other. Thus, even though the software would be changed to correspond to comparatively free configuration change, as a result, the development of special software compatible with each configuration becomes necessary.

As a method to obviate such dependence between objects, the development of software by using the method such as using the design pattern (observer pattern) can be considered (Erich Gamma et al., Object-Oriented Design Pattern for Reusing, pp313–324). More specifically, in the method according to this design pattern, since as well as classifying the objects into subject and observer, registering the observer onto the subject, objects are connected each other based on this registration, and various information and data are transmitted to the subject from the observer.

In this case, the subject invokes the method (or update) specified successively from the observer registered and relegates the data processing to the observer. Thus, in this design pattern method, the subject when designing, highly independent designing becomes possible without coding such as outputting data to the specific object.

However, even in this method, the observer is required to register onto the specific subject and the observer should be described in advance. Accordingly, the method according to this design pattern is practically insufficient in securing the independence of each object.

On the other hand, the method to increase the independence of objects by forming the visual tool in utilizing this method has been proposed (JIP Object Technical Research Association ed., Introduction to Visual Age C++ pp182–185). However, according to this method, the compilation becomes necessary in order to change the software construction by automatically forming the source code after specifying the connection of objects by the visual tool.

Furthermore, the method to communicate between objects by using proxy as proposed in the Japan Patent Laid-open No. 10-28398 bulletin can be considered. However, this method does not enhance the independence of objects.

Furthermore, the method to utilize the naming service of the client server system such as disclosed in the Japan Patent Laid-open No. 10-171465 bulletin can be considered. More specifically, in this client server system, the software parcelling method that is compared with the observer pattern is applied. And this method is also adopted in the CORBA (Common Object Request Broker Architecture).

However, according to this method, practically it is still insufficient in planning the independence of objects because the observer specifies subject as in the case of the observer pattern, and still the recompilation and relinkage are necessary.

The present invention has been done considering the above points and is proposing secondly, an arithmetic processing device, object-to-object communication method and a robot, which are capable of improving the independence of objects as compared with the conventional device.

To obviate such problems according to the invention relating to claim 1, applying to the robot, the component detection means for detecting the components attached to the robot and for outputting the component detection result; the information storing means for storing information corresponding to the component detection result in each configuration to be obtained upon exchanging components; and the software changing means for changing the software corresponding to the configuration based on the comparison result of the component detection result and the information stored in the information storing means are provided.

To obviate such problems according to the invention concerning claim 5, applying to the arithmetic processing device, an object manager to connect objects so that data can be exchanged and the connection data providing means for providing the connection data required for connecting objects to the object manager are provided.

Moreover, according to the invention relating to claim 11, applying to the communication method between objects, objects will be connected so that data can be exchanged based on the connection data to be provided from the predetermined data providing means.

Furthermore, according to the invention relating to claim 17, applying to the robot an object manager to connect objects so that data can be exchanged and the connection data providing means for providing the connection data required for connecting objects to the object manager are provided.

Furthermore, according to the construction relating to claim 1, software can be changed corresponding to the change of configuration accompanied by the change of components by changing the software corresponding to the configuration based on the comparison result of the component detection result to be obtained by detecting components attached and the data corresponding to the component detection result in each configuration to be obtained upon exchanging components. And thus, the suitable software corresponding to the current configuration can be set simply.

According to the construction relating to claim 5, since the object manager to connect objects in order that data can be exchanged and the connection data providing means for providing the connection data required for connecting objects to the object manager are provided, objects can be designed without considering any specific connecting object, and regarding the object thus designed, the connection data can be set and changed in various ways. Thus, the independence of object can be remarkably improved as compared with the conventional device.

Furthermore, according to the construction relating to claim 11, by connecting objects so that data can be exchanged based on the connection data to be provided by the predetermined data providing means, the object can be designed without considering any specific object to be connected. Also regarding thus designed object, connection data can be set in various ways and connection can be changed in various ways. Thereby, the independence of object can be remarkably improved as compared with the past device.

Furthermore, according to the construction relating to claim 17, by providing the object manager to connect objects so that data can be exchanged and the connection data providing means to provide the connection data required for connecting objects to the object manager, each object can be designed without considering any specific object to be connected. Moreover, regarding the object thus designed, connection data can be set and changed in various ways and the connection can be changed in various ways. Thus, the independence of object can be remarkably improved as compared with the conventional device.

BRIEF DESCRIPTION OF DRAWINGS

FIG. 6 a diagram showing the relationship between input and condition.

FIG. 8 is a diagram showing; the description of design file.

FIG. 9 is a diagram showing connection data.

FIG. 20 is a chart showing the description of associative memory 1.

FIG. 21 is a chart showing the description of associative memory 2.

BEST MODE FOR CARRYING OUT THE INVENTION

With reference to the accompanying figures embodiments of the present invention will be described.

(1) Construction of the First Embodiment
(1-1) General Construction

Figure 1:
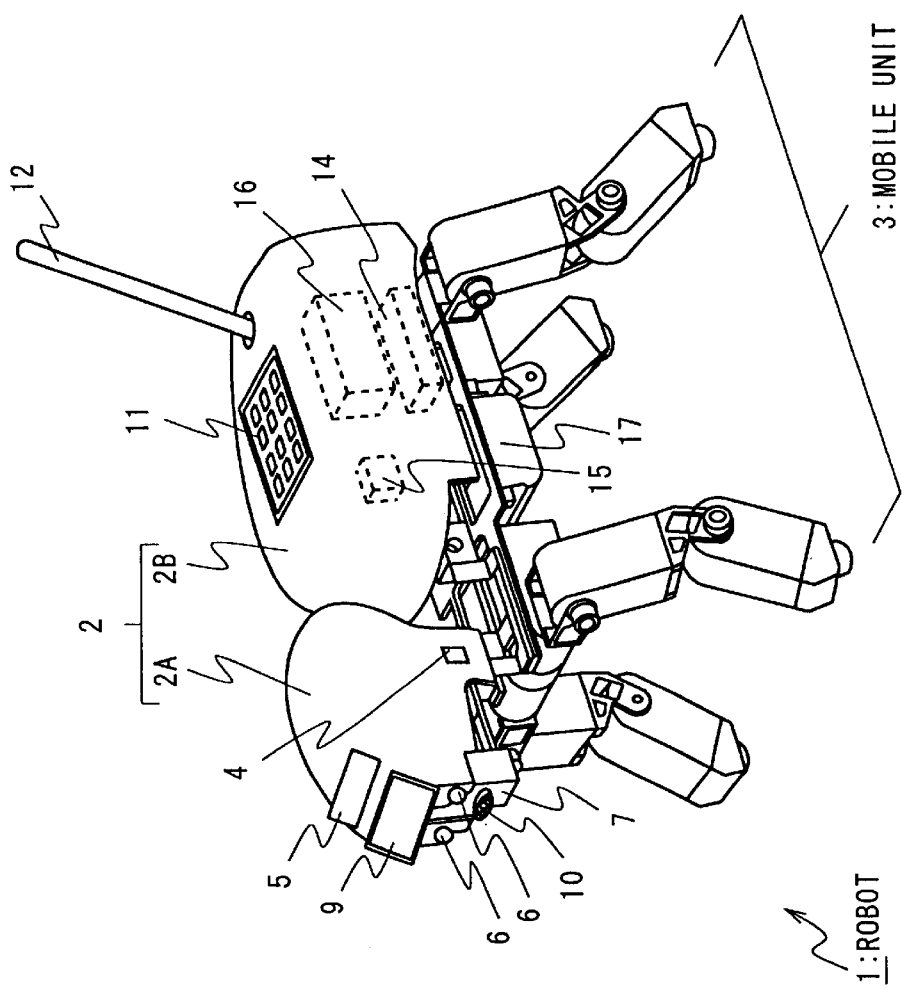
FIG. 1 is a perspective view showing the configuration of a robot according to the present invention.

FIG. 1 is a perspective view showing a robot according to the embodiment of the present invention. This robot 1 is so-called a pet-type robot and it has a dog-like shape and able to walk around with four legs. The main unit 2 of this robot 1 is attached with a movable unit 3, and the main unit 2 comprises a head unit 2A and a body unit 2B.

The head unit 2A is equipped with a microphone 4, a touch sensor 5, a stereoscopic vision capable television camera 6, a remote control infrared ray receiving unit 7, and various data can be obtained by these units. Also the head unit 2A is provided with an image display unit 9 and a speaker 10, and various data can be sent out via these devices.

An operator 11 is placed on the back part of the body unit 2B, and an antenna is placed on the place corresponding to the tail and through which the user's operation can be retrieved. Also, the body unit 2B has a slot and inserting the IC card to this slot, such as version up of the software can be conducted.

Furthermore, the body unit 2B is equipped with a controller 15 for controlling the whole operations by processing various information to input/output via the head unit 2A and operational information of such as the operator 11, an electric source unit 14 for supplying electric source to various units, a communication unit 16 to receive/transmit various information through the antenna 12. And a battery 17 is placed on its lower part.

On the other hand, the mobile unit 3 is equipped with 4 legs to which actuator and angle detection sensor are placed onto the places corresponding to joints, and connected to the main unit 2 by a serial bus and can be operated by the control of the main unit 2. Thus, the robot 1 can move around with 4 legs.

Furthermore, this mobile unit 3 is arranged so that rear legs can be detached from the main body 2. The mobile unit equipped with tires can be attached to the robot 1 in place of the rear legs. With this arrangement, the configuration of this robot 1 can be changed between the configuration to move with 4 legs (hereinafter referred to as four-legged type) and the configuration to move by tires (hereinafter referred to as wheel type) according to the user's choice.

Figure 2:
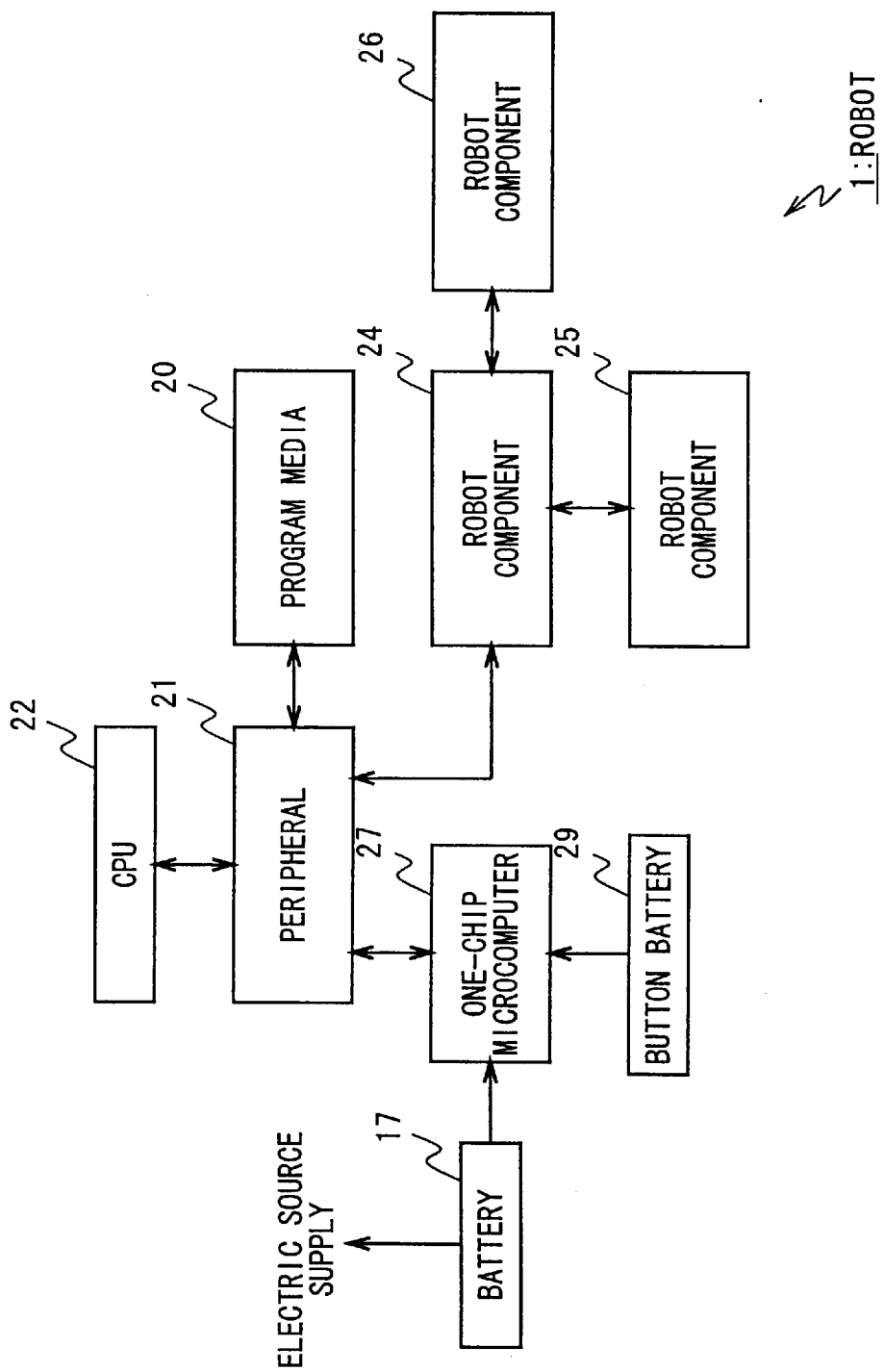
FIG. 2 is a block diagram showing the construction of the robot of FIG. 1

FIG. 2 is a block diagram showing the construction of this robot 1. In the robot 1, the program media 20 in which processing program is recorded is connected to the central processing unit 22 via a peripheral 21, and the processing procedure recorded in the program media 20 will be executed by this central processing unit 22. Moreover, the central processing unit 22 is connected to each actuator, sensor of the mobile unit 3 and further to the television camera 6, and robot components 24, 25, 26, i.e., operator 11, via the peripheral 21, and with this arrangement the CPU 22 can control the overall operations.

Furthermore, the central processing unit 22 is connected to one-chip microcomputer 27 for electric source control forming the source unit 14 via the peripheral 21. And the CPU 22, controlling the operation of this one-chip microcomputer 27, supplies the electric source to all units from the battery 17. And moreover, the CPU 22 supplies the electric power to all units from the button battery 29 in place of the battery 17 on the energy saving mode.

(1-2) Software Construction

Figure 3:
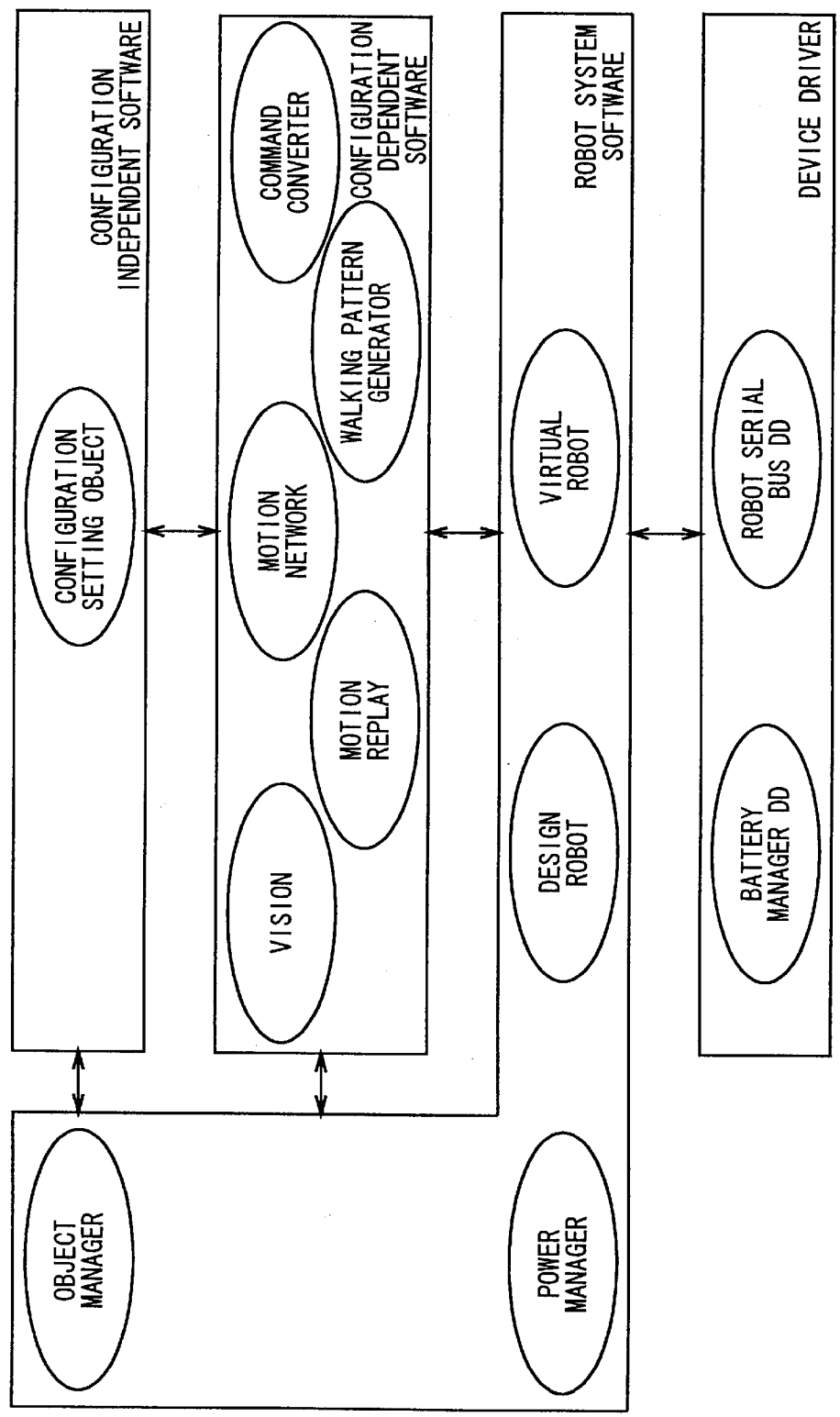
FIG. 3 is a schematic diagram showing the construction of software in the-four-legged type.
Figure 4:
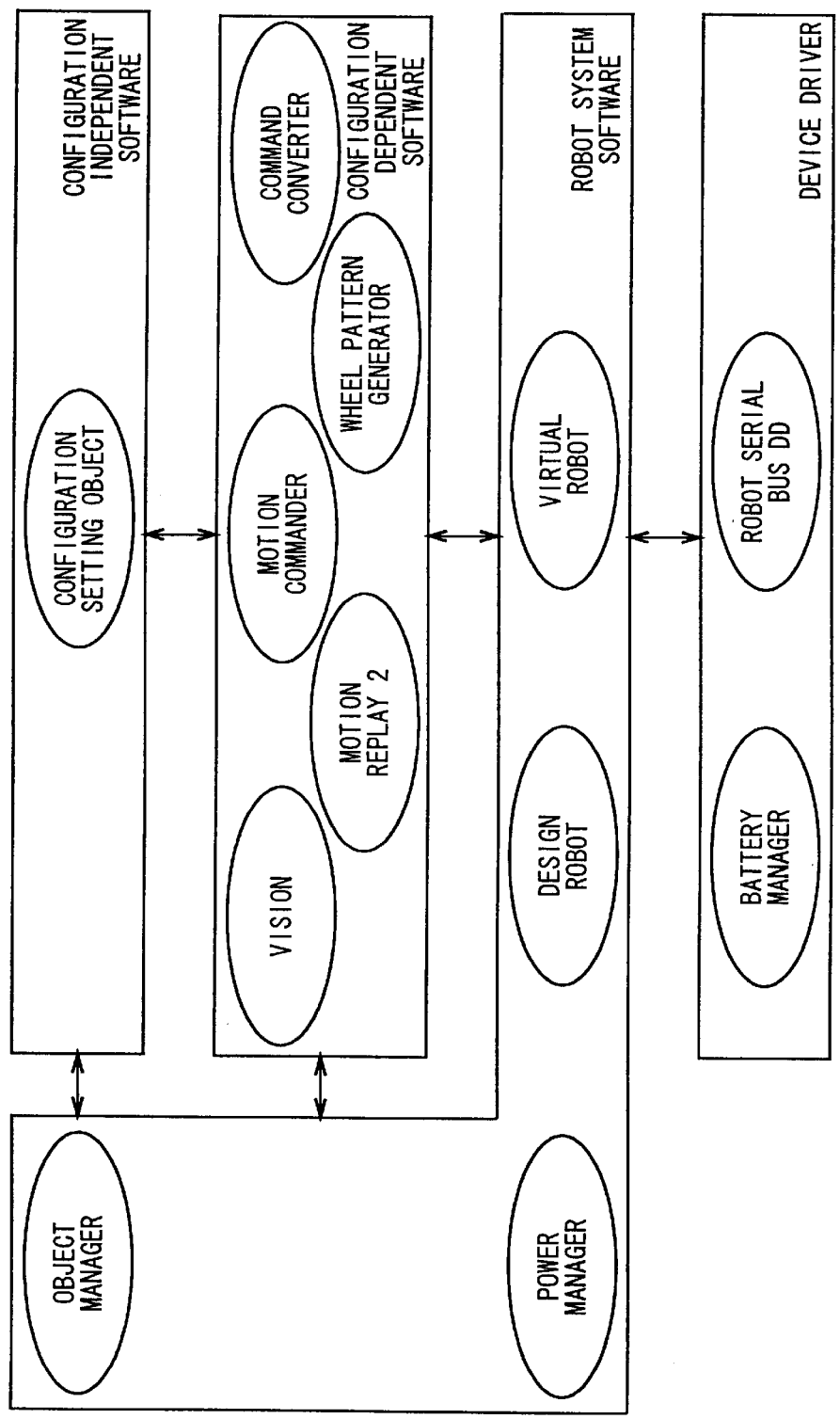
FIG. 4 is a schematic diagram showing the construction of software in the wheel type.

FIG. 3 is a schematic diagram showing the construction of software in the four-legged robot 1 by using layers. And FIG. 4 is a schematic diagram showing the construction of software in the wheel type robot in comparison with FIG. 3. In this software construction the lowest layer is the device driver layer and various device drivers are placed. Here, the device driver inputs/outputs various data between the sensor, actuator in the mobile unit 3 and various robot components placed on the head unit 2A, and software objects for these processings will be provided.

The battery manager device driver (battery manager DD) detects the remaining quantity of battery 17 by the data communication with the one-chip microcomputer 27 of the source unit 14 and periodically informs this to the robot system software of the upper rank. Moreover, the battery manager controls clock of the central processing unit 22, and as well as decreasing the frequency of this clock by the specification of robot system software, stops unnecessary operation of the device and thus decreases the overall consumption of electric power.

Moreover, the robot serial bus device driver (robot serial bus DD) captures the sensor information of the mobile unit 3 connected to the serial bus and informs this to the robot system software of the upper rank by communicating data with the master control hardware of the serial bus placed on the main unit 2. And contrary to this, it outputs the control data, audio signal to be put out from the robot system software to each device.

Furthermore, the robot serial bus device driver detects the change (addition, deletion) of the device connected to the serial bus when starting the system. Moreover, capturing the device specific information associated with this change, it transmits the information showing the current configuration of the robot 1 to the robot system software.

The robot system software is arranged on the upper rank of this device driver layer. Here, the robot system software is comprised of software objects such as virtual robot, design robot, power manager, and object manager.

The virtual robot, in the data communication with the robot serial bus device driver, converting the data having each device specific format to the robot common format, receives/transmits this. More precisely, concerning the data for motor control, in the device specific format, potentiometer sensor output is expressed by 10-bit obtained by analog-to-digital converting. On the other hand, in the virtual robot, the data represented by this is converted to the data showing 1 bit is 0.001° of the lowest rank and outputs as the common format in the robot 1. Moreover, the virtual robot, in addition to data reception and/or transmission by such format conversion, transmits image data obtained by the television camera 6 to the upper rank software.

Furthermore, the virtual robot receives the information showing the current configuration of the robot 1 from the robot serial bus device driver and compiles this information. Thus, the virtual robot controls the connection information showing what kinds of robot components and how and what order these are connected (CPC (configurable physical component) connection information) and informs this CPC connection information to the design robot.

Furthermore, when the change occurs in the device connected to the serial bus, the virtual robot receives a notice from the robot serial bus device driver of the device driver and notifies this to the design robot.

The design robot, upon receiving the CPC connection information from the virtual robot, successively comparing these with the connection template information recorded in advance, selects the template suited to the current configuration of the robot 1. Furthermore, the design robot instructs the object manager to update the configuration dependent software of the upper rank to the configuration dependent software suited to the current configuration.

In this connection, according to this embodiment, the connection template information will be described in the design file as design data.

The object manager updates the configuration dependent software to the configuration dependent software suited to the current configuration by using the information relating to the object to be informed by the design robot and the connection of each object according to the instruction of the design robot. More specifically, the object manager instructs Stop operation, Disconnect communication between objects, Destroy object, Release the resource on all objects forming the configuration dependent software. Furthermore, the object manager instructs the loading of newly required object, initialization, and constructing the connection and starting of these objects. In this connection, the connection between objects means the connection for receiving/transmitting data between objects.

The power manager communicates data between the battery manager device driver and instructs the battery manager device driver to switch the clock and also instructs the stop operation of object according to the instruction of the upper rank software (configuration independent software or configuration dependent software).

The configuration dependent software is placed on the upper rank of this robot system software and the configuration independent software is placed on the further upper stage. Here, the configuration dependent software is the software that will be changed according to the configuration of this robot 1. Contrary to this, the configuration independent software is fixed regardless of the configuration of the robot and placed on the upper rank of the robot 1. Therefore, the configuration dependent software has various kinds of objects depended on the configuration of this robot 1. According to this embodiment, in general, the software suited to the configuration of four-legged type and wheel type can be constructed simply by changing the configuration dependent software.

More specifically, here in the four-legged type, this configuration dependent software (FIG. 3) is comprised of objects such as command converter, motion network, motion replay, walking pattern generator and vision as the object related to the mobile unit 3.

The command converter converts the command from the configuration independent software that is not depended on the configuration to the command suited to the configuration of the robot 1. And when the commands to instruct the postures such as Sleep, Rest, Wakeup, Move are entered as the commands related to the mobile unit 3 from the configuration independent software, the command converter converts these commands to the commands to specify postures Sleeping, Sitting, Standing, Walking respectively.

Figure 5:
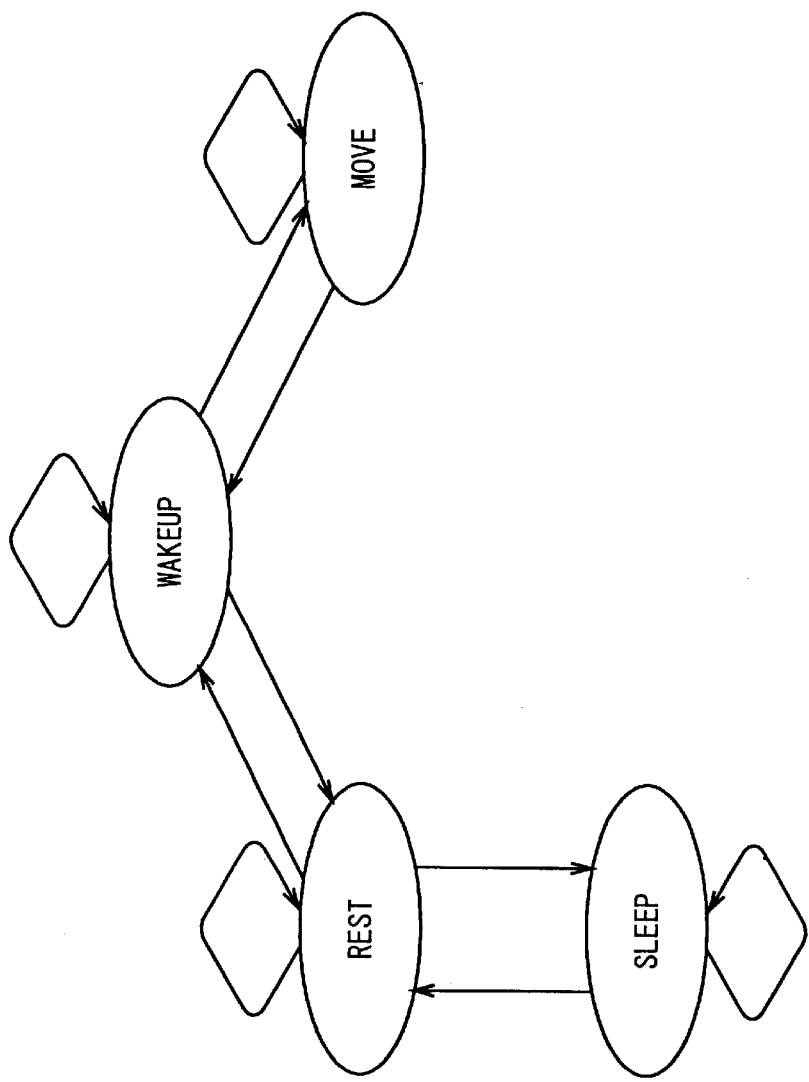
FIG. 5 is a condition transitional diagram showing the change of posture in the four-legged type.

According to the transition shown in FIG. 5, the motion network starts the object method (entry) corresponding to an arrow in this transition diagram from the command showing these postures to be put out from the command converter. More specifically, when the command of Walking is entered in a state of Sleeping, the motion network successively starts the corresponding entry of the motion replay object in order to change the posture successively to Sitting, Standing and Walking. In this case, when it reaches to the final walking condition, the motion network starts the entry of walking pattern generator corresponding to its own loop showing this condition.

When the entry starts by the motion network, the motion replay outputs the joint angle command value corresponding to the posture change. To be more specific, the motion replay stores the discrete joint angle command values registered as the key data and transmits a series of angle command values by conducting the interpolation arithmetic processing using this key data.

The walking pattern generator calculates each joint angle command value and outputs this so that it moves to the direction specified by the configuration independent software.

Vision is an object for image processing for example, and it receives image data obtained by the television camera 6 from the virtual robot object and processes these. Thus, the vision distinguishes such as red object and detects the position and appearance size of this red object based on this robot 1 and transmits this.

On the other hand, in the wheel type, the configuration dependent software (FIG. 4) has the vision object that is in common with the four-legged type and the wheel type specific objects, i.e., command converter, motion commander, motion replay 2 and wheel pattern generator as objects associated with the mobile unit 3.

The command converter converts the command from the configuration independent software that is not dependent on the configuration, to the command suited to the configuration of the robot 1 as in the case of command converter in the four-legged type. In this case, since the robot 1 is the wheel type, the command converter converts commands to specify the postures of Sleep, Rest, Wakeup and Move to Sleeping, Rest, Ready, and Go respectively.

The motion commander, receiving the output of the command converter, forms the joint angle command value related to the control command for tire. In the case where the Sleeping command is entered, the motion commander sets the joint angle command value to "neutral". Here the neutral condition means that the motor is not driven or put on brakes. Accordingly, both arms comprising the mobile unit are kept in the hang over condition and the tire is kept in the stop condition.

On the other hand, in the case where the Rest command is entered, the motion commander forms the joint angle command value so that both arms are put forward bending 90 degree at the elbow part and also head part 2A faces its face frontwards. But the tire is kept in the stop condition.

Furthermore, when Ready command is entered, the motion command forms the joint angle command value so that both arms are put forward stretching elbows, and the head unit 2A faces its face frontwards. Also in this case, the tire is kept in the stop condition. Moreover, when Go command is entered, the command value is sent out so that the tire rolls forward while both arms are held as in the case of Ready condition.

The motion replay 2 controls the operation of other than tire (e.g., operation of both arms) concerning the wheel type specific operation by the instruction of the motion commander. The wheel pattern generator generates the wheel control information of tire by the control of the motion commander.

The configuration independent software is the software that is not dependent on the configuration of the robot 1 and has the configuration setting objects. Here the configuration setting object receives information not dependent on the configuration of the robot 1 from the configuration dependent software. And according to this information, it outputs the command showing the posture of the robot 1 as described above, that is not dependent on the configuration of the robot 1 (such as sleeping) to the configuration dependent software.

For example, if the existence of red object is not detected over the period of 1 minute based on the existence or nonexistence of the red object and the location information to be informed from the vision object, the command will be issued so that the present condition would be maintained in the Sleep condition. And in the Rest condition this condition would be transited to the Sleep condition; the Wakeup condition to the Rest condition, and the Move condition to the Wakeup condition, as shown in FIG. 6.

Furthermore, in the case where the red object is detected in smaller value than the predetermined value (lower than 10 value by the setting of robot), and if this continues more than 10 seconds, the configuration setting object issues the command to transit the condition from the Sleep condition to the Rest condition, the Rest condition to the Wakeup condition, and the Wakeup condition to the Move condition. Also it issues the command to continue the Move condition in the Move condition.

Furthermore, when the red object is detected in larger value than the predetermined value, the configuration setting object issues the command so that the Sleep condition would be transited to the Wakeup condition, the Rest and Wakeup conditions would be transited to the Move condition. And also it issues the command that in the Move condition, the Move condition would be continued.

Thus, in the robot 1, the highest rank software is so formed that it does not depend on configuration, and data are received and/or transmitted between these configuration independent softwares according to the configuration-independent format. With this arrangement, in the robot 1, only configuration dependent softwares would be changed according to the configuration, and the software can be changed simply corresponding to configuration.

(1-3) Change of Configuration Dependent Software In the robot 1, this configuration dependent software is updated according to the processing of the object manager by the command of the design robot. At this point, according to this embodiment the configuration dependent software will be updated by loading and unloading of objects having the configuration dependent software and by reconstructing the connection for communicating between objects.

Accordingly, the design robot receives the CPC connection information to specify the configuration of robot 1 from the virtual robot and this design robot directs the updating of configuration dependent software to the object manager based on this CPC connection information and provides the necessary information.

Furthermore, the virtual robot obtains information of each device connected to the serial bus via the robot serial bus device driver on the lower layer, and forms CPC connection information from this information and informs this to the design robot.

Thus, in this robot 1, the predetermined information is recorded on the memory of each robot component, and according to the data communication to be executed via the robot serial bus device driver, the information of device connected to the serial bus can be obtained with its location information in the virtual robot 1.

The robot 1 comprises a television camera, a speaker, microphone, and various actuators and sensors which are connected to the serial bus, and these are CPC primitive components forming the robot. And each model (CPC model) is formed with multiple combinations of these CPC primitive components set in linked condition. For example, one leg, which is a model, is formed in specific linked condition of multiple primitive components having three motors and one switch.

In the robot 1, the specific identification data is applied to each model, and each component connected to the serial bus can be identified by this identification data. Also this ID data comprises the ID of the manufacture factory that manufactured the model and the ID corresponding to the model number. Furthermore, each component information and location information of each component in the model are set according to the link information of each component and the generic information of each component in the model. And these information are to be stored in the memory of each model with the ID data of each model. In this connection, according to this embodiment, if the memory capacity is small in the model side, only ID data will be recorded in each model side and the component information and the location information of components in the model will be stored in the main unit 2 side.

When the system starts, or the device is changed, the virtual robot, forming the CPC connection information with the CPC primitive component and the data construction showing the order of connection of each component tracing successively serial bus having the tree construction based on the ID data and location information to be informed from the robot serial device driver, informs these to the design robot. Thus, the CPC connection information to be informed from the virtual robot is formed by the CPC primitive location information corresponding to the configuration.

The design robot selects the connection template (the label to be described later) corresponding to the configuration of the present robot 1 referring to the design file based on the CPC connection information to be informed from the virtual robot. Moreover, the design robot instructs to update this to the configuration dependent software suited to the current configuration according to the selected template to the object manager.

At this point, the design file is the description of text data format and this is described adding the label to a group of CPC primitive location information of each model in each configuration of the robot 1. Moreover, the CPC primitive location information is comprised of the CPC primitive information of each model and the CPC coordinate locator of each component. The CPC coordinate locator is the coordinate from the reference position set in the robot 1 and expressed by the general link coordinate system, and formed by the rotatory matrix for coordinate transformation and the vertical connection of the location vector.

Furthermore, the label specifies the corresponding object, loading of this object, and the data required for building up the object-to-object communications. And the virtual label described more generally and comprehensive description as compared with the design label and the composite label of the design label and the virtual label will be applied. The visual label will be utilized after being replaced with the design label by the design robot.

The following equation shows the description of design label. The design label consists of more than one CPC primitive location information or the design label. Design Label( CPC Primitive Location Information, or Design Label;

On the other hand, the following equation shows the description of the virtual label. The virtual label consists of the design label, CPC primitive, and the CPC coordinate locator of the CPC primitive.

Virtual Label (

Design Label:

CPC Primitive:

CPC Coordinate Locator:

) (2)

The following equation shows the description of the Composite Label:

Composite Label (

Composite Label:

or/and Design Label:

or/and Virtual Label:

) (3)

Thus, in the CPC primitive location information to be specified by the CPC connection information informed, in the case where the CPC coordinate locator defined in the virtual label exists at the top edge side of the tree construction from the CPC coordinate locator to be specified, the design robot replaces the virtual label with the design label, and also sets thus defined design label as effective.

According to this embodiment, by accessing to this design file using the CPC connection information, the current robot configuration (four-legged type, wheel type, etc.) can be specified. And furthermore, a variety of data necessary for updating the configuration dependent software can be obtained.

Figure 7:
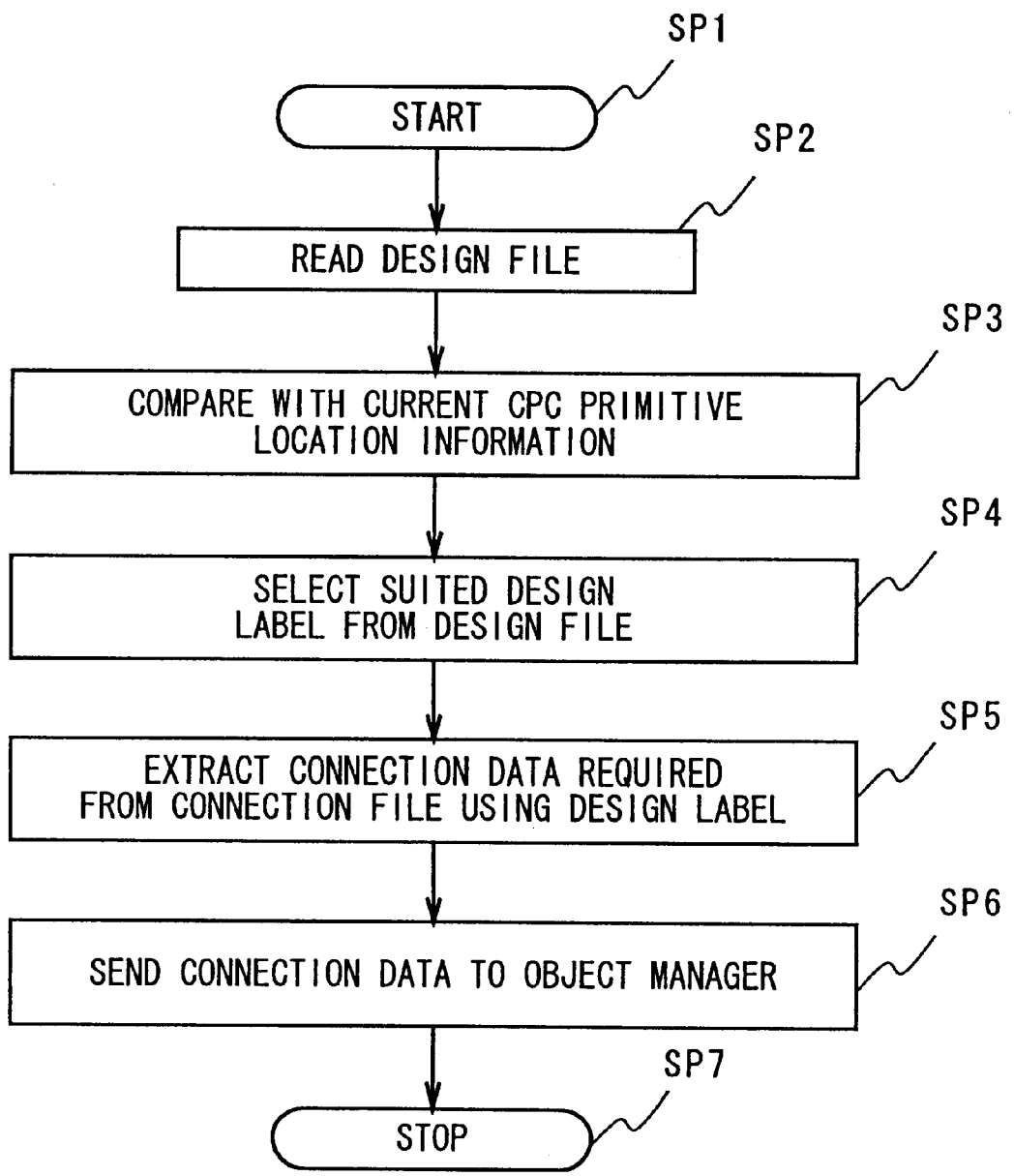
FIG. 7 is a flow chart showing the processing procedure of design robot.

FIG. 7 is a flow chart showing the processing procedure of this design robot in detail. When the CPC connection information is informed from the virtual robot, the design robot moves from the step SP1 to the step SP2, and accessing to the design file using this CPC connection information, specifies the current configuration of robot 1.

Then, the design robot moved to the step SP3 and compares the CPC primitive location information by the CPC connection information informed from the virtual robot and the CPC primitive location information by the CPC connection information stored in the design file.

Next, the design robot moves to the step SP4, and accessing to the design file based on the comparison result, detects the design label to specify the object corresponding to the current configuration and the data required for reconstructing the communication between objects.

Then, the design robot moves to the step SP5, and accessing to the connection file from the design label detected, and by detecting the connection data corresponding to the label, obtains the data required for specifying the corresponding object and for reconstructing the communication between objects. With this arrangement, the connection file is the file in which the connection data is recorded corresponding to the label, and the connection data is the data necessary for specifying the corresponding object and for reconstructing the communication between objects.

Then next, the design robot moves to the step SP6 and transmits this connection data to the object manager, and thus specifying the update of configuration dependent software, moves to the step SP7 and terminates this processing procedure.

FIG. 8 is a diagram showing a part of design file. In this design file, DRX shows the configuration of this robot 1, 4Legged shows four-legged type configuration. Also, Head, RightFrontLeg, LeftFrontLeg, RightRearLeg, LeftRearLeg show respectively head, right front leg, left front leg, right rear leg, left rear leg. And thus, it is specified in the first paragraph that the four-legged type is comprised of a head, right front leg, left front leg, right rear leg and left rear leg.

Moreover, Wheel in the second paragraph shows the wheel type, and in this second paragraph, it is defined that the wheel type is comprised of the head, right front leg, left front leg, right rear wheel, left rear wheel in comparison with the first paragraph. In the third paragraph, the disposition of camera link to the head is described. In the fourth paragraph, virtual label of this camera link is described and in the fifth paragraph and after, the CPC coordinate locator concerning the right front leg, left front leg, etc., are described in the tree format.

On the other hand, FIG. 9 is a diagram showing a part of descriptions of the CPC connection information. In this embodiment, the CPC connection information is described by the text data format similar to those of the design file. In this description, joint shows interface and shows this part is the connecting point with the other component. In this case, it is clear that the television camera is connected via 5 hubs, CO, CO, CO, CO, CO from the descriptions from the second line to the fifth line.

Thus, the CPC connection information according to the example of FIG. 9 agrees with the four-legged type described above in FIG. 8.

On the other hand, the following is a diagram showing a part of descriptions of the connection file. The connection file is described in the text data format, and in the first and the second paragraph, the object corresponding to the leg and tire in the four-legged type and wheel type respectively and the data required for constructing the communication between objects in the object will be described.

More specifically, in the first paragraph, as the service name the name of object MoNet and data format MoNetOutData and S showing the subject will be described. Furthermore, as the identical service name, such as the name of object MoNetReplay, data format MoNetOutData are described. And lastly, the description of 0 showing the observer will be allocated. Moreover, in the following lines, the identical subject and observer, and such as data format will be described.

DRX 4legged

MoNet.MoNetOutData..S,MoNetReplay.MoNetOutData...0

Monet.MoNetOutData..S,WalkingPatternGenerator.MoNetOutData...0

)

DRX Whell (

MotionConverter.MCData..S,MotionReplay2.MCData...0

MotionConverter.MCData..S,Whell.MCData..0

) (4)

Thus, in the case of this FIG. 8 example, the design robot extracts the connection data (the description in the parentheses after DRX 4Legged) from the description of the first sentence according to this DRX 4Legged and informs to the object manager. And thus, in this embodiment the configuration dependent software will be updated.

Figure 10:
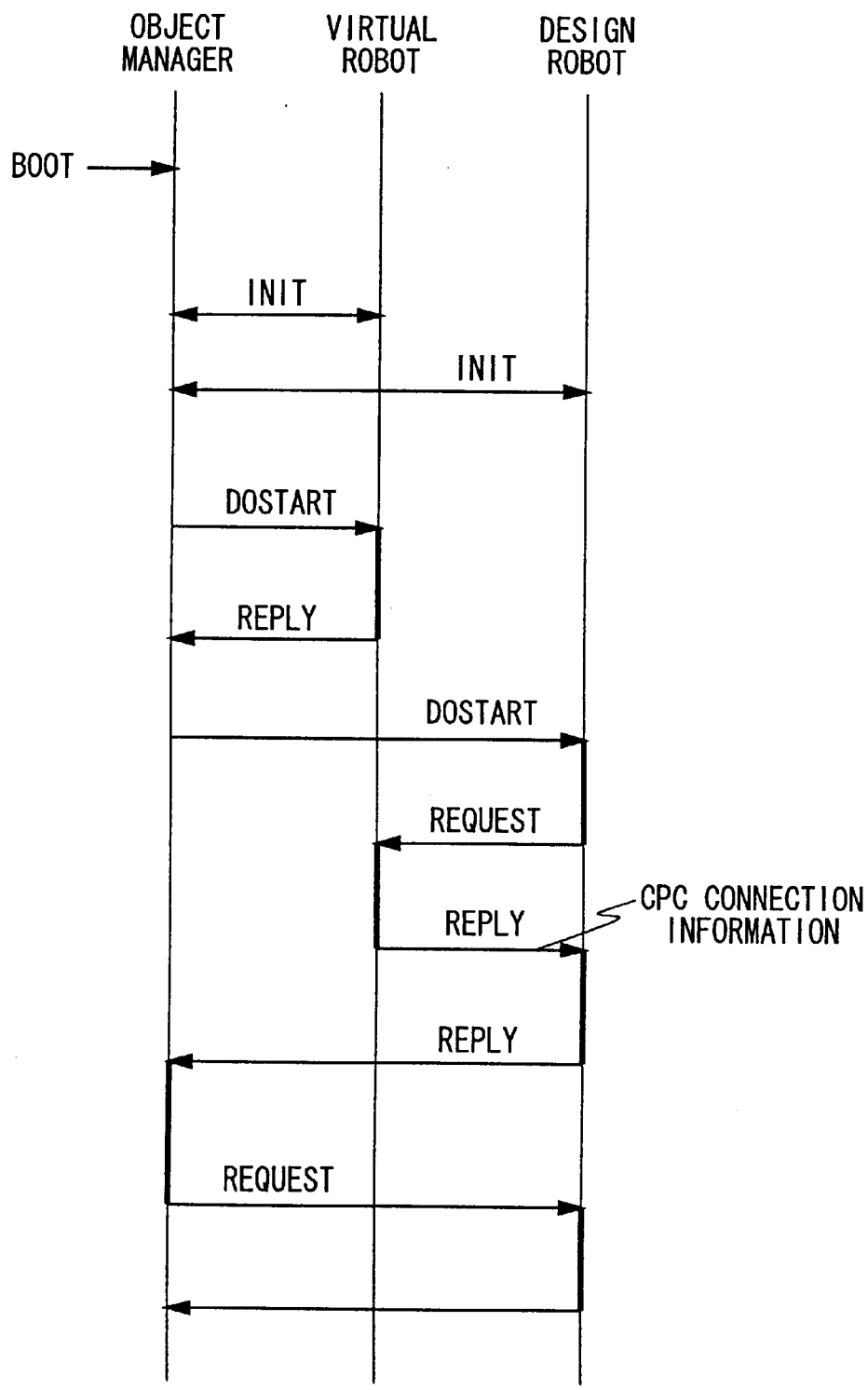
FIG. 10 is a time chart showing the operation of the object manager, virtual robot and the design robot after booting.

FIG. 10 is a time chart showing the processing at the time of booting in the design robot. In the robot 1, when the electric source is entered or reset, the boot processing starts. At this point, each object is loaded from the file and configuration dependent software will be formed in the robot 1. And at this moment, internal variables of each object manager will be initialized.

Then, DoInit is transmitted to each object from the object manager, and according to this DoInit, the request Entry of each object will be registered in the object manager. Thus, the communication between objects can be built up in the robot system software layer.

Then, DoStart is sequentially transmitted to the virtual robot and the design robot from the object manager, and the virtual robot and design robot start the operation. With this arrangement, the CPC connection information is formed by the virtual robot, and this CPC connection information is delivered to the design robot by the request of the design robot and the connection data will be formed.

Furthermore, this connection data is delivered to the object manager and the configuration dependent software will be constructed by this connection data.

On the other hand, in the Shut-down, DoStop is transmitted to each object from the object manager, errors are informed to all requests and the operation will be stopped in each object. Then, DoDestroy is transmitted to each object from the object manager, and each object releases the source in use and cancels the entry registered in the object manager and becomes the standby condition.

Thus, even in the case where the configuration is changed and the system is risen, the robot 1 can conduct the operation using the software suited to the configuration changed.

Figure 11:
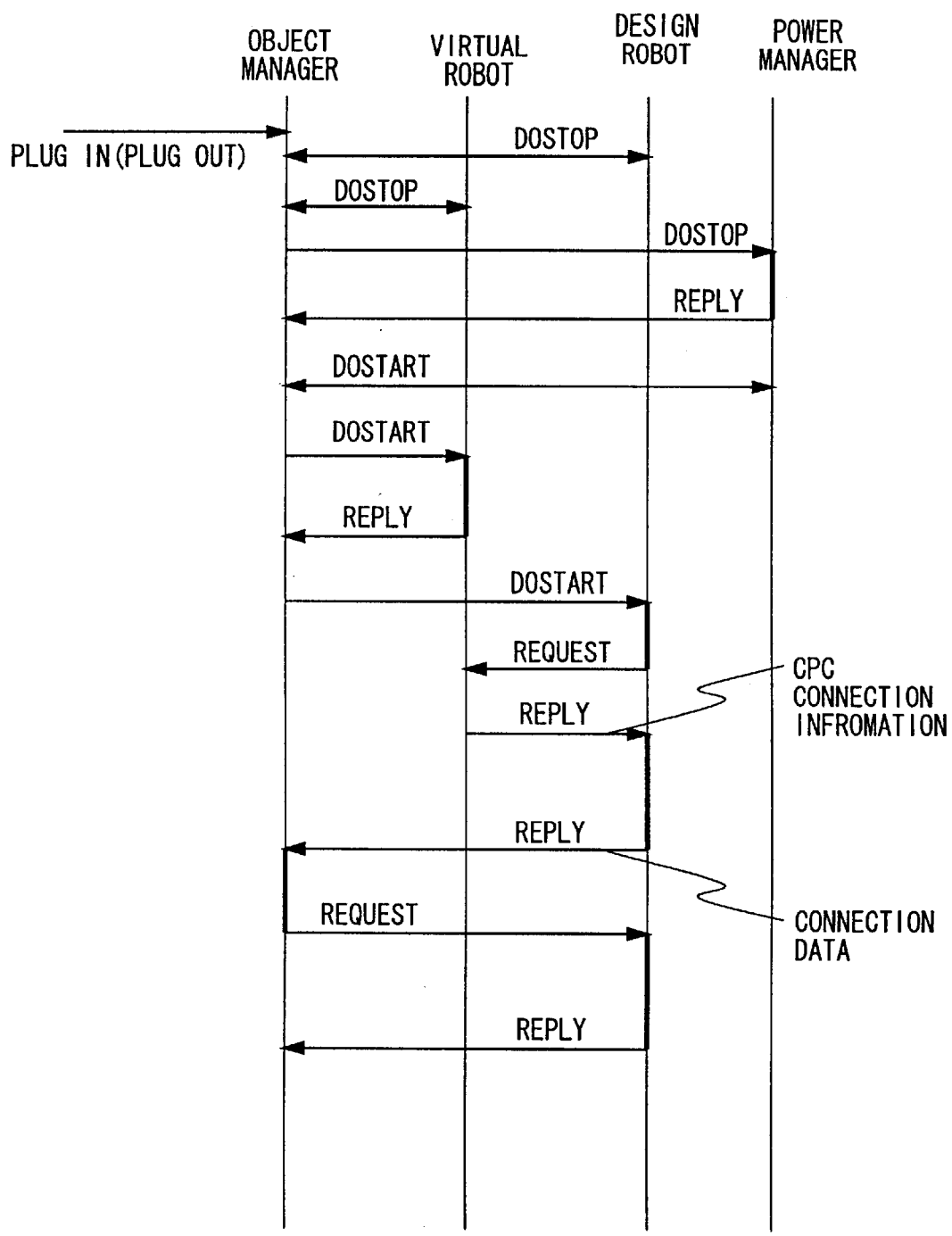
FIG. 11 is a time chart showing the operation of the object manager, virtual robot and the design robot at the time of plug-in and plug-out.

On the other hand, in the Plug-In and Plug-Out, as shown in FIG. 11, DoStop is transmitted to each object from the object manager, and in each object, error is informed to all requests by this DoStop and the operation will be stopped.

Then, DoStart will be successively transmitted to the virtual robot and the design robot from the object manager as in the case of booting and the CPC connection information will be formed by the virtual robot. And then, this CPC connection information is delivered to the design robot and connection data will be formed, and the configuration dependent software will be formed by this connection data.

Thus, in the robot 1, even in the case where the configuration is changed dynamically by Plug-In and Plug-Out, the robot 1 can operate by the software suited to the configuration changed.

Furthermore, when the battery 17 runs out, the processing of DoStop and DoStart will be repeated by the request of condition change from the battery manager as in the case of PlugIn and Plug-Out. Thus, at the time when the battery 17 is used up, the condition would be changed in order to decrease the clock frequency and stopping unnecessary device operation, to operate by the button battery 29. On the other hand, in the case where the charged battery 17 is provided, the clock frequency will be increased and simultaneously the operation of each device will be started and operated by the battery 17.

(1-4) Processing of Object Manager

The object manager reconstructs objects comprising the configuration dependent software by the notice from the design robot and thus it updates the configuration dependent software. More specifically, the object manager loads and unloads objects based on the notice from the design robot and simultaneously, reconstructs the communication between objects corresponding to these unloading and loading, and:thus, the object manager changes the configuration dependent software.

If the corresponding object name should be registered in the object in the case of constructing the communication between objects, the independence of each object will be damaged and it becomes necessary to prepare multiple kinds of objects to correspond to free configurations. Thus, according to this embodiment, the object manager constructs the communication between objects based on the connection data to be sent from the design robot and thus, the independence of object will be secured.

In the following explanations, the description will be simplified avoiding the specification of the detailed object name in the robot 1. Moreover, the communication between objects will be executed in a synchronism.

Figure 12:
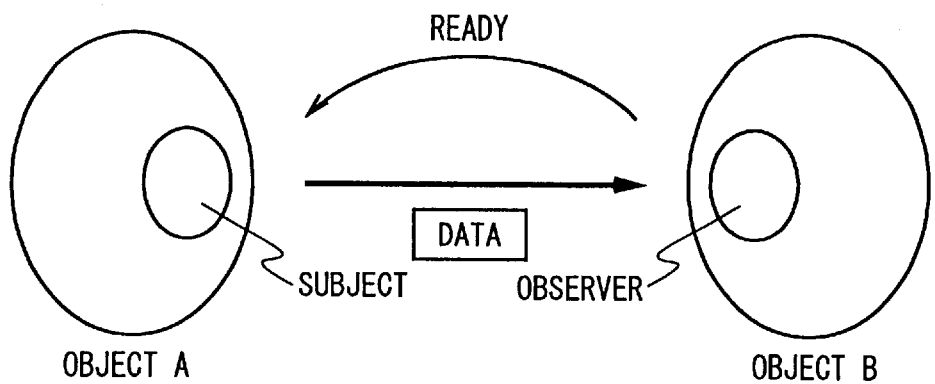
FIG. 12 is a schematic diagram showing the relationship between the observer and the subject.

More specifically, FIG. 12 is a schematic diagram showing the basic construction of the object-to-object communication between 2 objects concerning this embodiment. According to this embodiment, the object-to-object communication is executed using Ready and Notify, and the data exceeding the processing capability of object (in this example, ObjectB) would not be sent out.

More specifically, in FIG. 12, the object A transmits data to the 0 observer class that is a member of the object B, from the class 0 subject, that is a member of the object A, and thus, the method of the object B will be invoked.

According to this relation, the subject transmits data only when the Ready signal is sent out from the observer. The Ready signal should be sent once per one data. Thus, the object B of the observer side can receive the succeeding data upon waiting the completion of the processing of data received.

Figure 13:
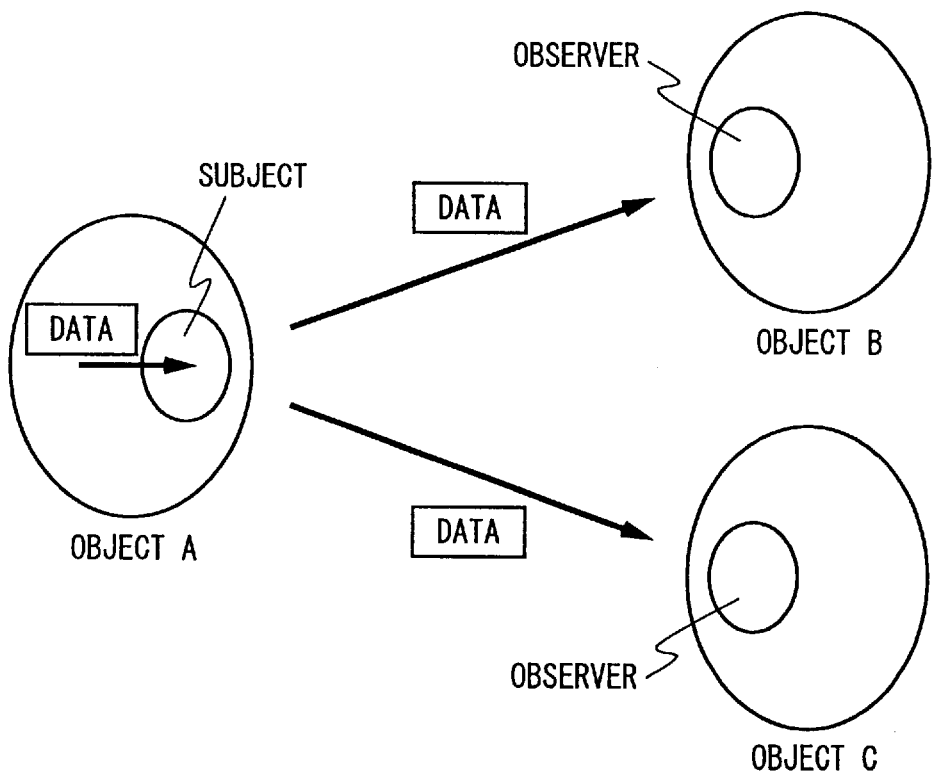
FIG. 13 is a schematic diagram showing the relationship between the observer and the subject in multi observers.

On the other hand, FIG. 13 is a schematic diagram showing the basic construction of the communications between objects in multi observers. In this case, the object A, that is the subject, can distribute data to all observers or can distribute data only to the specific observers specified by the object ID. According to this embodiment, even under such multi-observers condition, the data will be transmitted to the corresponding observer by the Ready signal.

In each object, by specifying the object ID to specify objects and the selector number to define method (method number), the corresponding method will be started (entry) and observer will be specified and the desired data will be transmitted.

Figure 14:
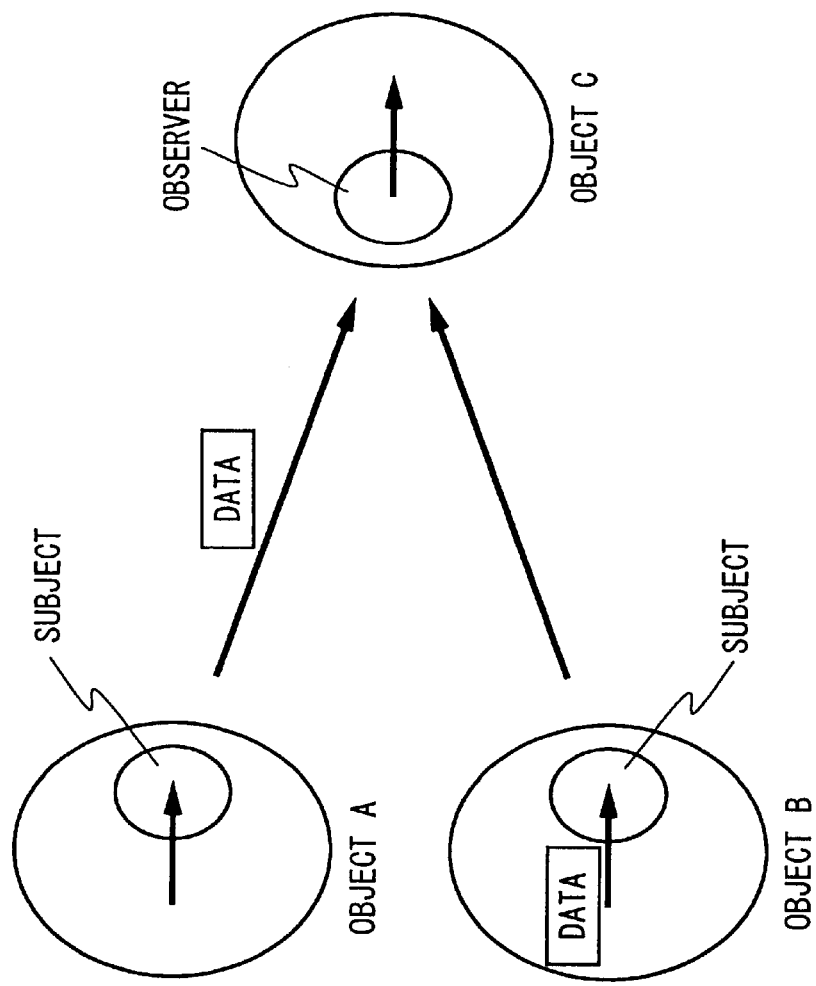
FIG. 14 is a schematic diagram showing the relationship between the observer and the subject in multi subjects.

FIG. 14 is a schematic diagram showing the basic construction of communication between objects in multi-subjects. In this case, subjects A and B are subjects and the object C is an observer. The observer can receive data from multi subjects respectively and in every time when it receives data, the method for processing the data will be invoked. Moreover, the observer can selectively enter the desired data by outputting Ready signal only to the specific subject specified by the subject ID.

According to this embodiment, in the object to which at least the configuration dependent software belongs, as described above referring to FIG. 12~FIG. 14, the communication between objects using Ready and Notify will be executed. Also, as occasion demands, other objects can be connected according to the connection pattern of multi observers and multi subjects. More precisely, the object having multiple observers also has multiple number of connect entries corresponding to multiple observers.

Figure 15:
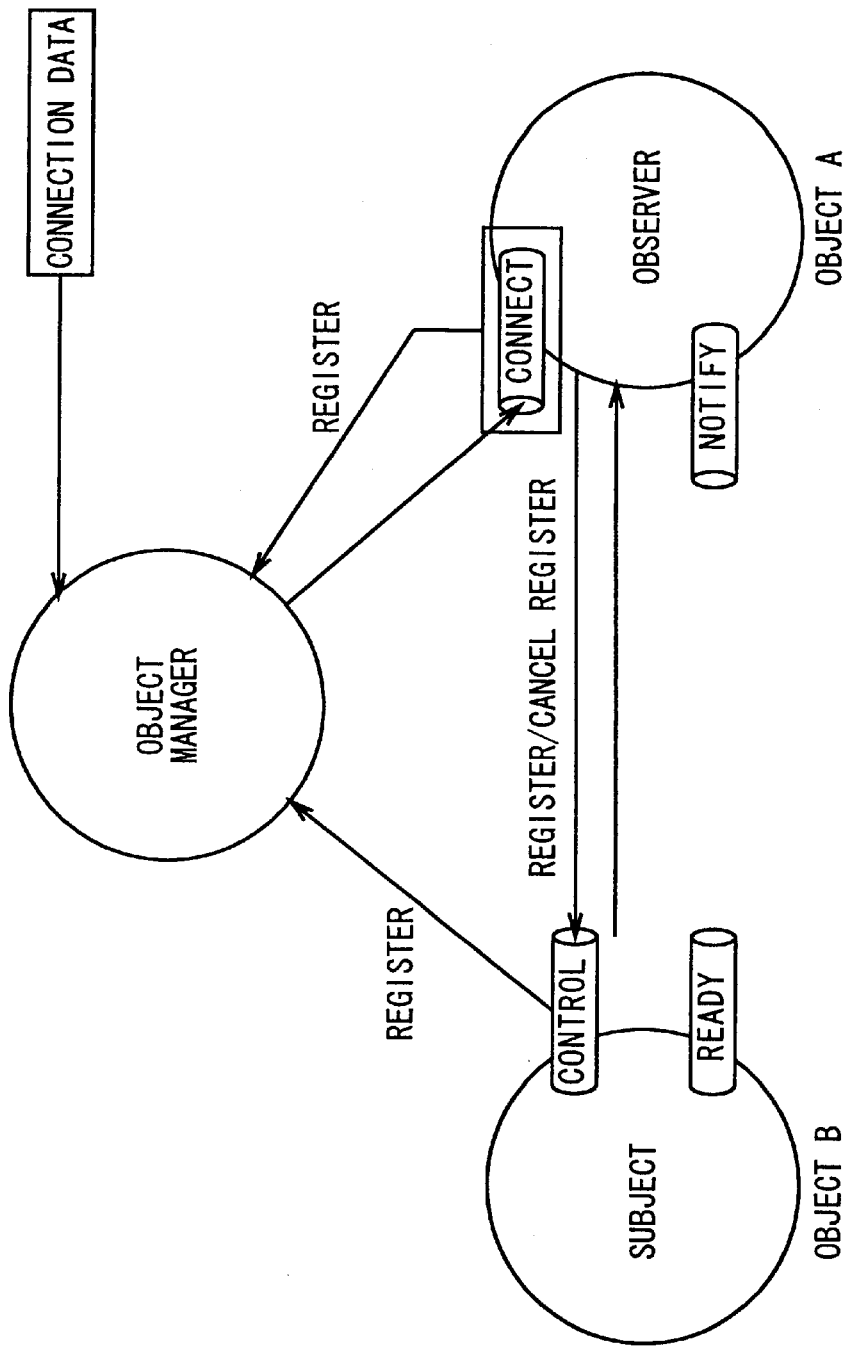
FIG. 15 is a schematic diagram showing the relationship between the object manager and the observer, and the subject.

FIG. 15 is a schematic diagram showing the relation between the object manager and each object. In each object, method will be specified by the object ID and selector number and data will be changed, and the selector numbers 0~3 will be allocated to the basic method regardless of corresponding subject and observer.

Here, DoInit is allocated to the selector number 0, and each object will be initialized when this DoInit starts. Moreover, DoStart is allocated to the selector number 1, and each object starts operation when this DoStart starts. Furthermore, DoStop is allocated to the selector number 2, and each object stops operation when this DoStop starts. Moreover, DoDestroy is allocated to this selector number 2, and each object releases the source according to this DoDestroy.

Furthermore, each observer informs the service name by the observer, selector number in response to the request from the object manager and the other objects by the return value.

Thus, according to this embodiment, the communication between objects can be reconstructed based on the connection data to be informed by the design robot and after the loading and unloading objects by the object manager.

The following equation shows the connection data to be informed from the design robot and described in the text data format dividing the service name of the subject and the service name of the observer by the colon. In this case, in the subject side, the object name FooB, data format Image, the name by the corresponding component name RightCamera, S showing the subject, are described as the service name. Moreover, in the observer side, the object name FooA, data format Image, the name by the corresponding component name RightCamera, 0 showing observer are described as the service name.

$$FooB.Image.RightCamera.S.FooA.Image.RightCamera.0 \quad (5)$$

In the case when loading the object, the object manager detects the name of object to be loaded from the description of this connection data. Moreover, the object manager secures stack memory and heap memory and loads the object having this detected object name from the predetermined file. At this point, the object manager obtains the object ID from the operating system OS and records this object ID with the name of object described in the connection data.

Thus, the object manager conducts the processing such as DoInit, DoConnect DoStart in utilizing the object ID thus registered.

More specifically, in DoInitialize, the object manager calls DoInit to all objects obtained by loading the object based on the object ID obtained and the selector number described above. Each object initializes internal variables according to this DoInit, and thus, the object manager initializes each object.

In this initialization processing, according to the notification of each object, the object manager registers an entry as the subject (control) and an entry as the object (connect) of each object. This registration is formed by the name of object and the names of subject and object corresponding to the description of subject and object in the connection data.

On the other hand, in DoConnect, the object manager informs the subject ID of the subject (object ID) and the entry (control) to the entry (connect) of each object having observer based on the registration in DoInitalize. And upon receiving this information, the object invokes the corresponding subject using the subject ID and entry (control) informed, and the entry (notify) is connected and registered. Moreover, Ready is returned to the observer from the subject to which the connection and registration are required. Thus, the observer and the corresponding subject will be connected.

In the case of constructing the object-to-object communication between the observer and the subject, the object manager informs the subject ID (object ID) and entry (control) of the corresponding subject to the observer informed by the connection data. Thus, according to this embodiment, each object can be developed without clearly showing the object to be connected, and can be connected with various objects by the instruction of the object manager as occasion demands. And thus, higher independence as compared with the past can be obtained.

Moreover, at this point, by constructing the object-to-object communication according to the connection data by the object manager, configuration dependent software can be updated simply and freely and the software suited to the configuration can be simply obtained.

On the other hand, in DoStart, the object manager instructs DoStart to each object by the selector number 1 described above. Each object, if it has the observer, transmits Ready to the subject using the subject ID and the entry Ready obtained by DoConnect. And thus, the corresponding subject forms the data receivable condition, and the configuration dependent software starts the operation.

More specifically, the subject consisting multi observers notifies the data such as sensor output to the observer which is outputting Ready out of observers registered. Moreover, the observer upon completing the processing of the data received, transmits Ready so that the succeeding data can be received.

On the other hand, in the case of ShutDown, PlugIn and Plugout, and the condition change as described above, since the connection data to be informed from the design robot differ from the contents transmitted from the design robot and registered in advance, the object manager sends out DoStop to each object using the selector number 2. In this case, the observer cancels the entry Ready.

Moreover, in DoDisconnect, the object manager disconnects the communication connection between the subject and the observer. In this case, the object manager, by transmitting the message of DoDisconnect to the entry of the observer (Connect), makes the observer issue the disconnect request (Remove Observer) of the entry (Control) to the corresponding subject from the observer, and thus, the communication connection will be disconnected.

On the other hand, in DoDestroy, the object manager transmits DoDestroy to the corresponding object by using the selector number 3 described above, and thus, this object will be destroyed. At this point, in this object the cancellation of registration executed in DoInit will be executed.

In Object Unload, the object manager releases the area of stack memory and heap memory on the object destroyed by DoDestroy and unloads this object. Moreover, the object manager destroys the subject ID and the subject name registered when loading.

Figure 16:
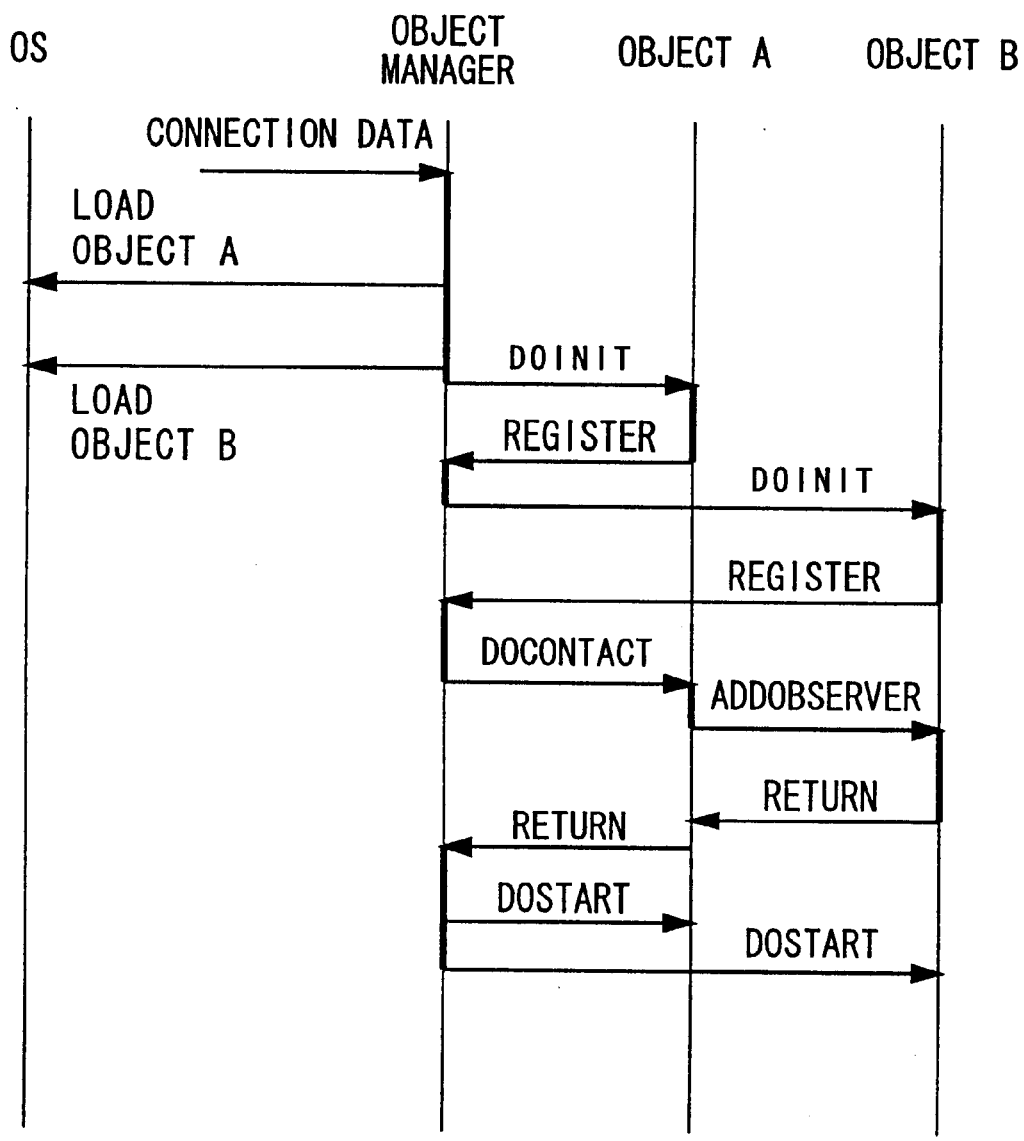
FIG. 16 is a time chart showing the operation of object manager in th case of receiving the connection data.

When the object manager receives such as the connection data from the design robot by these controls, it conducts the control up to DoStart according to the sequence shown in FIG. 16.

More specifically, the object manager starts when the connection data is transmitted by the message, and loads the object A and object B described in this connection data for example. Here, the object manager loads the object A and object B according to the system command of the operation system. At this time, the object manager obtains the object ID of objects A and B and registers these.

Next, the object manager starts DoInit of objects A and B by the observer ID and selector number 0 obtained as described above. And thus, it obtains the entry as the subject (Control) and the entry as the object (Connect) from the objects A and B and registers these.

Then, the object manager starts DoConnect of the object A, that is the observer, by using the entry (Connect) registered, and connects the object B, that is the subject, and the object A. Thus, the object-to-object communication is constructed based on the connection data, and the object manager starts DoStart of the objects A and B.

Figure 17:
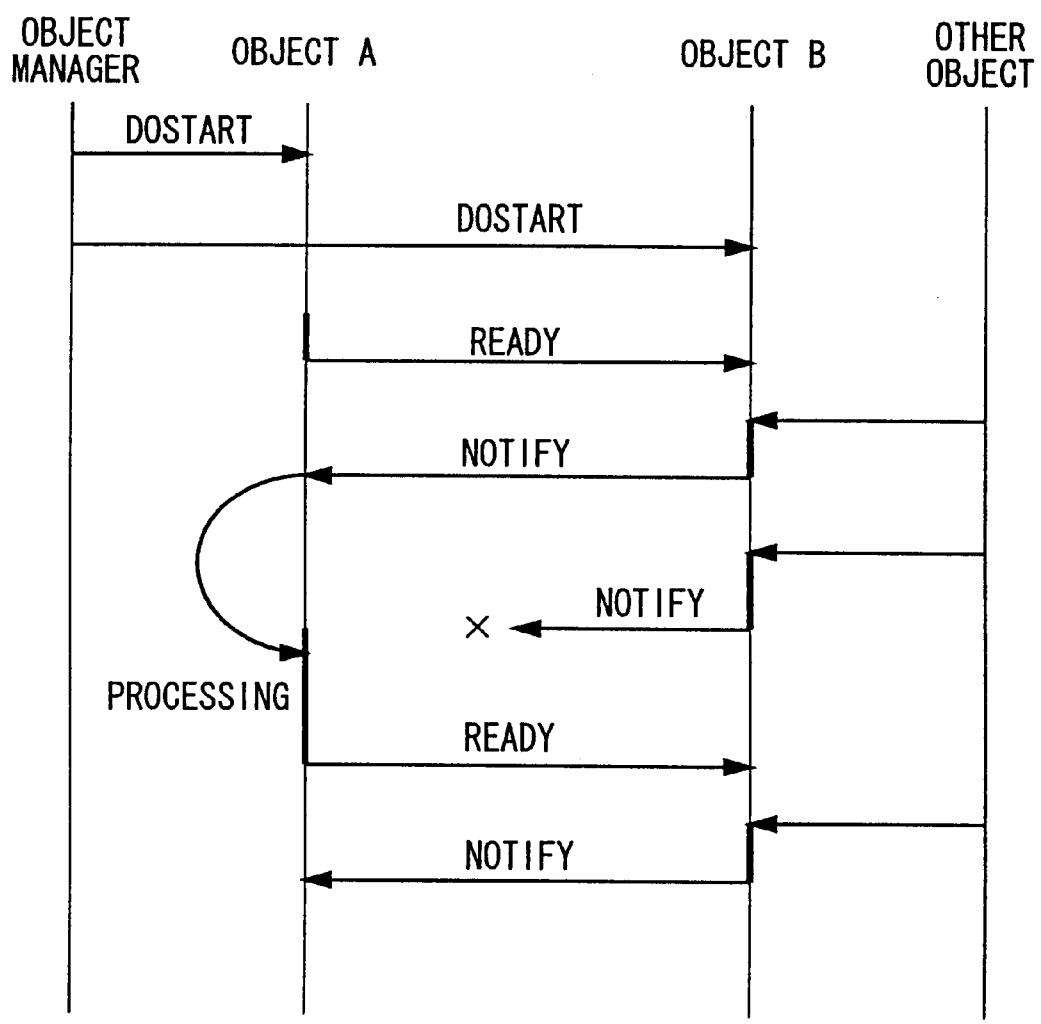
FIG. 17 is a time chart showing the sequence after DoStart.

FIG. 17 is a time chart showing the sequence after DoStart. The object A, object B and other objects start by this DoStart of the object manager, the object-to-object communication will be conducted by using said Ready and Notify in these objects.

More specifically, in this case, when started, the object A transmits Ready message to the Ready entry of the object B, and by the Notify entry of the object A by the object B, data will be transmitted from the object B to the object A. Moreover, if the message has not been sent out to the Ready entry of the object B from the object A during the processing this data, Notify entry of the object A by the object B will be registered. And the data will be sent out by the Ready entry of the object B by the object A. Thus in the object-to-object communication, the data transmission exceeding the data processing capability of the object A can be prevented.

Figure 18:
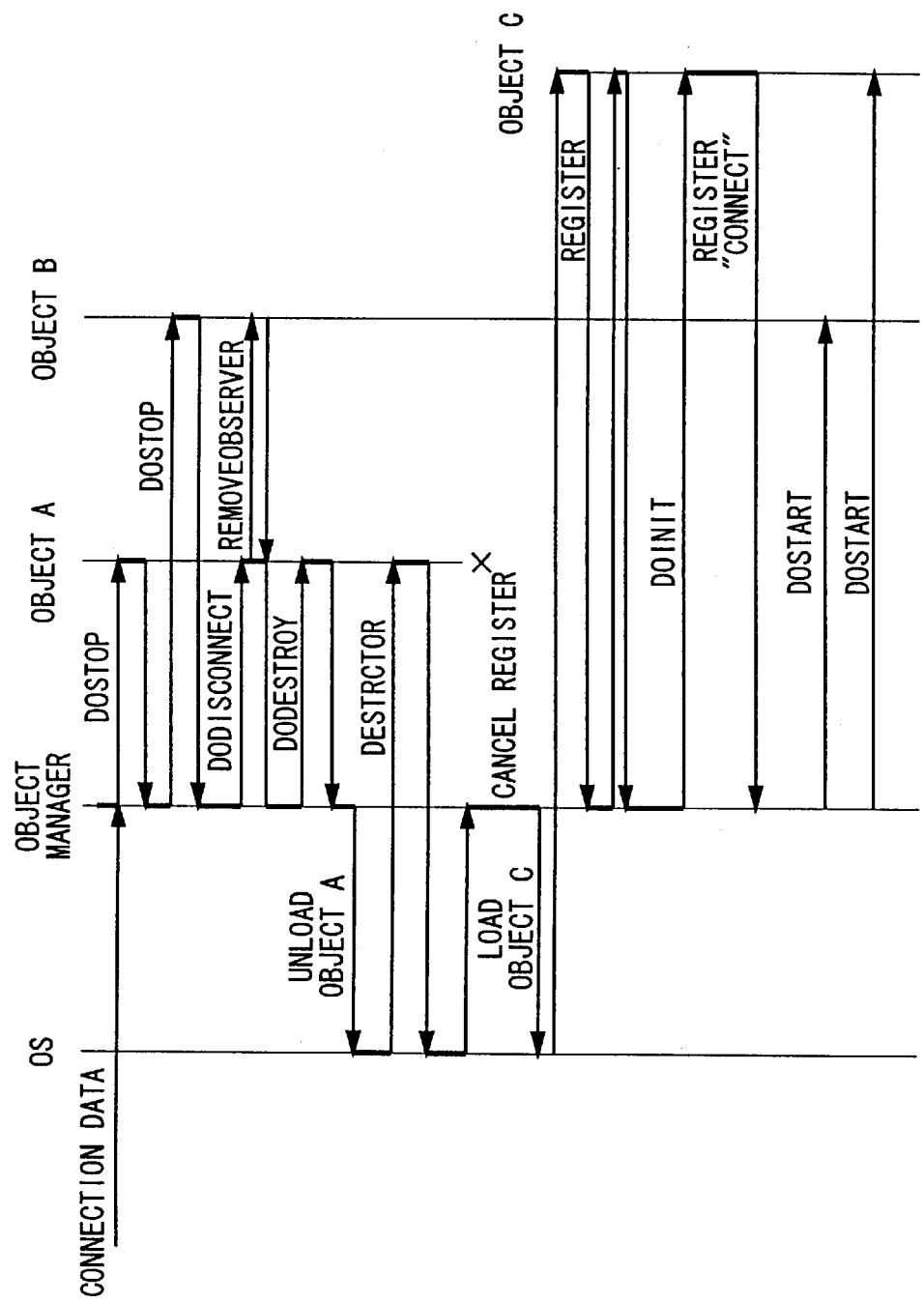
FIG. 18 is a time chart showing the sequence at the time of plug-in, plug-out and condition change.

FIG. 18 is a time chart showing the sequence in the PlugIn, PlugOut and condition change. If the connection data to be notified from the design robot differ from the contents transmtted from the design robot and registered before, the object manager transmits DoStop to all objects and stops the operations of all objects. In this case, in each object A and B, by cancelling the entry Ready, its own notify entry would not be started afterwards.

When DoStop of all objects are complete, the object manager notifies DoDisconnect to the object A and after separating this object A and the other object, starts DoDestroy of this object A. Thus, the source of the object A will be released, and the registration of the object B executed by DoInit will be removed.

When DoDestroy to the necessary objects is complete, the object manager conducts unloading by the system command of the operating system. At this point, the destructor of the necessary object is invoked, in this case the destructor of the object A is invoked and the registration of the object A executed when loading is cancelled. Moreover, the object manager releases the stack memory and heap memory and thus, unloading of the object A will be complete.

Then, the object manager instructs the loading of object C according to the connection data and successively starts DoInit, DoConnect and DoStart in the same manner as described above in FIG. 16. Thus, the construction by the object A and B will be changed to the construction by the object B and C not being compiled under operating condition.

(1-5) Registration of Object According to Associative Memory

Figure 19:
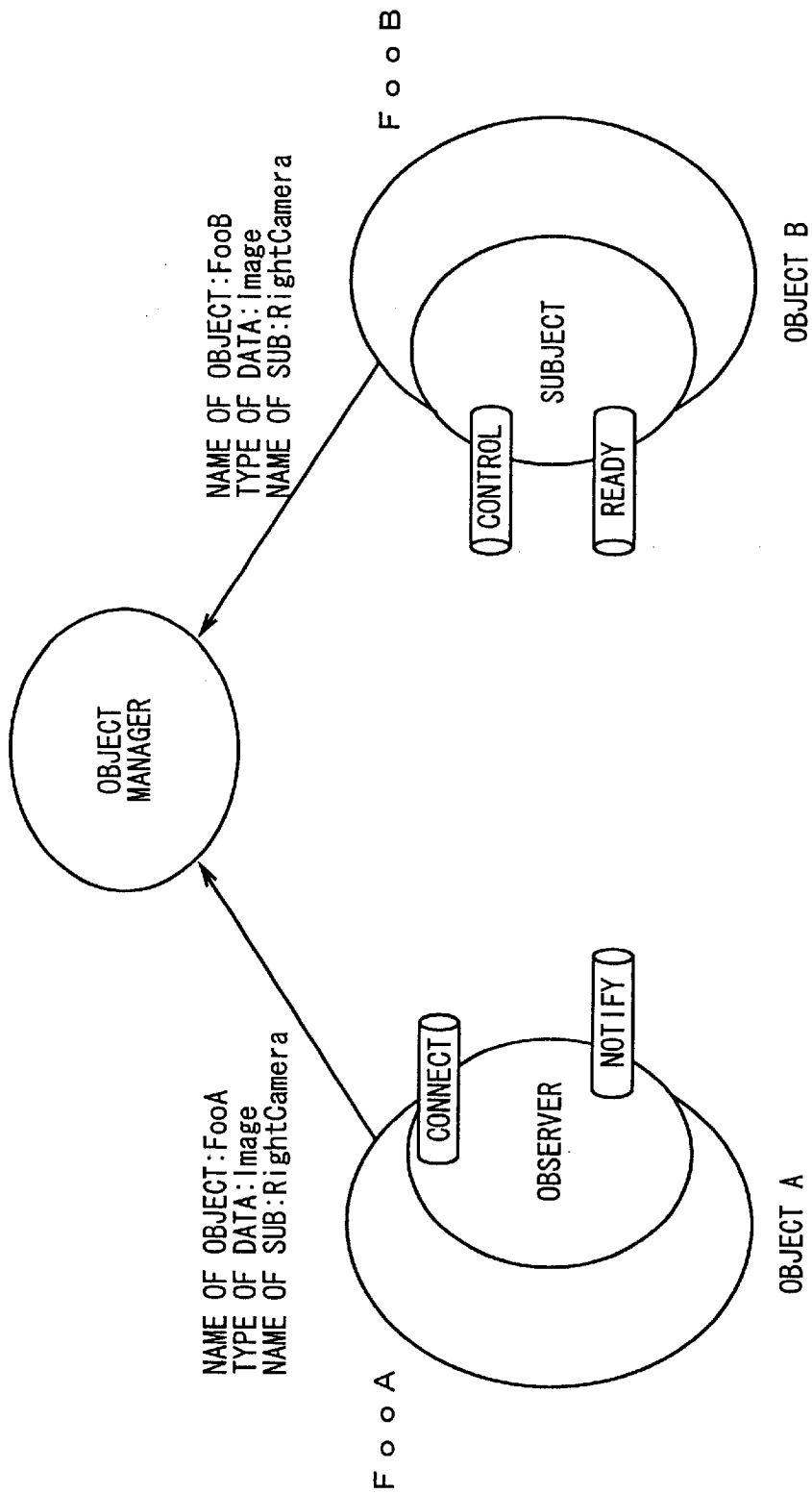
FIG. 19 is a schematic diagram illustrating the relationship of the connection data and observer and subject.

FIG. 19 is a schematic diagram showing the object A and object B according to the connection data shown by EQUATION (5). The object manager, storing and recording the connection data in the associative memory, registers each object in the associative memory based on the description of the connection data at the time when starting DoInit of the object and registering each object.

More specifically, in this case, the object name of the object A in the observer side is FooA, the object name of the object B in the subject side is FooB, the data format is Image, and the name of sub is RightCamera. Thus, in the connection data of this subject and object, service name of the subject and service name of the observer will be divided by colons and described as "FooB.Image.RightCamera.S-.FooA.Image.RightCamera.0".

When this connection data is delivered from the design robot, as shown in FIG. 20, the object manager memorizes and stores the description of the subject side "FooB.Image.RightCamera.S" making the description of the observer side of the connection data "0.FooA.Image.RightCamera" as the key.

On the other hand, each object notifies the service name and selector number responding to the registration entry of the object manager by DoInit, and the object manager stores these notifications in the associative memory 2 as in the case described above and registers each object.

More specifically, the object A in the observer side informs the service name "FooB.Image.RightCamera.0" that is the same description as the observer side in the connection data, and also notifies the selector number of the connection entry. In this connection, assume this selector number to be 5 in this object A.

As shown in FIG. 21, the object manager records the object ID and selector number of the object A (OID.Entry)= (2, 5) in the associative memory 2 maing the description (FooA.Image.RightCamera.0) of the observer side in the connection data as the key. In this connection, the object ID of this object A is notified from the operating system as the value 1.

Furthermore, in this case, the object B of the subject side notifies the service name according to the description identical to the description of the subject side (FooB.Image.RightCamera.S) and also notifies the selector number of the connection entry. In this connection, the selector number in this object B is to be 5.

As shown in FIG. 21 with the description of the object A, the object manager records the object ID of this object B and selector number (OID.Entry)=(1, 5) of this object B in the associative memory 2 making the description (FooB.Image.Right Camera.S) of the subject side as the key. In this connection, the object ID of this object B is informed from the operating system as the value 2.

When conducting DoConnect, the object manager separates the description of the subject side and the description of the object side from the connection data. Thus, the object manager separates the description of the connection data in order to correspond to the key (FooA.Image.RightCamera.0) stored in the associative memory 1 and one of various descriptions (FooA.Image.RightCamera.0) stored in the associative memory 1 by this key (FooA.Image.RightCamera.0).

Furthermore, the object manager retrieves the associative memory 2 according to these separated descriptions respectively, and detects the corresponding observer's object ID and selector number (1, 5) and the subject ID and selector number of the subject (2, 5).

This object manager transmits the message of the object ID and selector number (2, 5) to the object ID and selector number (1, 5) and starting the connect entry of the observer, and informs the subject information by the object ID and selector number (2, 5) to this connect entry. Moreover, the object manager starts the control entry of the subject side by the object ID and selector number (2, 5) from this connect entry and registers the object ID and selector number (1, 6) of the observer side (Notify in this case) to the control entry. At this point, the observer side obtains the selector number of Ready by the return value and registers this.

Thus, the object manager establishes the connection between objects by using the associative memories 1 and 2.

With this arrangement, when the connection is established between objects, the object manager stores the description of the subject side (FooB.Image.RightCamera.S) of the connection data in the associative memory 3, making the description of the server side (FooA.Image.RightCamera.0) of the connection side as the key. Moreover, it eliminates the description of the subject side (FooB.Image.RightCamera.S) making the description of the observer side (FooA.Image.RightCamera.0) as the key from the description of the associative memory.

Thus, the object manager registers and stores the observer and subject which are formed after the connection between objects is established in the associative memory 3 according to the description corresponding to the connection data.

On the other hand, at the time of DoDisconnect, the object manager disconnects the connection contrary to the DoConnect time, and eliminating the corresponding description recorded in the associative memory 3, re-records this in the associative memory 1, and cancels the corresponding description in the associative memory 2.

On the other hand, supposing that the connection data to be shown by the following equation would be notified by the design robot due to the change of the configuration dependent software.

$$FooB.Image.RightCamera.S.FooC.Image.RightCamera.0 \quad (6)$$

This connection data is the description for changing the observer to the object C in place of the object B. In this case, the object manager detects the object ID and selector number (1, 5) set to the observer from the associative memory 2 making FooA. Image.RightCamera.0 as the key. Furthermore, the object manager, as well as instructing DoDisconnect to the observer A by this object ID and selector number (1, 5), eliminates the corresponding description (the description of the object A and B, which are observer and subject) of the associative memory 2. And the object manager re-records the description in the associative memory 1 after eliminating the corresponding description recorded in the associative memory 3.

More specifically, the object manager eliminates the description of the object ID and selector number which are formed making FooA.Image.RightCamera.0, FooA.Image.RightCamera.S as the key from the associative memory 2. With this arrangement, the object manager can change the objects dynamically.

(2) Operation of the First Embodiment

According to the foregoing construction, in the robot 1 (FIG. 1), if legs are attached to the main unit 2 as a mobile unit 3, it becomes four-legged configuration and can walk with four legs driven by the motor attached to these legs. Moreover, if the tire is attached in place of the rear legs, it becomes the wheel type configuration and becomes movable by this wheel.

In the robot 1 (FIG. 2), the necessary control command is put out by the processing of the central processing unit 22 and the mobile unit 3 will be controlled based on the output of the sensor placed by legs such as robot components 24, 25 and 26 and information obtained by various information acquiring means placed on the head unit 2A.

In the robot 1 (FIG. 3 and FIG. 4), these control will be executed by driving various device drivers of the device driver by using the object-oriented software of the upper layer. In the robot system software of the upper layer of the device driver, each component connected to the serial bus will be detected by the virtual robot. And the CPC connection information showing which robot components and in what order these are connected, as the whole robot 1, will be informed to the design robot. Thus, the present configuration of the robot 1 is specified by the device connected to the serial bus, and furthermore, objects to be controlled forming the current configuration can be specified precisely.

In the robot 1, the software of the upper layer of this robot system software will be updated, and thus, the overall operations will be controlled by the suitable software corresponding to the configuration.

In updating the software, the robot 1 compares the design file formed by adding the label to the group of CPC primitive location information of each component and the CPC connection information to be informed from the virtual robot in each configuration by the design robot of the robot system software, and selects the appropriate object suited to the configuration. And the configuration dependent software according to this object will be updated (FIGS. 7 and 8). Thus, in the robot 1, the software can be changed to the appropriate software suited to the configuration simply and overall operations can be controlled.

Furthermore, the upper layer software is separated into the configuration independent software not dependent on the configuration of the robot and the configuration dependent software. Furthermore, under the condition in which the data to be handled by the format not depending on the configuration by the configuration independent software is converted to the format corresponding to the configuration by the configuration dependent software and received and/or transmitted between the robot system software, only this configuration dependent software will be updated. Thus, the software can be updated by simple processing.

Furthermore, at this point, in the virtual robot, the CPC primitive location information will be formed by the description of text data format (FIGS. 8 and 9). While in the design file, since the CPC primitive location information is described by the identical text data format, it can cope with easily even in the case where the configuration to be changed would be increased in future.

In the robot 1, the processing of the software updating is executed according to the reconstruction of objects of the configuration dependent software by the object manager. More specifically, when starting, the connection data specifying the object connection suited to the current configuration is informed to the object manager from the design robot, and the object to be specified by this connection data will be loaded (FIG. 16).

Moreover, after the object loaded is initialized, the subject and object are connected by the specification of connection data at the object manager so that data can be exchanged. Thus, in the robot 1, the configuration dependent software will be constructed by the object suited to the configuration.

Accordingly, in the robot 1, each object can be designed not considering the concrete object to be connected and software can be constructed. Moreover, since the connection data can be formed according to the configuration, the software suited to the configuration can be simply constructed. Also, the software can be changed without conducting the recompilation and relinkage processing. Thus, in the robot 1, the independence of object can be remarkably increased as compared with the conventional device, and the software suited to free configuration changes can be provided simply and swiftly. Moreover, the object-to-object communication can be constructed between one object and the plural number of objects by setting the connection data.

Since this connection data is the data to specify the format of data to communicate with the subject, the object manager can construct the object-to-object communication specifying the corresponding object ID, selector number corresponding by this connection data.

Furthermore, the design robot, by selecting the connection data from the design file in which multiple connection data are recorded and providing to the object manager, the software compatible with various configurations can be constructed as occasion demands by this design setting.

Furthermore, since this connection data is described in the text data format, this can be changed to various formats simply.

On the other hand, when the configuration is changed, the configuration change is detected by the virtual robot in the robot 1. And the CPC connection information relating to this changed configuration is informed to the design robot. Moreover, in this design robot, the connection information associated with the configuration changed will be formed based the comparison with the design file. Moreover, according to this connection data objects which become unnecessary due to the change of configuration will be unloaded by the object manager and the objects which become necessary due to the change of configuration will be loaded, and the objects comprising the configuration dependent software will be reconstructed. Moreover, these objects will be connected so that the object-to-object communication becomes possible according to the connection data and thus, the configuration dependent software will be updated.

With the above arrangements, in the robot 1, the configuration dependent software can be updated as occasion demands and the software suited to the configuration can be constructed under the condition in which the configuration independent software is in operation. Also, it becomes possible that this software change would be applied to the shifting of electric power consumption mode.

(3) Effects of the First Embodiment

According to the foregoing construction, comparing the connection data that is a result of component detection and the design file consisting of a set of data corresponding to the component detection result per each configuration, and changing the software according to the configuration based on said comparison result, the software can be changed corresponding to the change of configuration accompanied by the change of components. And thus, the suitable software corresponding to the current configuration can be set simply.

At this point, by changing the software according to the change of objects, the software can be changed with the simple processing.

Furthermore, since the upper rank software is formed by the configuration dependent software and the configuration independent software and the software is changed corresponding to the configuration by the change of configuration dependent software, the software suited to the configuration can be provided simply.

Furthermore, since the data corresponding to the components detection result is the description by the text data, even in the case where the configuration to be changed would be increased in future, it becomes possible to cope with the case easily.

Furthermore, according to the foregoing construction in the robot of which components are exchanged and the configuration can be changed, the object manager connects objects so that data exchange is possible. Thereby, the independence of object can be improved as compared with the past and the software can be changed suited to the configuration with facility. Moreover, the software can be changed simply without conducting the recompilation and relinkage. Also by setting the connection data, the object-to-object communication can be constructed between one object and the plural number of objects.

At this point, since the connection data is the information for specifying the object and the format of data to communicate, these objects can be connected easily.

Furthermore, since the connection data are selected from the design file in which multiple connection data are recorded and objects are connected, the software suited to the configuration can be simply provided by setting this design file.

Furthermore, according to the connection data, by constructing the object-to-object communication by connecting objects after separating the connection between corresponding objects, the software can be updated as required and the software suited to the configuration can be constructed under the condition in which the software is in action.

Moreover, by detecting components by the virtual robot and providing the connection data, the software can be changed corresponding to the configuration.

Moreover, since the connection is described by the text data, suitable software corresponding to the configuration can be formed simply and swiftly.

Furthermore, by exchanging data using Ready and Notify among objects to communicate data, the supply of data exceeding the processing capacity can be prevented.

(4) The Second Embodiment

In the operating system for processing the command such as DoInit described above by the Call command, the processing is handed over to the output destination by outputting the command. And thus, the object manager blocks the message to be transmitted from each object until Reply is returned from the destination. Accordingly, as described above in FIG. 16, it becomes difficult to register the entry as the subject (Control) and the entry as the object (Connect) at the object manager after transmitting DoInit.

Figure 22:
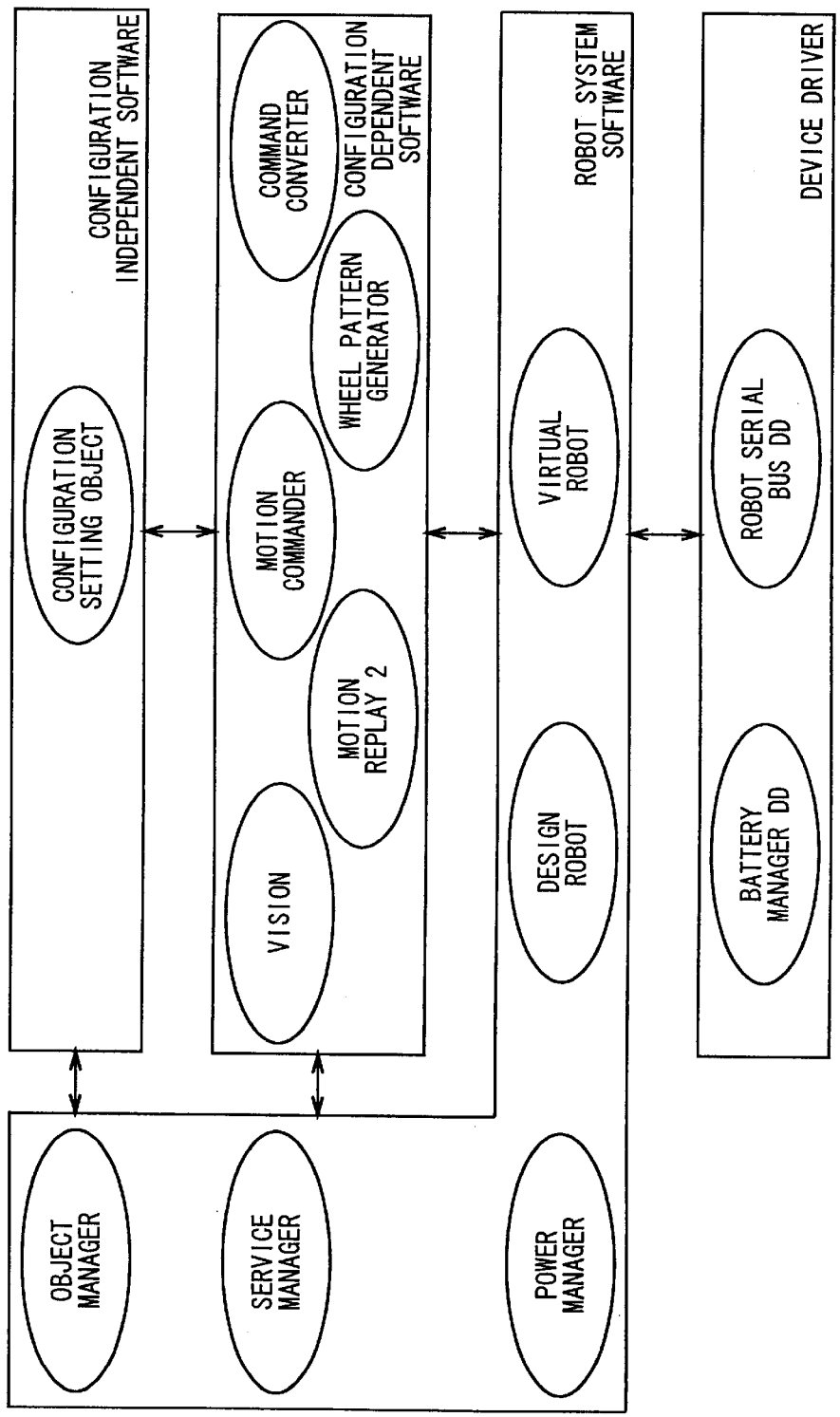
FIG. 22 is a schematic diagram showing the construction of software in the tired type robot according to the second embodiment of the present invention.

Therefore, in the robot according to this embodiment, as shown in FIG. 22 comparing with FIG. 4, these entries (Control, Connect) are registered in the service manager, and the service manager controls the object-to-object communication. On the other hand, the object manager executes only the processing such as loading and unloading of the object. More specifically, according to this embodiment the object manager instructs to stop operations, release the connection for the object-to-object communication, to destroy the object and to release the resource onto all objects forming the configuration-dependent software. And furthermore, the object manager instructs the loading and initialization of the newly required objects and start of the object. On the other hand, the service manager controls the information of the communicating party in the object-to-object communication.

Since this embodiment is the same as the first embodiment except those of the construction of the object manager and service manager and each component related to said construction, we will concentrate on the construction of object manager and service manager in the following explanations and eliminate the duplication.

Figure 23:
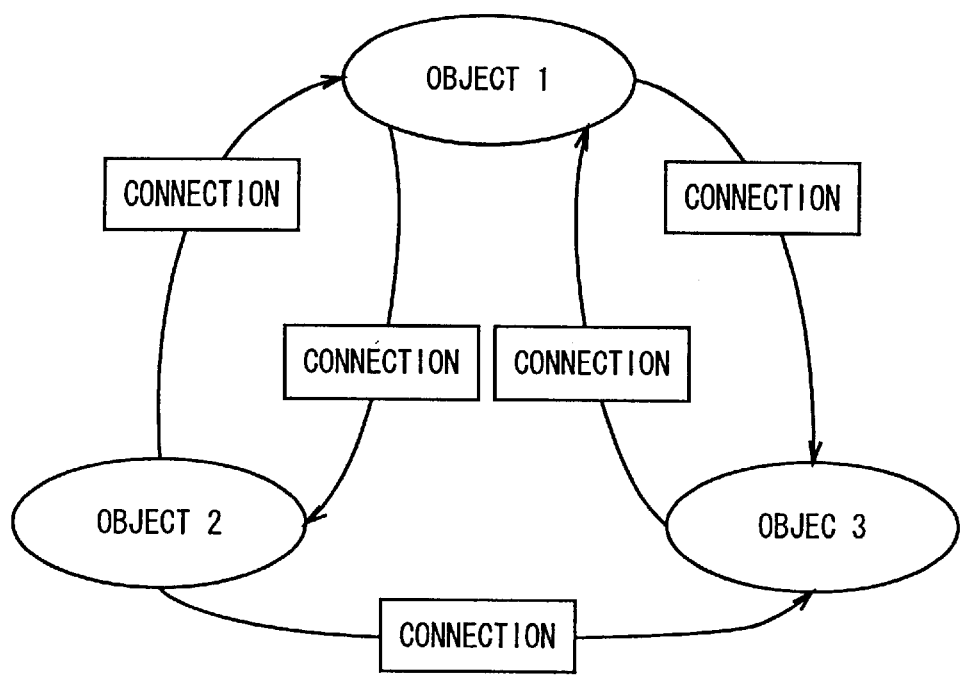
FIG. 23 is a schematic diagram showing the connection of objects.
Figure 24:
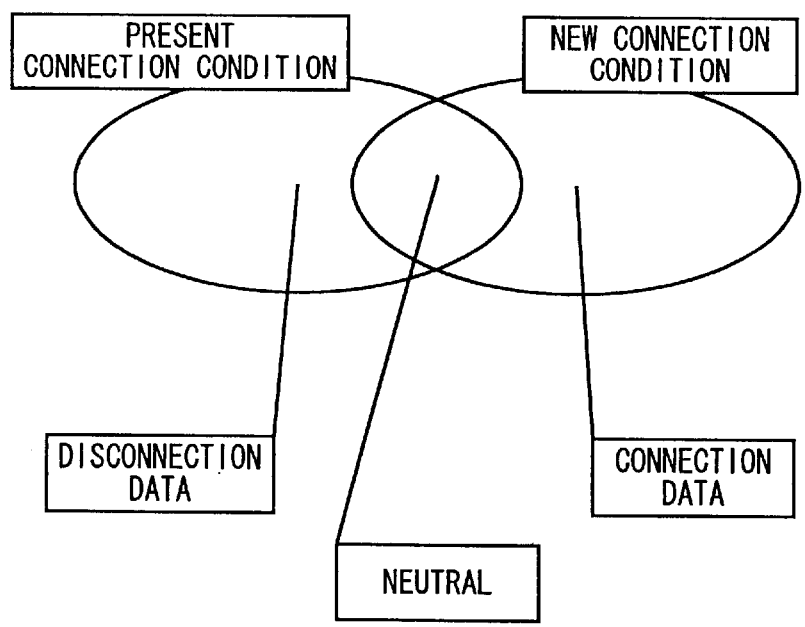
FIG. 24 is a schematic diagram showing the change of connection condition relating to the change of configuration.

According to this embodiment as shown in FIG. 23, the connection between objects means the connection for receiving/transmitting data between objects and is expressed as the connection between services of both sides that conduct communication. Moreover, as described in EQUATION (5) the connection is expressed as the service of the data output side, the service of the data input side, and communicating data type, and the data flow direction. Moreover, as shown in FIG. 24, the connection condition means that a group of connections set up among objects in a group of objects loaded in the robotic system. And the connection data means that the data of connection newly set up among objects when the configuration is changed at the time of starting, and it is the differential data between the current connection condition and the new connection condition. Moreover, the disconnection data means the connection data that becomes unnecessary when the configuration is changed and this is the differential data between the new connection condition and the current connection condition.

Figure 25:
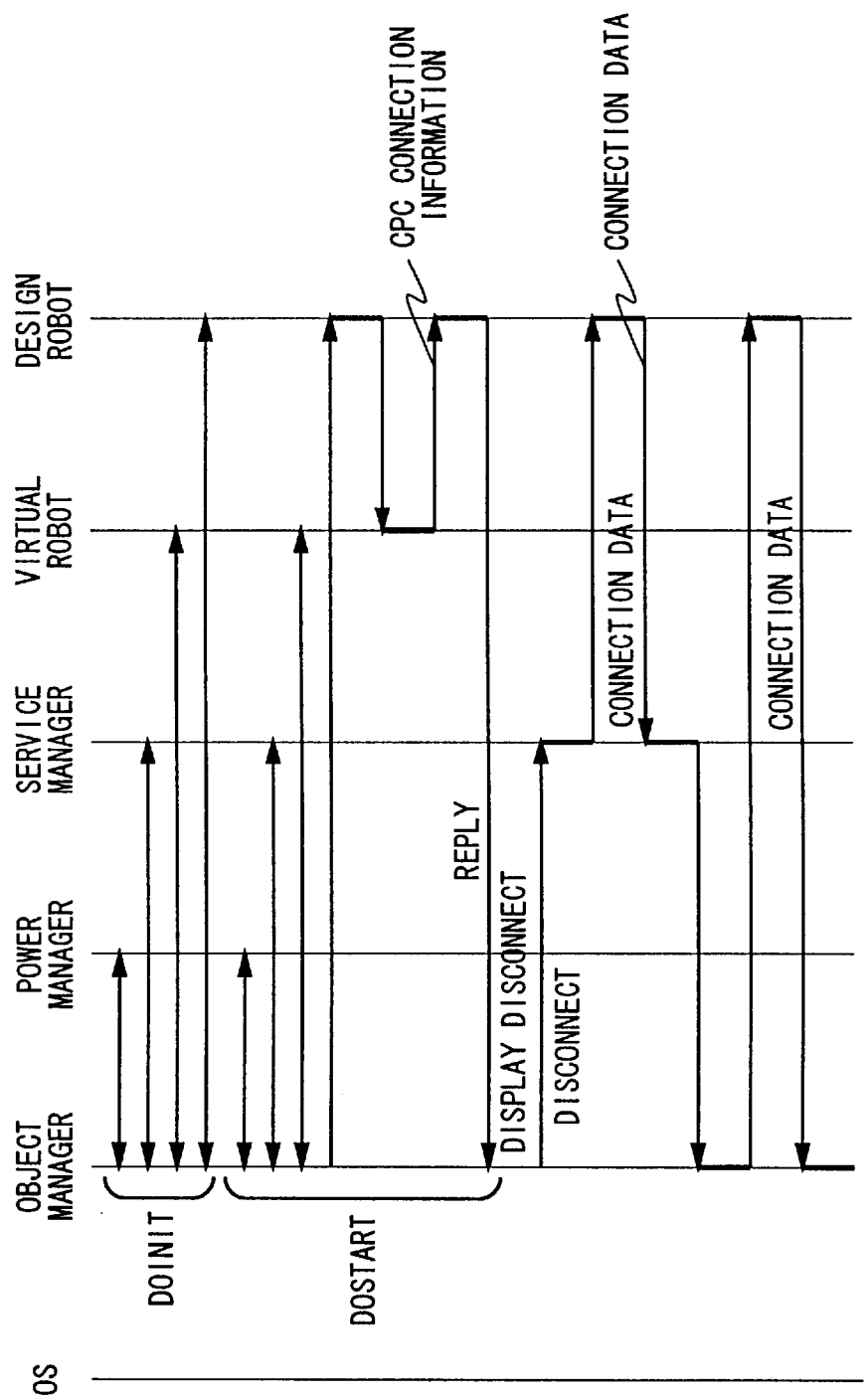
FIG. 25 is a time chart showing the processing procedure at the start time in the robot of FIG. 22.
Figure 26:
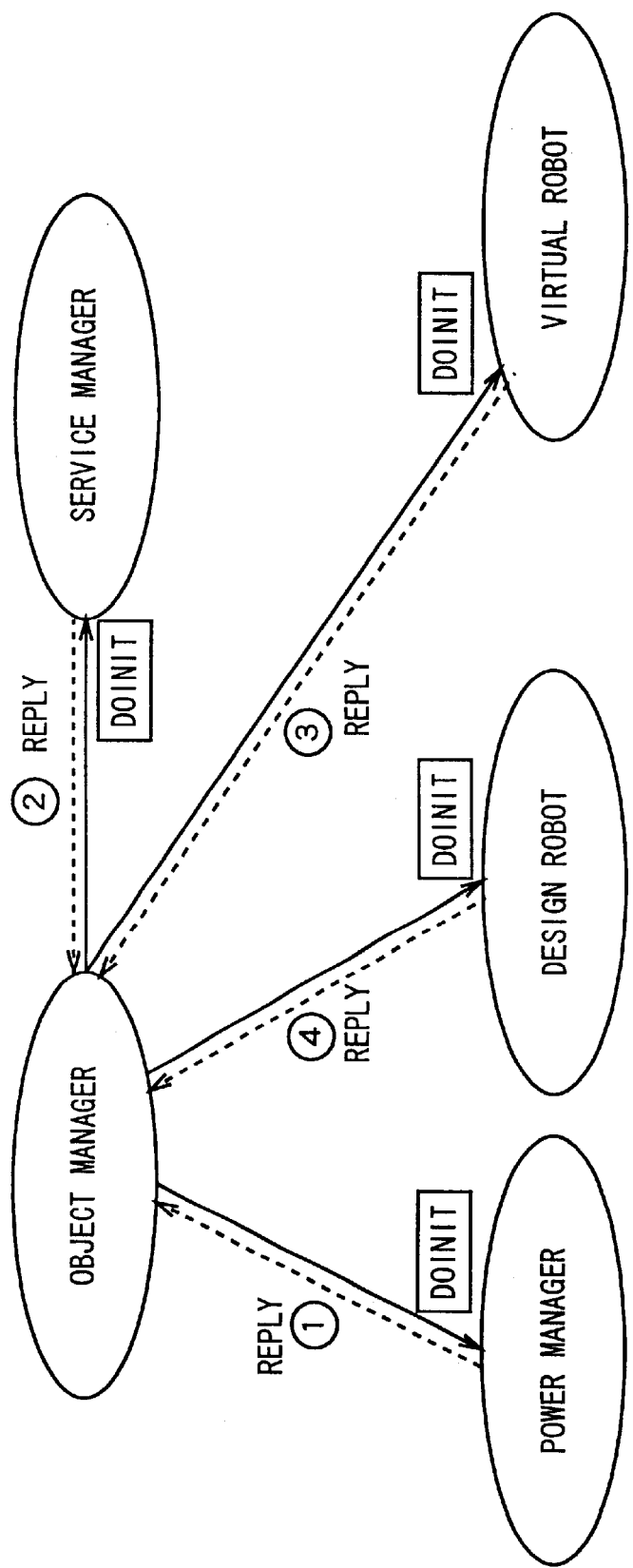
FIG. 26 is a schematic diagram illustrating the explanation of initialization in the processing of FIG. 25.

FIG. 25 is a time chart showing the processing at the time of starting the robotic system software related to this embodiment in comparison with FIG. 10. When the electric power source is entered, or reset, firstly the processing of initialization will be executed to each object forming the robotic system software. More specifically, in the robot, as shown in FIG. 26, the transmission of DoInit and the reception of Reply will be repeated from the object manager to the power manager, service manager, virtual robot and the design robot in that order. And thus, the phase of DoInitialize in the robotic system software will be executed. In the following paragraphs the processings order will be shown in numbers on the figures.

Figure 27:
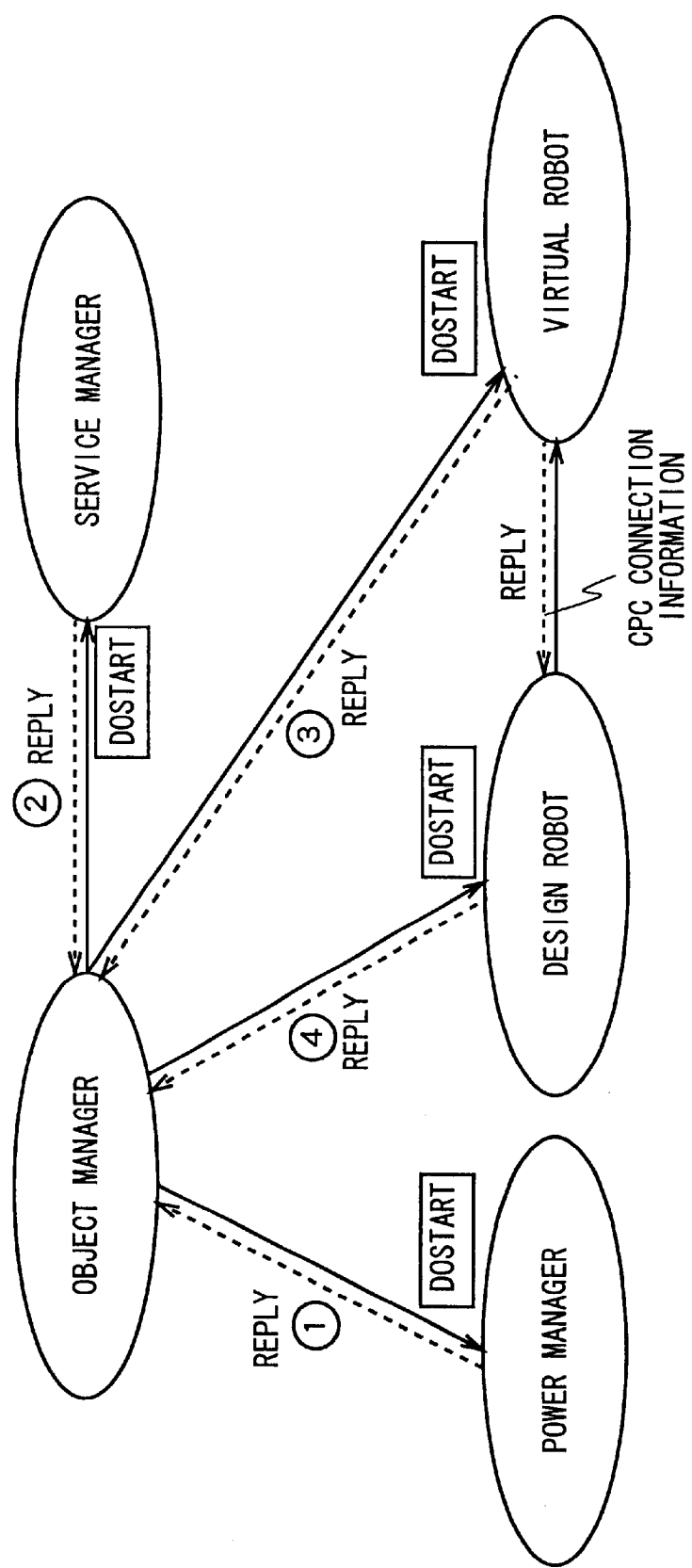
FIG. 27 is a schematic diagram illustrating the explanation of start in the processing of FIG. 25.

Furthermore, as shown in FIG. 27, DoStart is transmitted to the power manager, service manager, virtual robot and the design robot successively in that order from the object manager. And thus, the phase of DoStart in the robotic system software is executed and these power manager, service manager, etc. will start the operations.

At this point, the design robot instructs the output of information showing the current configuration of robot to the virtual robot by sending DoStart. And the virtual robot informs the CPC connection information showing that the robot components are connected in which order to the design robot. The design robot receives this CPC connection information from the virtual robot, and after forming the connection data from this CPC connection information, returns Reply to the object manager.

Accordingly, when the phase of DoStart is executed, a command of DisConnect is issued to the service manager from the object manager in the robot. At the time of starting, since no object is loaded, the service manager obtains the connection data from the design robot according to this command and informs the completion of processing to the object manager. And similarly, the object manager obtains the connection data from the design robot. Thus, the service manager obtains information necessary for the communication between objects on each object forming the configuration dependent software. On the other hand, the object manager obtains information necessary for loading and unloading these objects.

Figure 28:
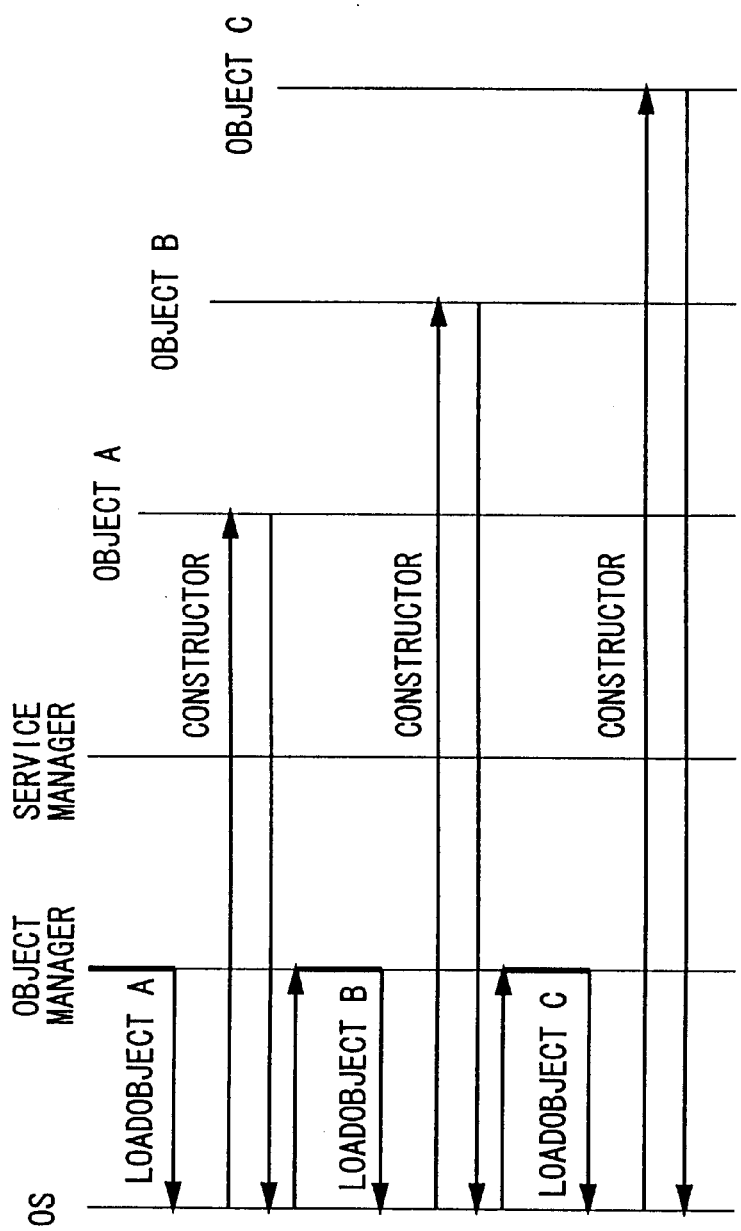
FIG. 28 is a time chart showing the processing procedure continued from FIG. 25.
Figure 29:
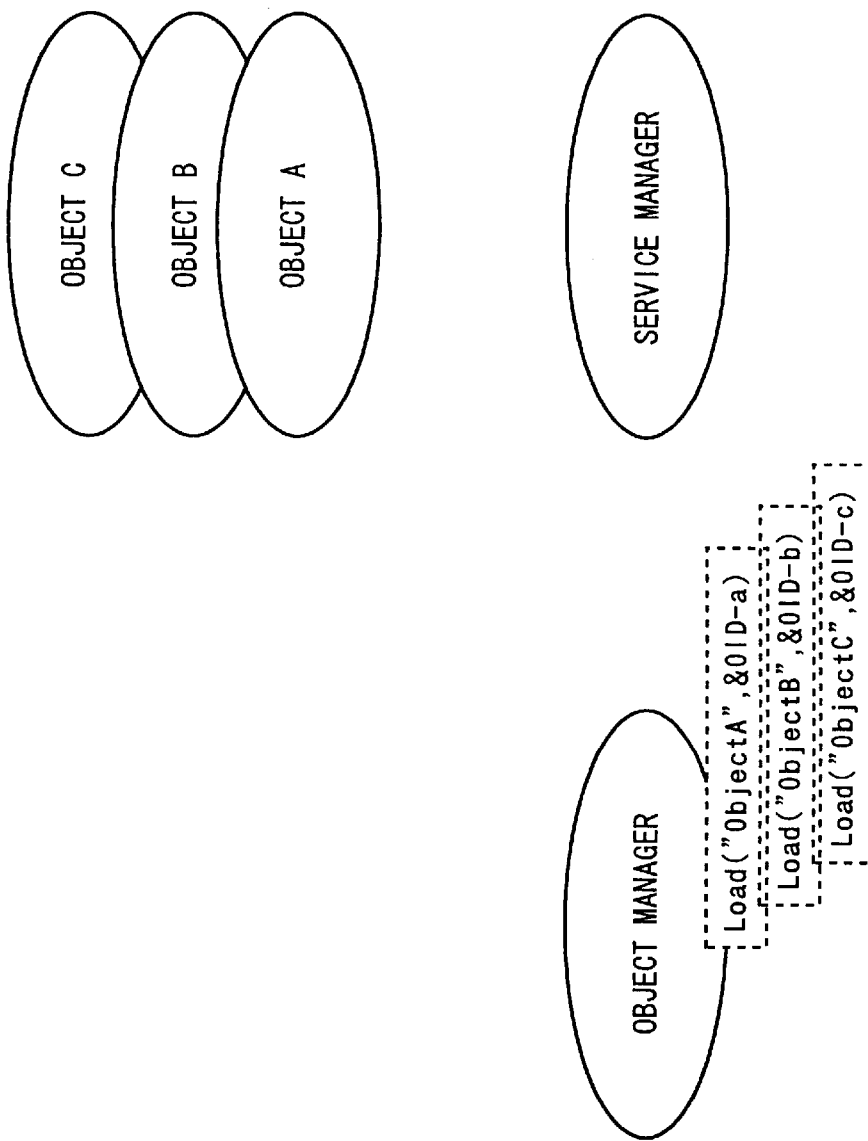
FIG. 29 is a schematic diagram illustrating the loading of object in the processing of FIG. 28.

Thus, the object manager forms a list of necessary objects corresponding to the current configuration and unnecessary objects. Moreover, as shown in FIG. 28, the object manager specifies the loading of these necessary objects A~C and builds up these object A~C. At this point, the object manager obtains object ID (OID-a, OID-b, OID-c) of each object by executing this load command as shown in FIG. 29.

Figure 30:
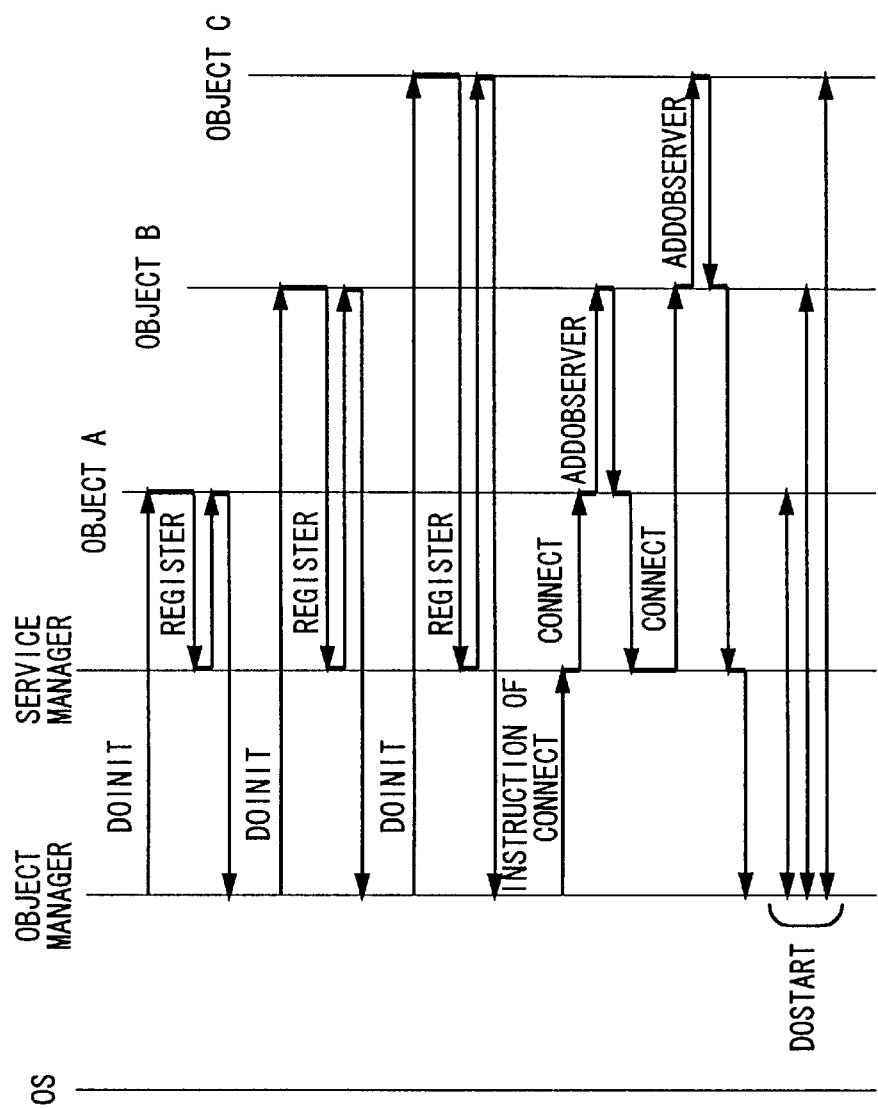
FIG. 30 is a time chart showing the processing procedure continued from FIG. 28.
Figure 31:
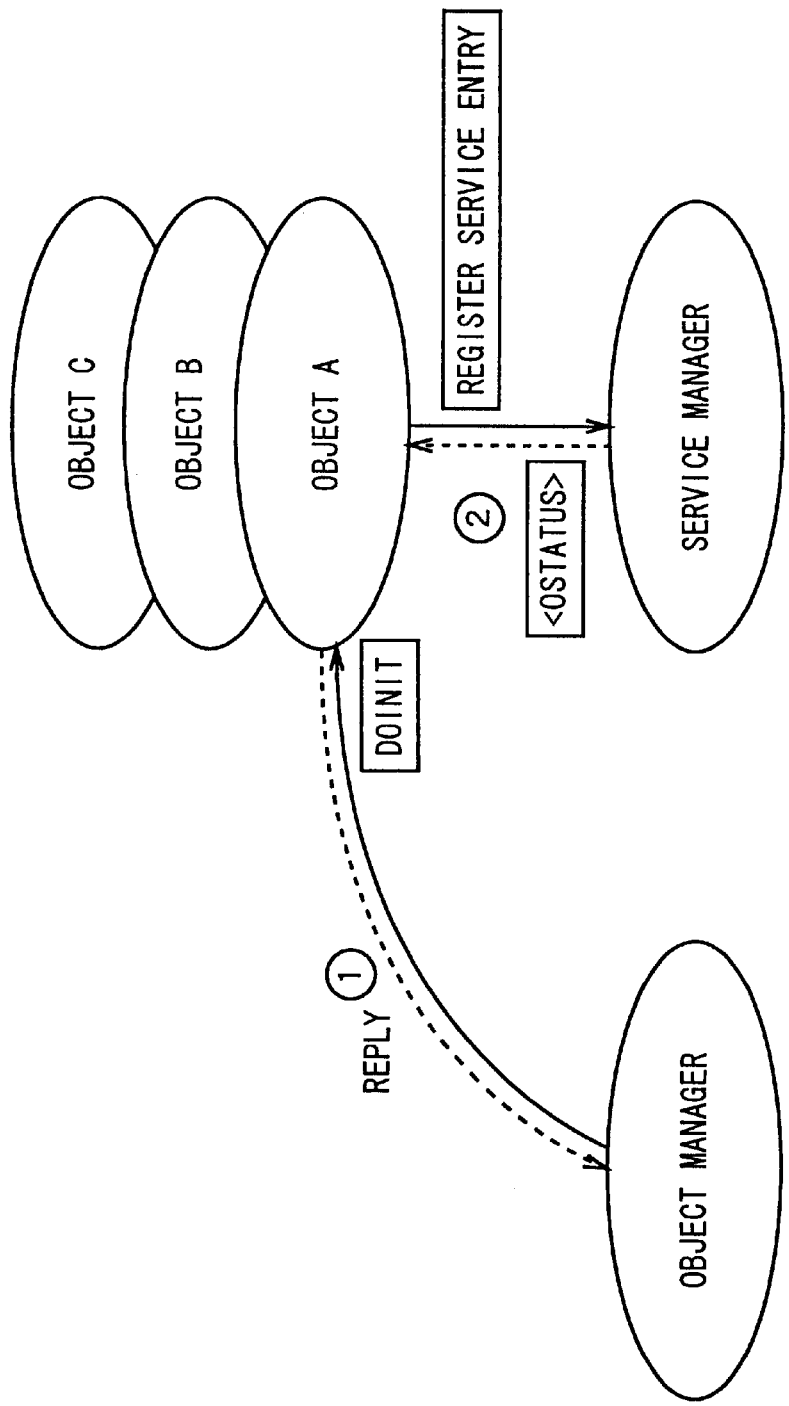
FIG. 31 is a schematic diagram illustrating the connect in the processing of FIG. 30.

Then next, as shown in FIGS. 30 and 31, the object manager calls DoInit successively to each object by the object ID thus obtained. Each object requests the registration of each service to the service manager by this DoInit. Here, this service registration will be executed by the registration of each service name, object ID and selector.

When the service manager registers the service of each object in response to the request of each object, informs the completion of registration to each object. And each object returns Reply to the object manager responding to this notice.

Figure 32:
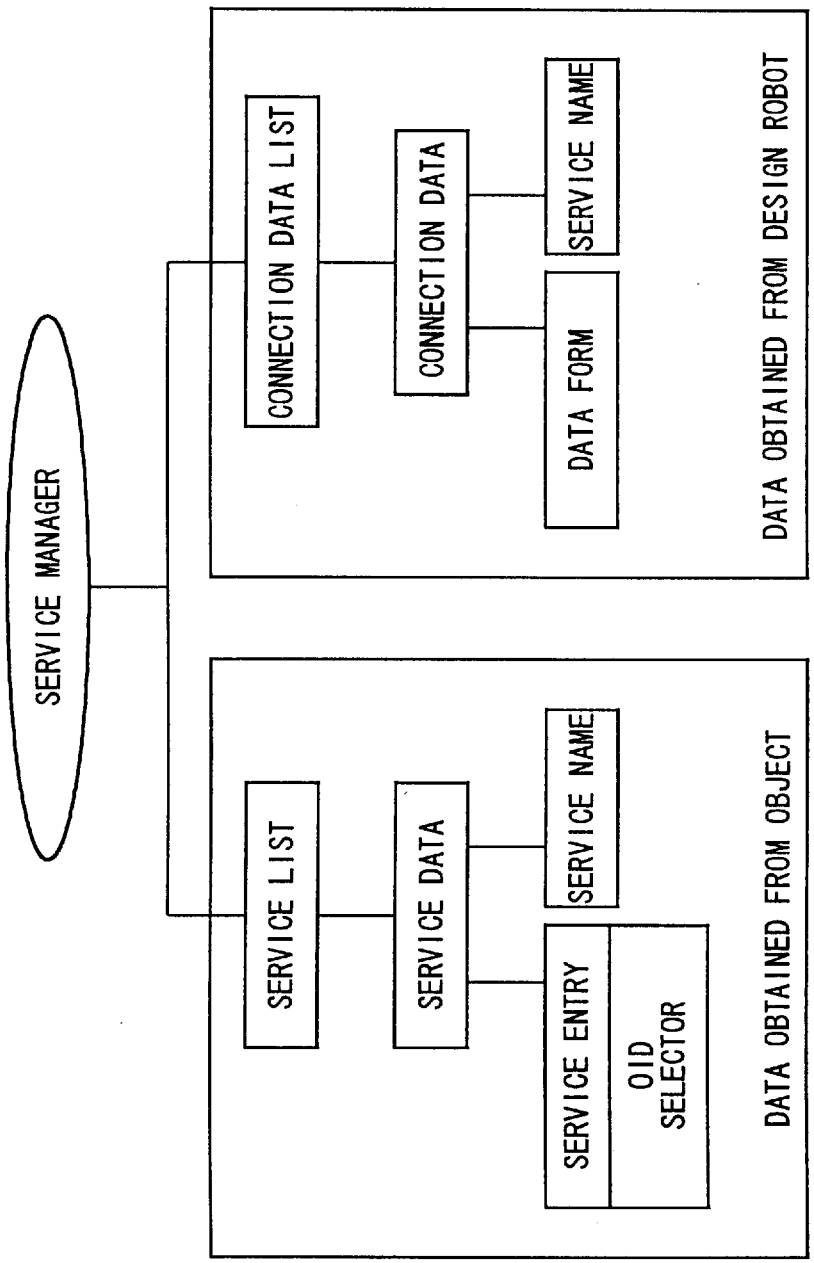
FIG. 32 is a diagram showing the data in the service manager.

When the initialization of each object is completed according to the arrangement described above, the object manager instructs DisConnect of each object to the service manage. At this point, as shown in FIG. 32, the service manager, by obtaining the connection data that the design robot obtained at the DoStart phase, forms a list and stores this. This list consists of the list related to Connect, the list related to DisConnect, and each list consists of the service name of each object and data form according to the connection data described above on the first embodiment. Moreover, the service manager holds the service obtained by DoInit of each object in the service list. Here, this service list is compiled and formed as the service information in each object, and each service is comprised of object ID related to each service, service entry by the selector and the name of each service.

Figure 33:
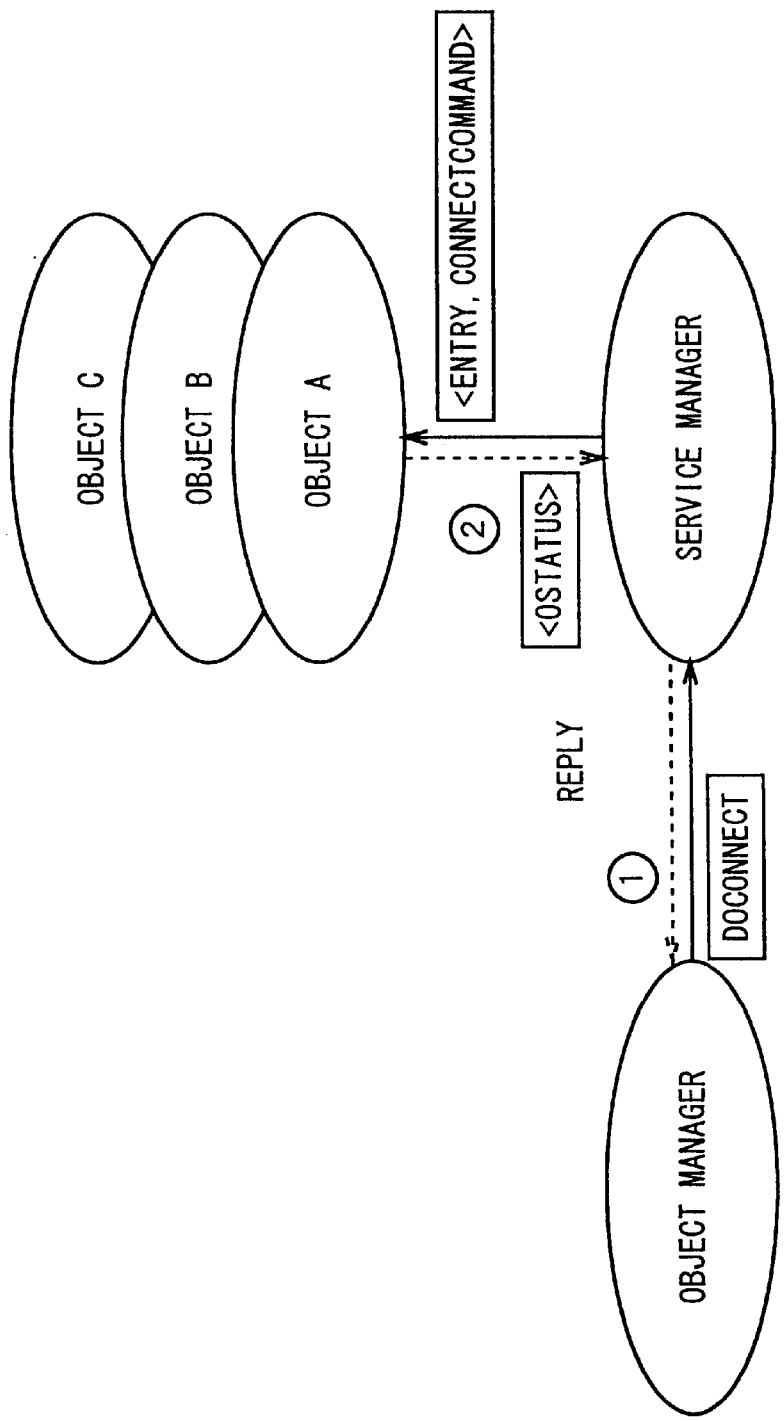
FIG. 33 is a schematic diagram illustrating the processing continued from FIG. 31.

As shown in FIG. 33, when the Connect of objects is instructed by the object manager, the service manager refers the service data obtained from each object and the connection data obtained from the design robot. Furthermore, based on this reference result, the service manager sequentially registers the object to be communicated to each object and successively connects each object so that data communication becomes possible.

Figure 34:
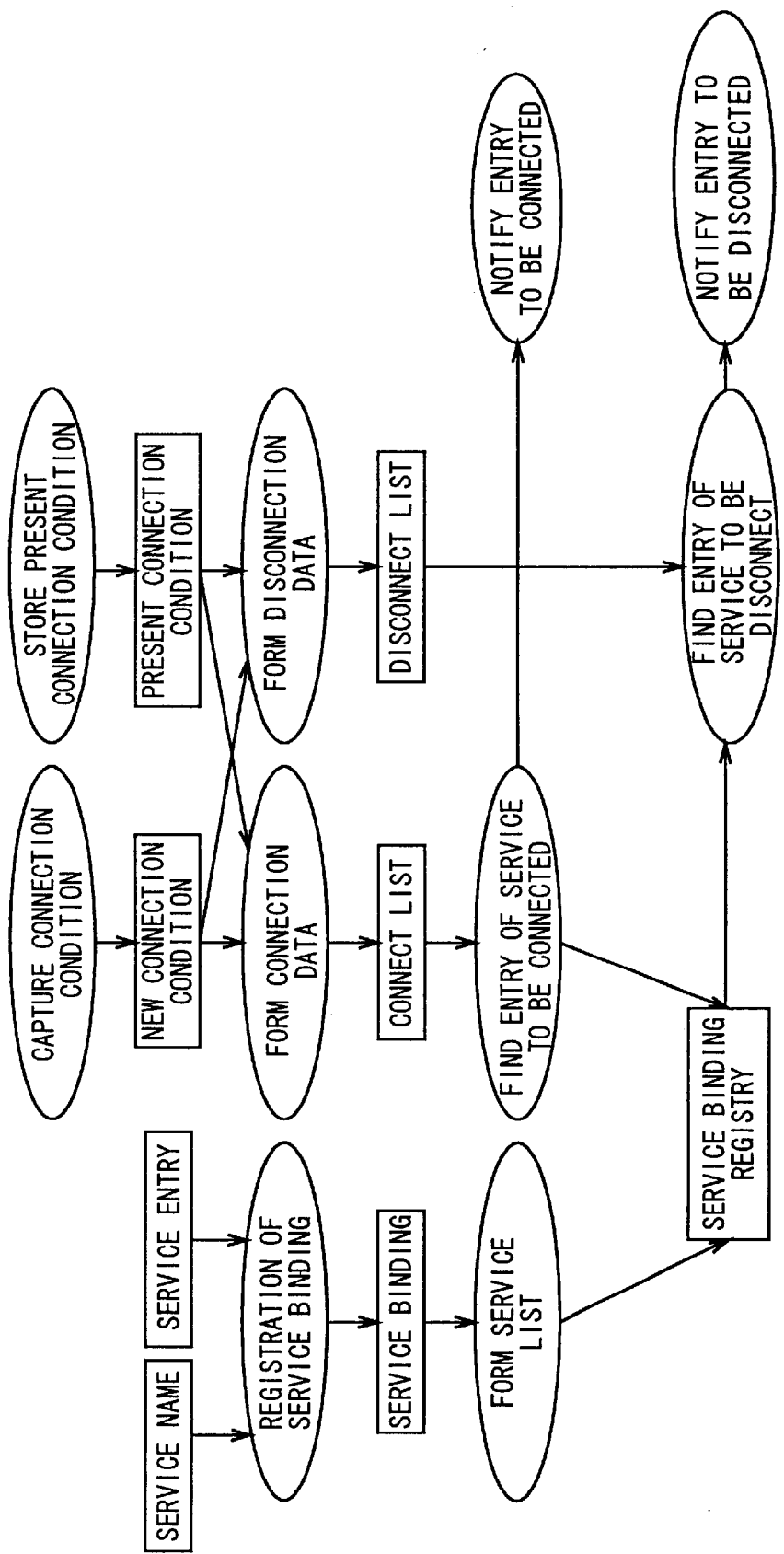
FIG. 34 is a schematic diagram illustrating the processing of the service manager.

More specifically, as shown in FIG. 34, when the service is registered from each object, the service manager forms service data binding the service name of each service and the service information by the service entry in each object and registers this service binding. Thus, the service manager forms a service list. And the service manager, by grasping new connection condition and the current connection condition from the connection data obtained from the design robot and the connection data recorded in the past, forms the connection data and disconnection data. Furthermore, the service manager forms the list related to Connect and the list related to DisConnect from the connection data and disconnection data.

Figure 35:
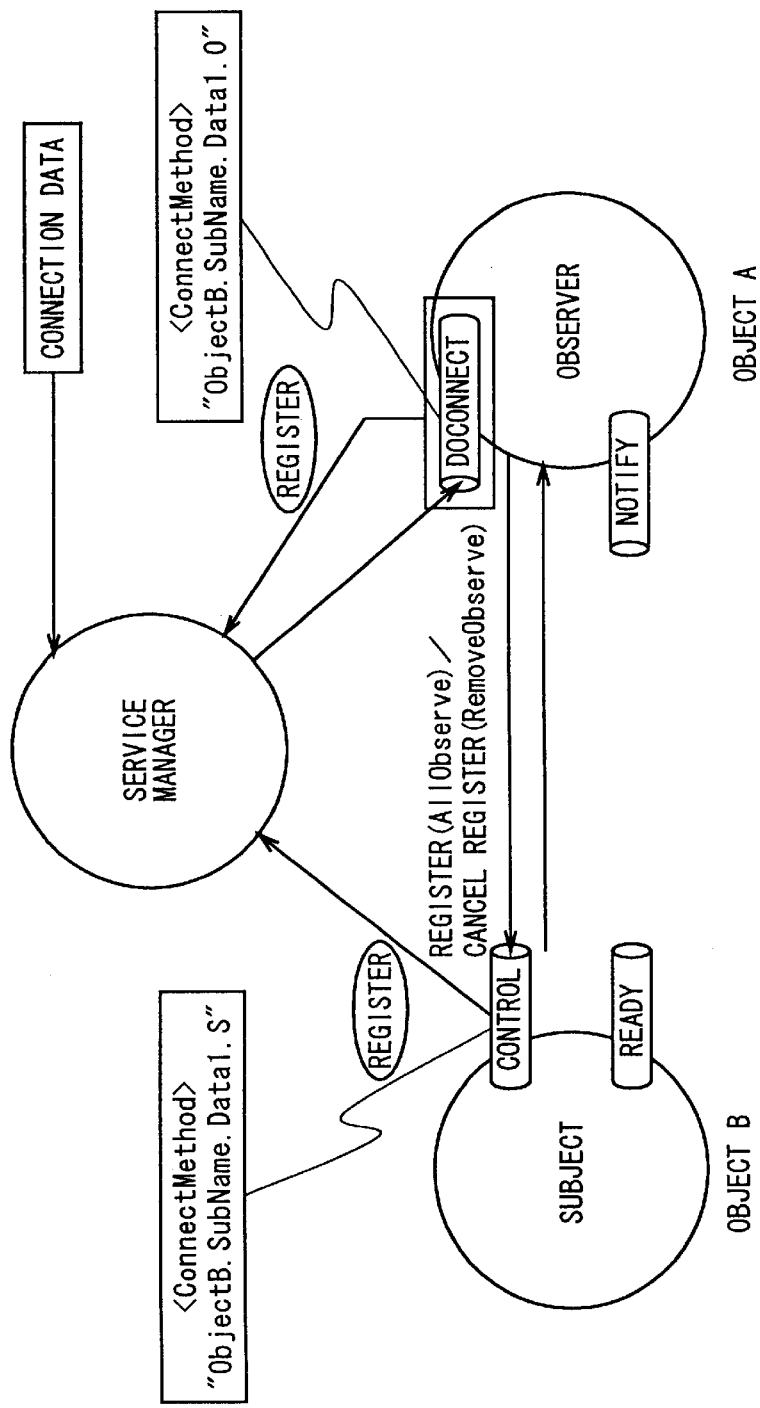
FIG. 35 is a schematic diagram illustrating the connection of objects.
Figure 36:
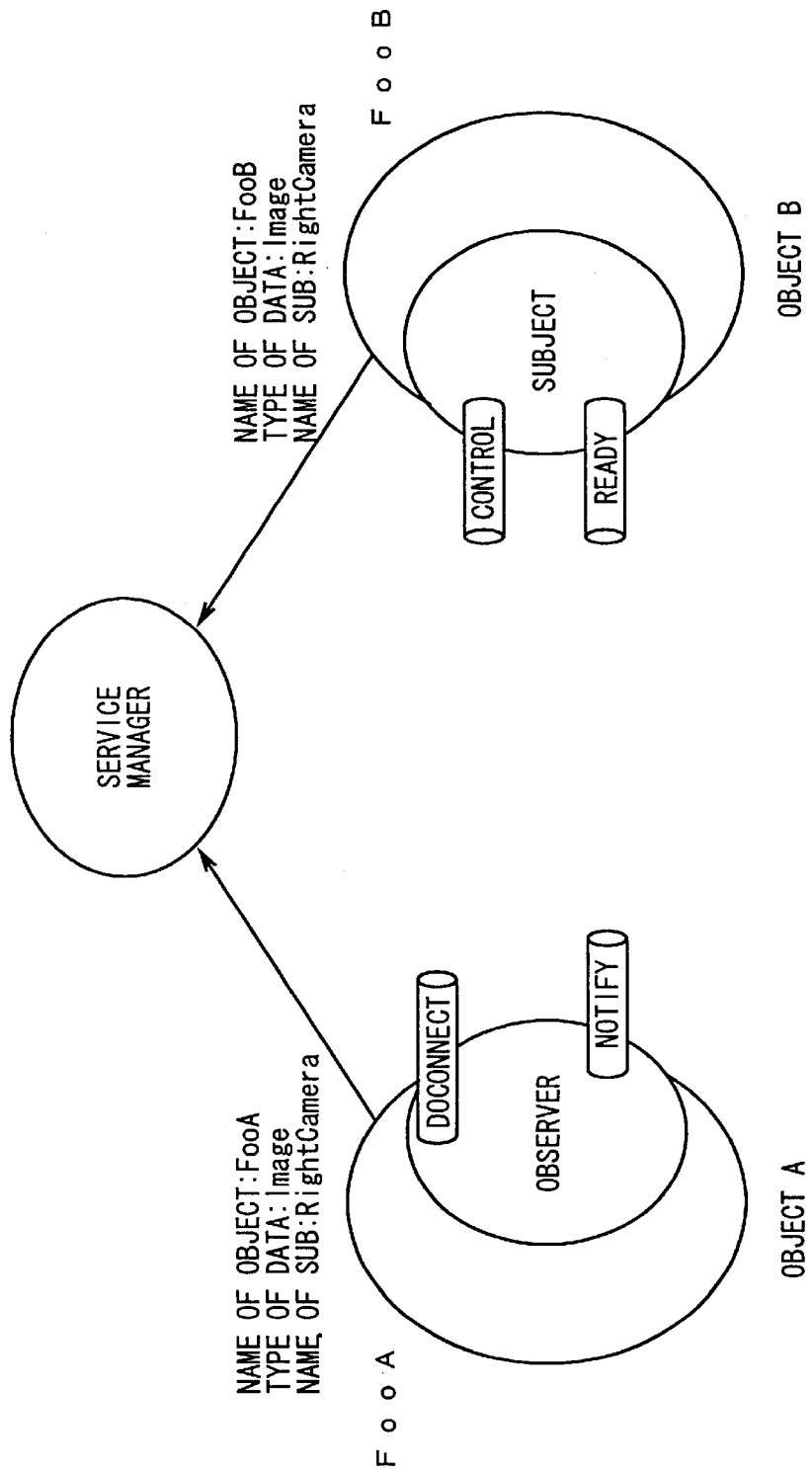
FIG. 36 is a schematic diagram illustrating the connection data and the relation between the observer and the subject comparing with FIG. 19.

The service manager detects the entry of service to be connected by referring to the service list and the list related to Connect, and based on this detection result, the service manager notifies the entry of service to the corresponding object. Also by referring the service list and the list related to DisConnect, the service manager detects the entry of service to disconnect the connection and according to this detection result, it notifies the entry of service to the corresponding object. In this connection, in FIG. 30, since the processing is the processing at the starting time when objects are not yet connected, the service manager conducts a series of processings without forming the disconnect information. Thus, as shown in FIG. 35, the service manager connects the method so that data can be exchanged between the observer and the subject. FIG. 36 is a schematic diagram showing the object A and the object B thus connected in comparison with FIG. 19.

Figure 38:
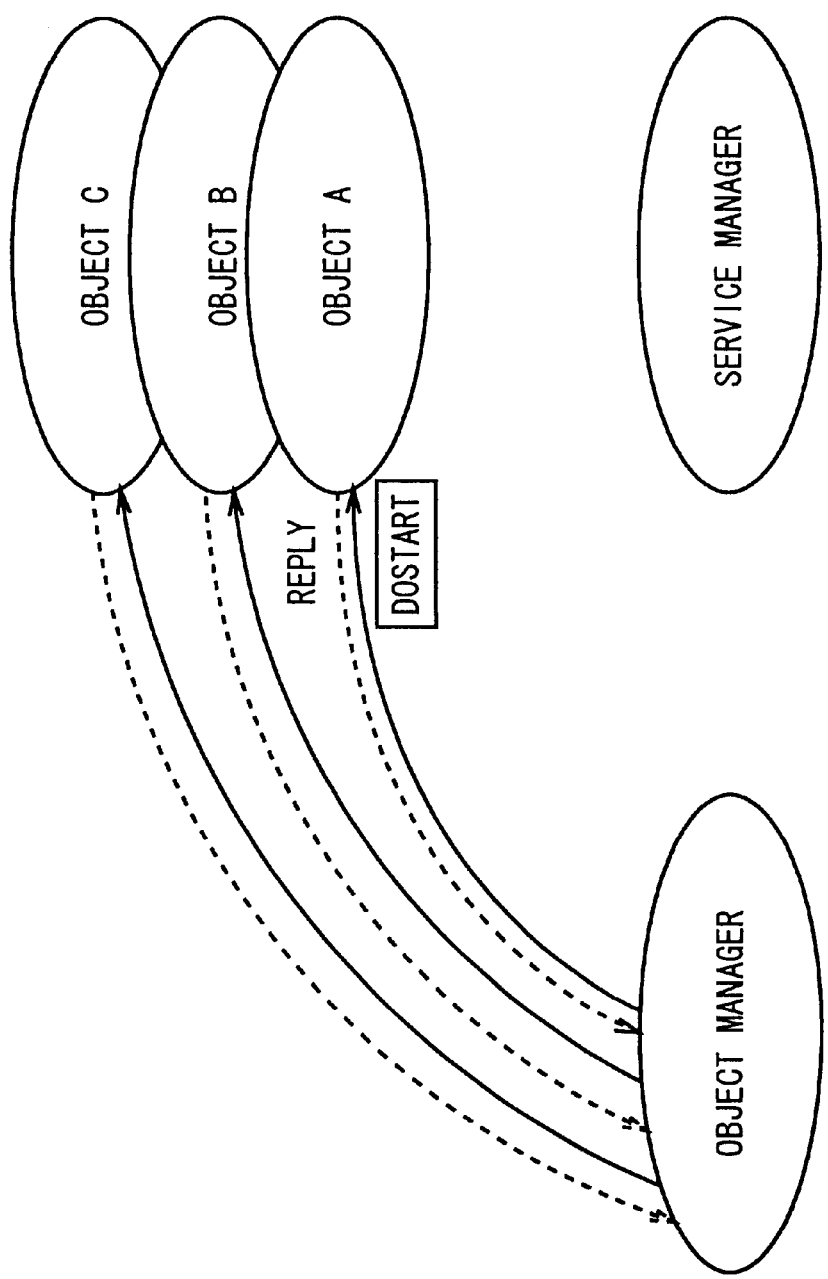
FIG. 38 is a schematic diagram illustrating Start in FIG. 30.

Then, when the connection by connection information is completed, the service manager notifies the connection completion to the object manager (FIG. 30). When the object manager obtains this notice, instructs DoStart to each object as shown in FIG. 38. Thus, as shown in FIG. 38 comparing with FIG. 28, each object A C starts the operation so that data can be communicated after being connected. And thus, in the robot, varous operations can be executed corresponding to the configuration based on the data communication between objects.

Figure 39:
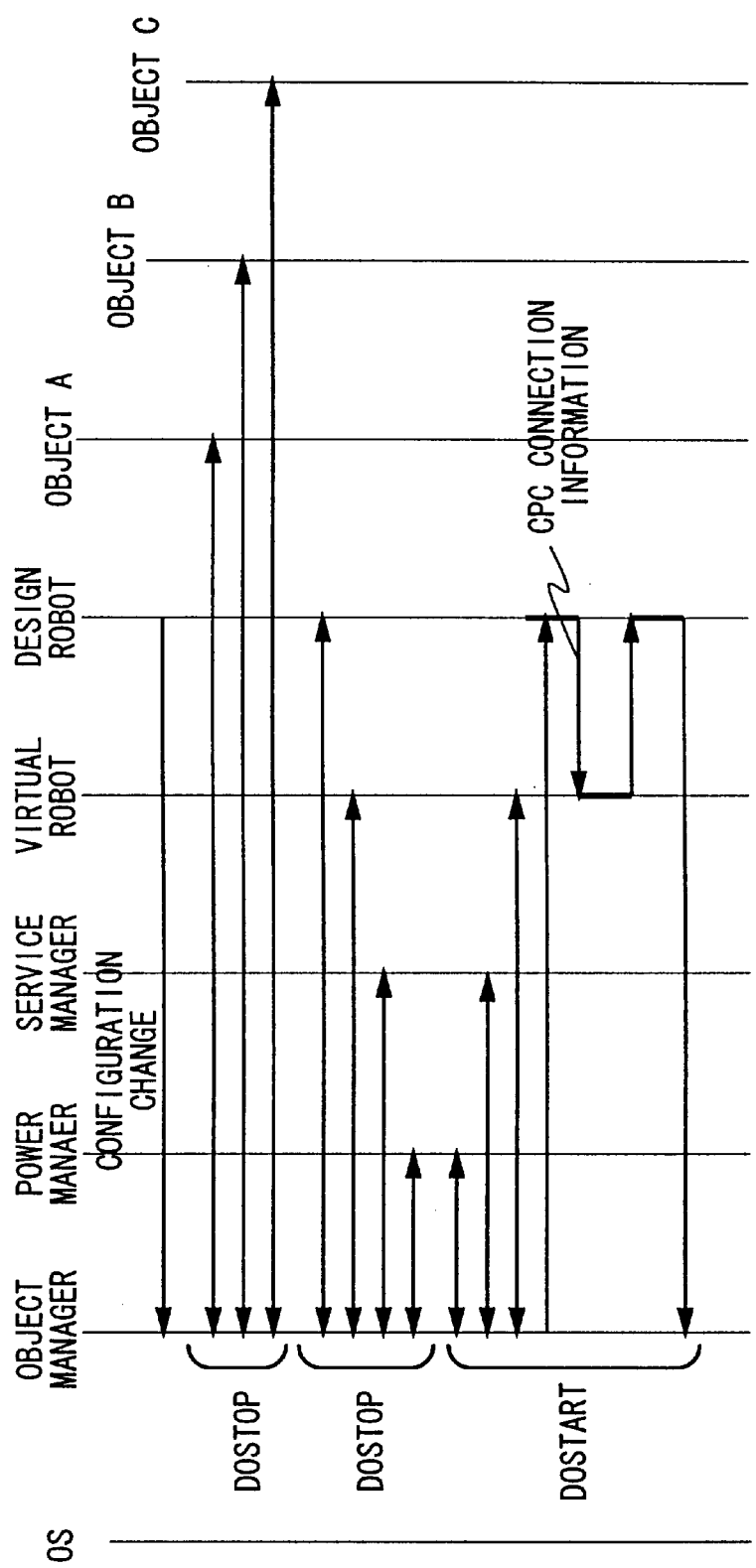
FIG. 39 is a time chart showing the processing at the time of configuration change in the robot of FIG. 22.
Figure 40:
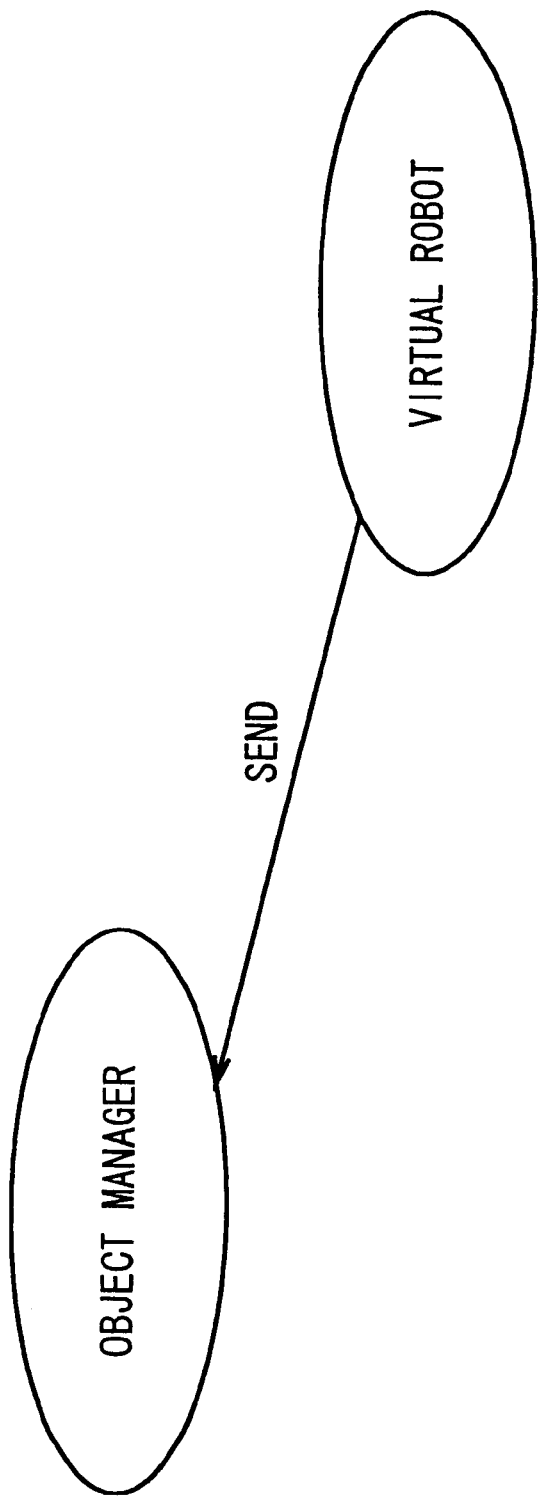
FIG. 40 is a schematic diagram showing the notice of configuration change in the processing of FIG. 39.
Figure 41:
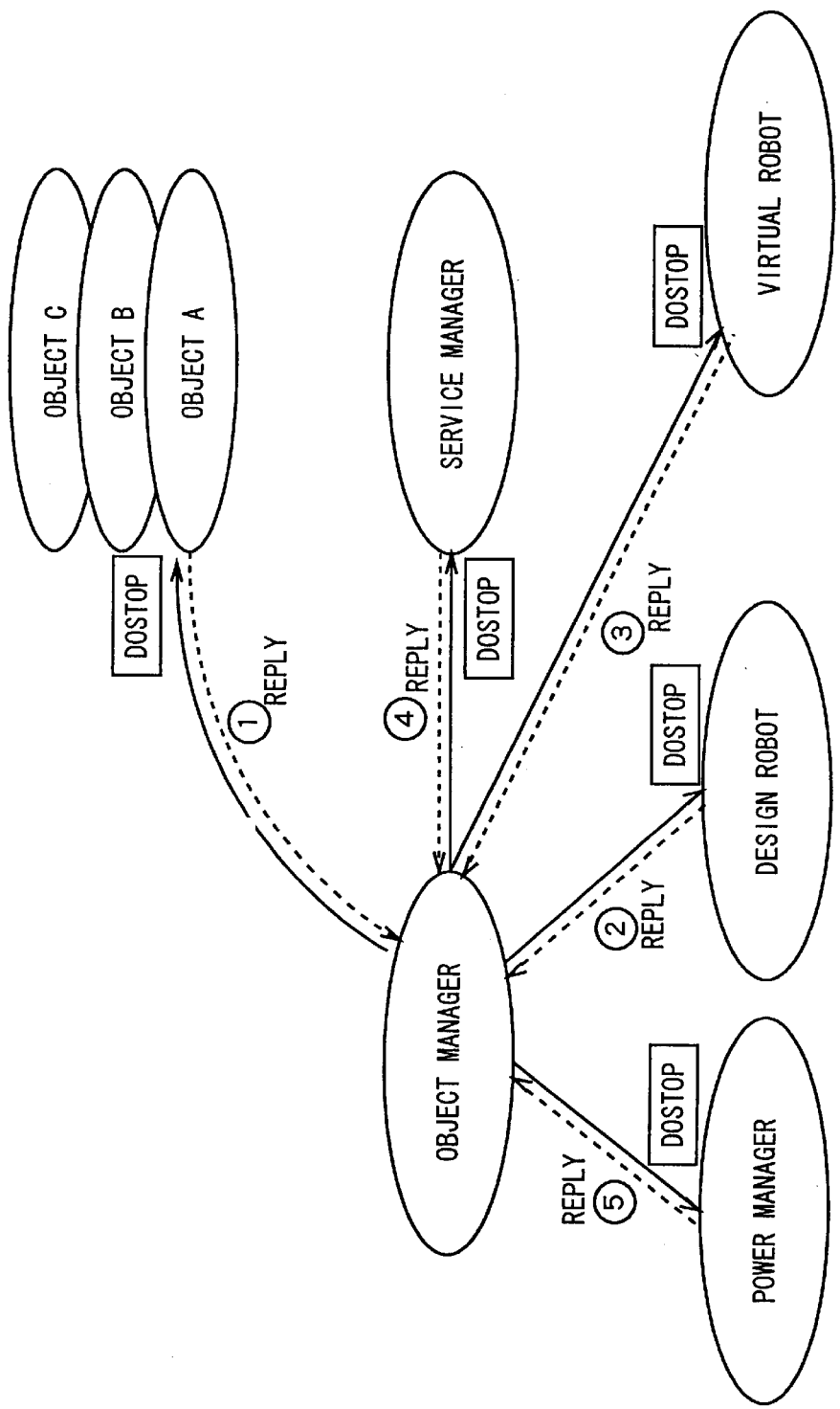
FIG. 41 is a schematic diagram showing the processing of Stop in the processing of FIG. 39.
Figure 42:
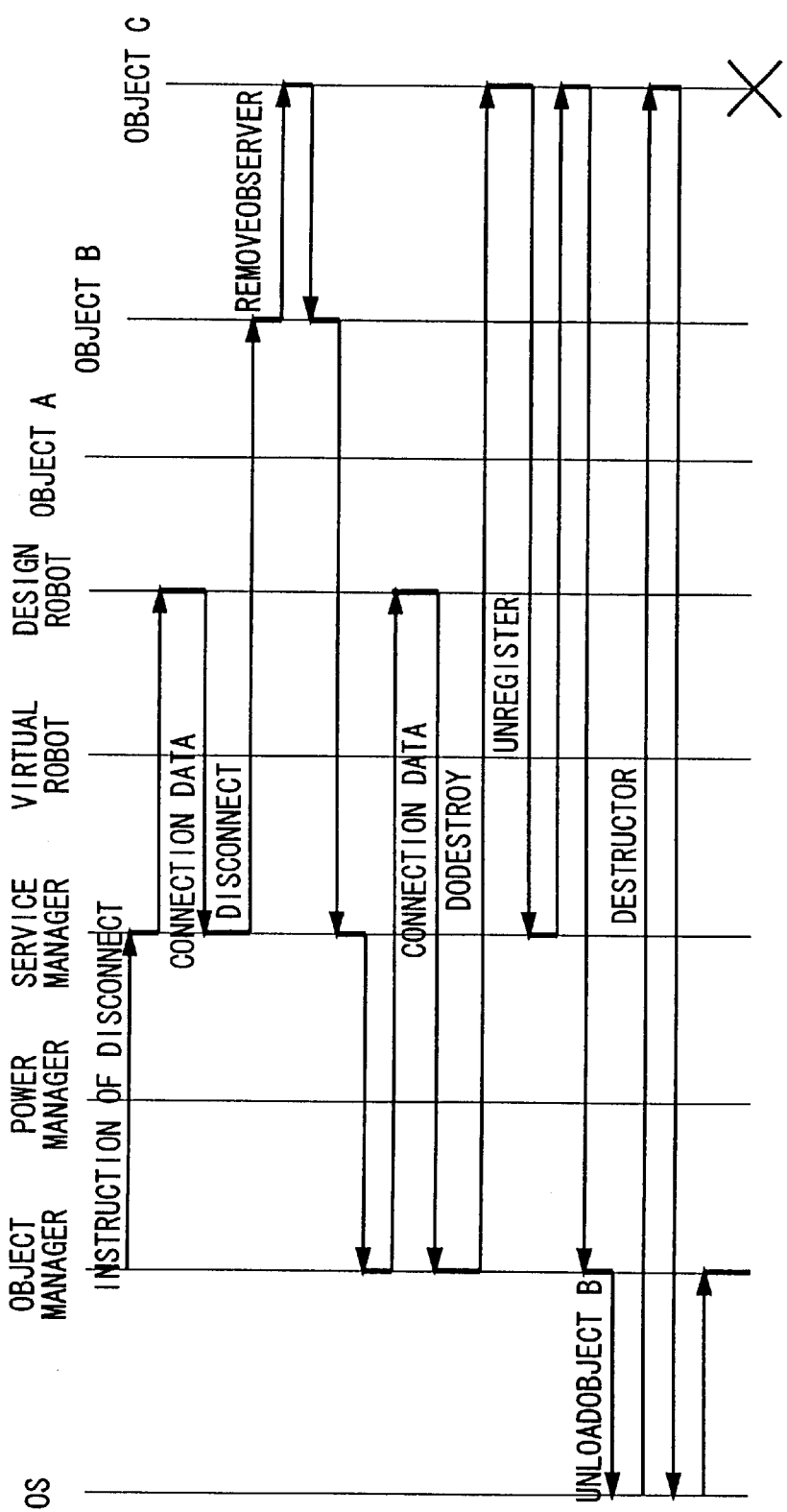
FIG. 42 is a time chart showing the continued processing of FIG. 39.

FIG. 39 is a time chart showing the sequence at the time of configuration change by PlugIn and Plugout in comparison with FIG. 18. As shown in FIG. 40, when the robot is informed of the change of configuration by the virtual robot, conducts a series of sequence. According to this notice the object manager sends out DoStop to each object (objects A~C in FIG. 39) positioned on the upper rank of the robotic system software successively as shown in FIG. 41 and stops the operation of these objects. Furthermore, the object manager transmits DoStop successively to the design robot, virtual robot service manager and the power manager in the reverse order to the starting time and controls the operation of these objects. Here, in each object forming the robotic system software, the processing related to the upper rank object will be stopped by DoStop, and the processing between objects forming the robotic system software such as the electric source management will be continued.

With this arrangement, when the processings of DoStop on all objects are completed, the object manager sends out DoStart successively to the power manager, service manager, virtual robot and the design robot forming the robotic system software in the same order as the starting time. And thus, the object manager instructs operations of the power manager, service manager, etc.

At this point, the design robot obtains CPC connection information from the virtual robot as in the case of FIG. 27 described above and forms connection data from this CPC connection information. In this connection, in the object manager, it is considered that DoStart would be instructed after the fixed period of time has elapsed after DoStop so that the connection data can be obtained after the completion of configuration change by the user.

Figure 43:
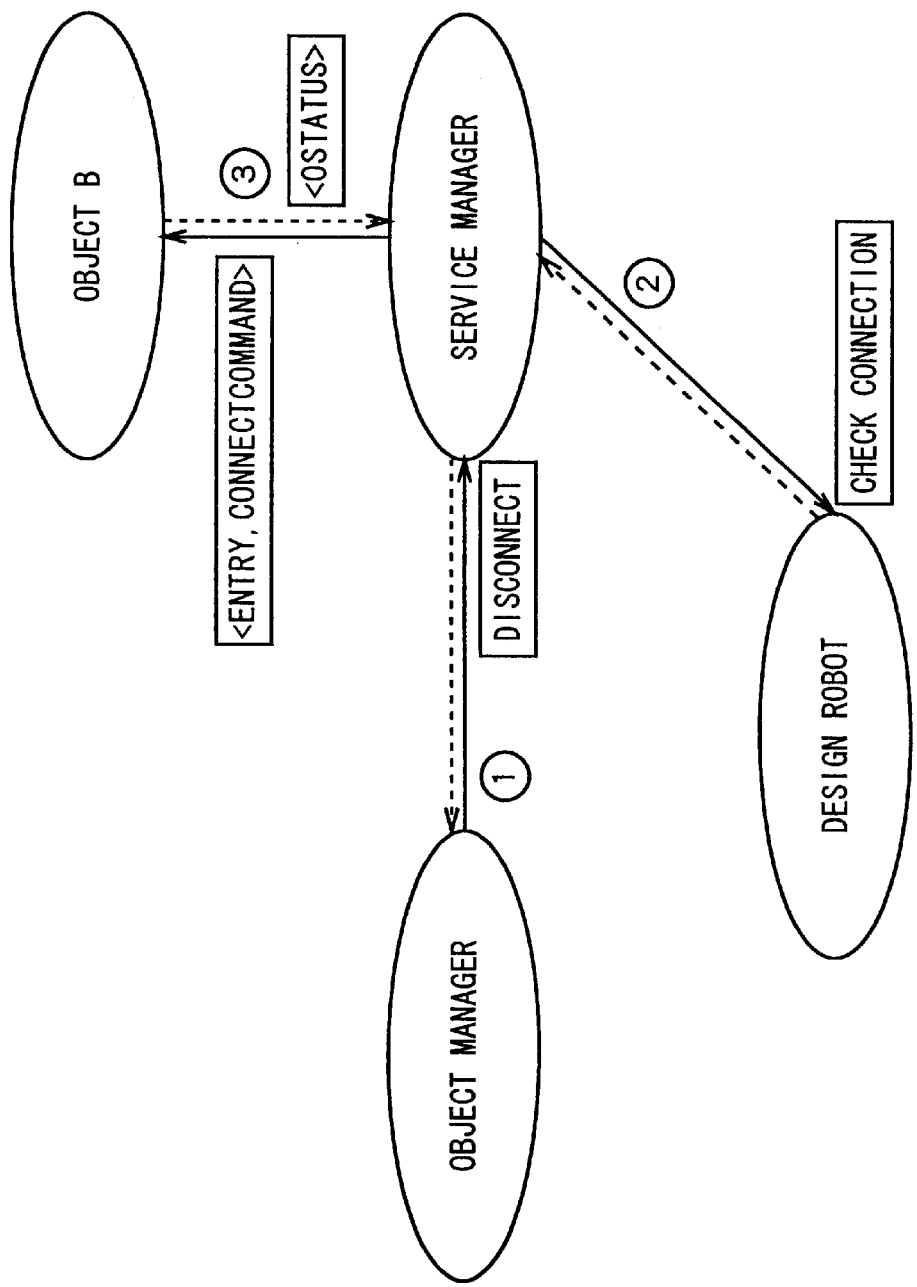
FIG. 43 is a schematic diagram showing Disconnect of objects in the processing of FIG. 42.

Thus, when the reply is obtained from the power manager by transmitting DoStart, the object manager instructs DisConnect to the service manager. In the case where the configuration is changed, since the object currently loaded and the object corresponding to the change of configuration differ, the service manager obtains the connection data relating to the configuration changed by the design robot as shown in FIG. 43 by Check Connection. Furthermore, the service manager forms disconnection data from the connection data obtained as described above in FIG. 34 and removes the connection of corresponding objects according to this disconnection data.

Figure 44:
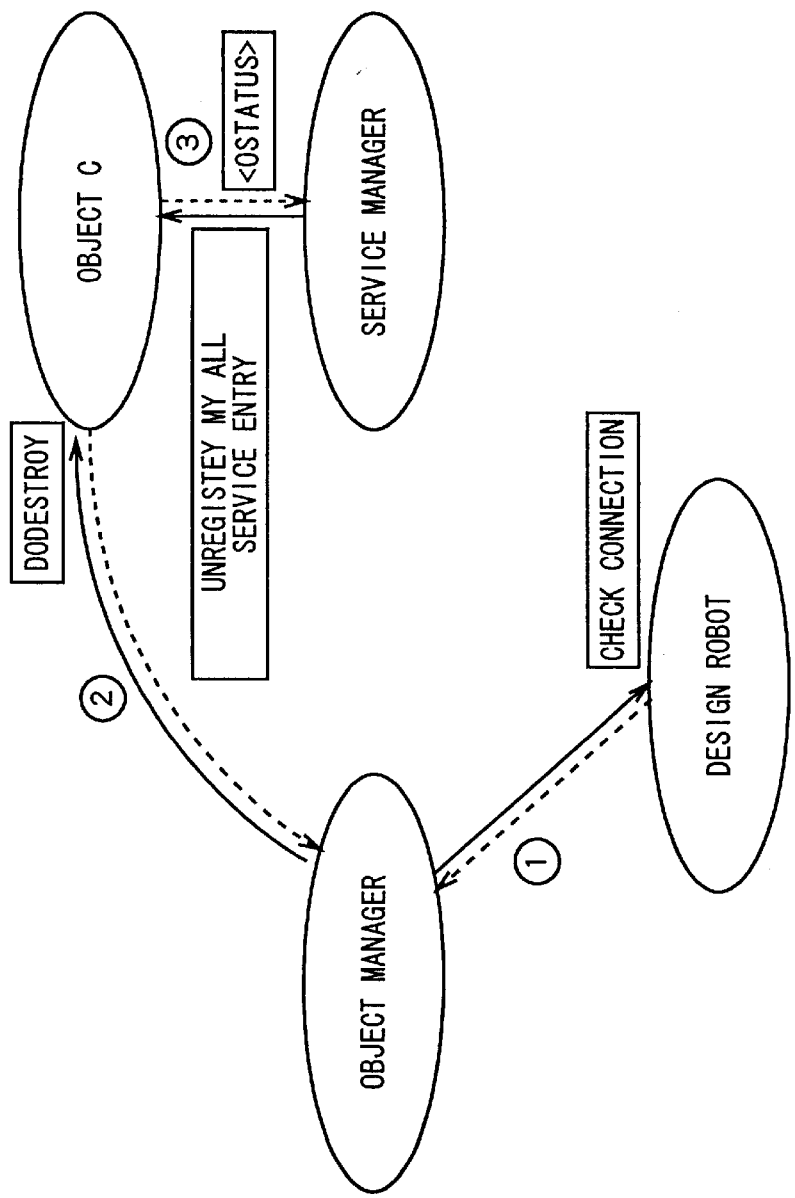
FIG. 44 is a schematic diagram showing the continued processing of FIG. 43.
Figure 45:
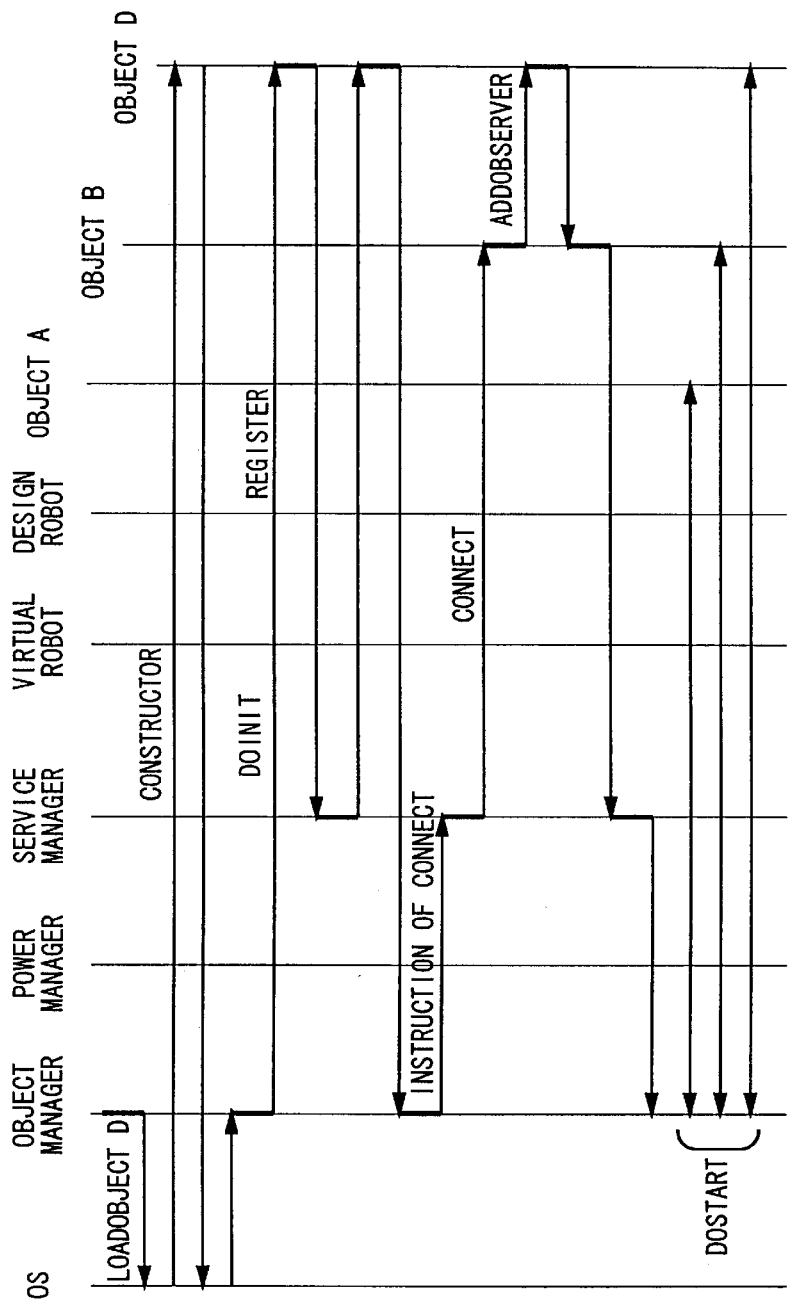
FIG. 45 is a time chart showing the continued processing of FIG. 42.
Figure 46:
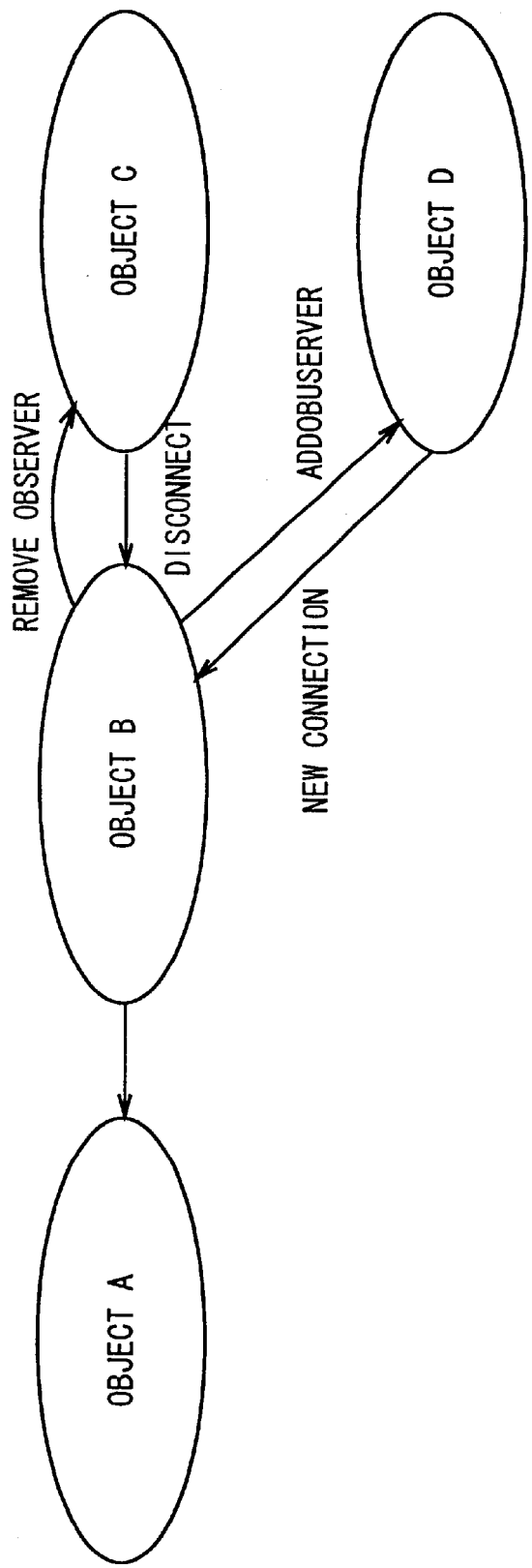
FIG. 46 is a schematic diagram showing the change of object relating to the change of configuration.

Accordingly, when the disconnection is complete, the service manager notifies the completion of processing to the object manager. And similarly, the object manager obtains the connection data from the design robot as shown in FIG. 44. Moreover, the object manager calls DoDestroy to the corresponding object based on the connection data thus obtained and releases the memory occupied by the corresponding object.

Furthermore, the object manager instructs the unloading of this object. The service manager cuts off the connection between objects so that the object that becomes unnecessary due to the change of configuration according to a series of processings is no longer able to communicate between objects, while the object manager unloads the object thus become unnecessary.

Figure 37:
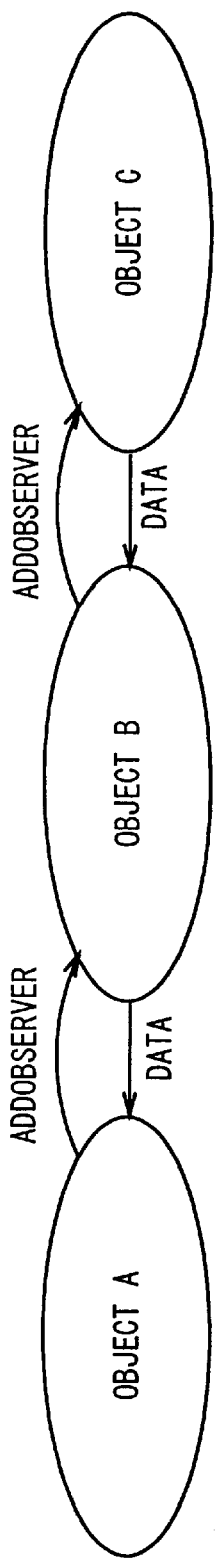
FIG. 37 is a schematic diagram showing the connection of each object comparing with FIG. 28.
Figure 47:
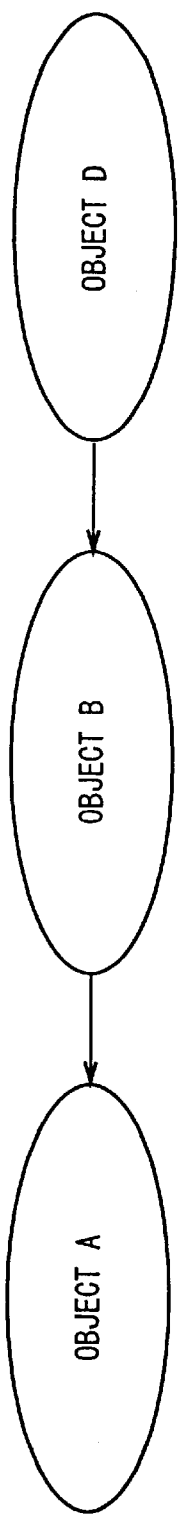
FIG. 47 is a schematic diagram showing the relation of each object after the change of configuration.

Thus, when the object manager unloads the object that become unnecessary, after instructing the loading of the object that newly becomes necessary, the object manager instructs DoInit to this object loaded. Next, the object manager instructs the connection between objects to the service manager. And the object manager notifies the connection data so that the data communication becomes possible as in the case of starting time between the corresponding objects based on the connection data explained in FIG. 34. Thus, objects are connected so that data communication is possible, the object manager transmits DoStart to each object and terminates a series of processings. According to a series of processings the object D is registered in place of the object C as shown the relation of objects A D in FIG. 4 in comparison with FIG. 37, and these objects A, B, D start the operation as shown in FIG. 47.

Figure 48:
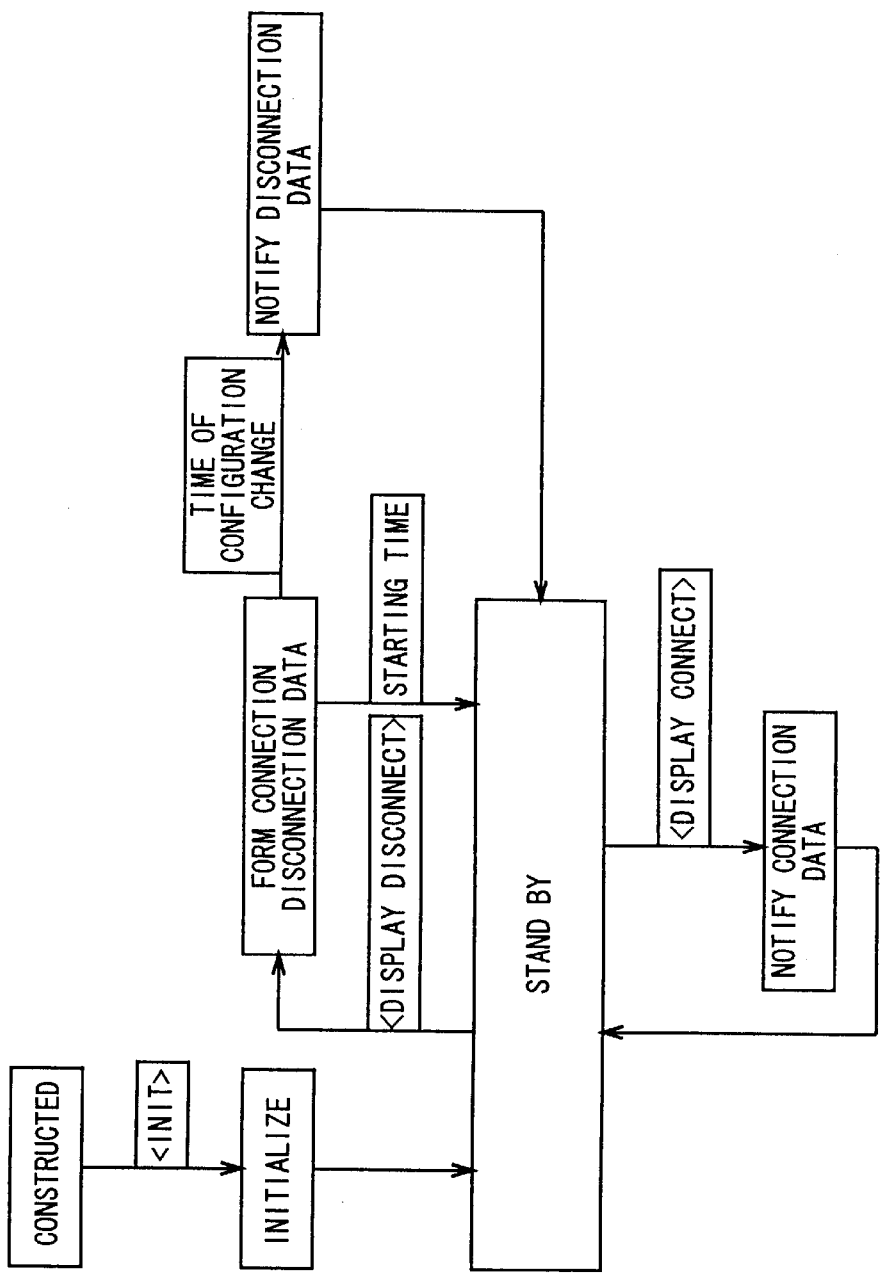
FIG. 48 is a schematic diagram showing the processing of service manager.

FIG. 48 is a condition transitional diagram showing a series of processings of the service manager relating to the time of configuration change when starting. More specifically, the service manager, after being initialized, stands by, and forms the disconnection data and connection data by the instruction from the object manager, and when starting, it connects each object according to the connection data. Moreover, when configuration is changed, after disconnecting the connection of the corresponding objects by the disconnection data, the service manager connects each object by the connection data.

Each object thus connected so that data communication is possible, copying the local data existing in the memory area of the subject side to the memory area of the observer side, or using the common memory between the subject and the observer, conducts the data communication.

Figure 49:
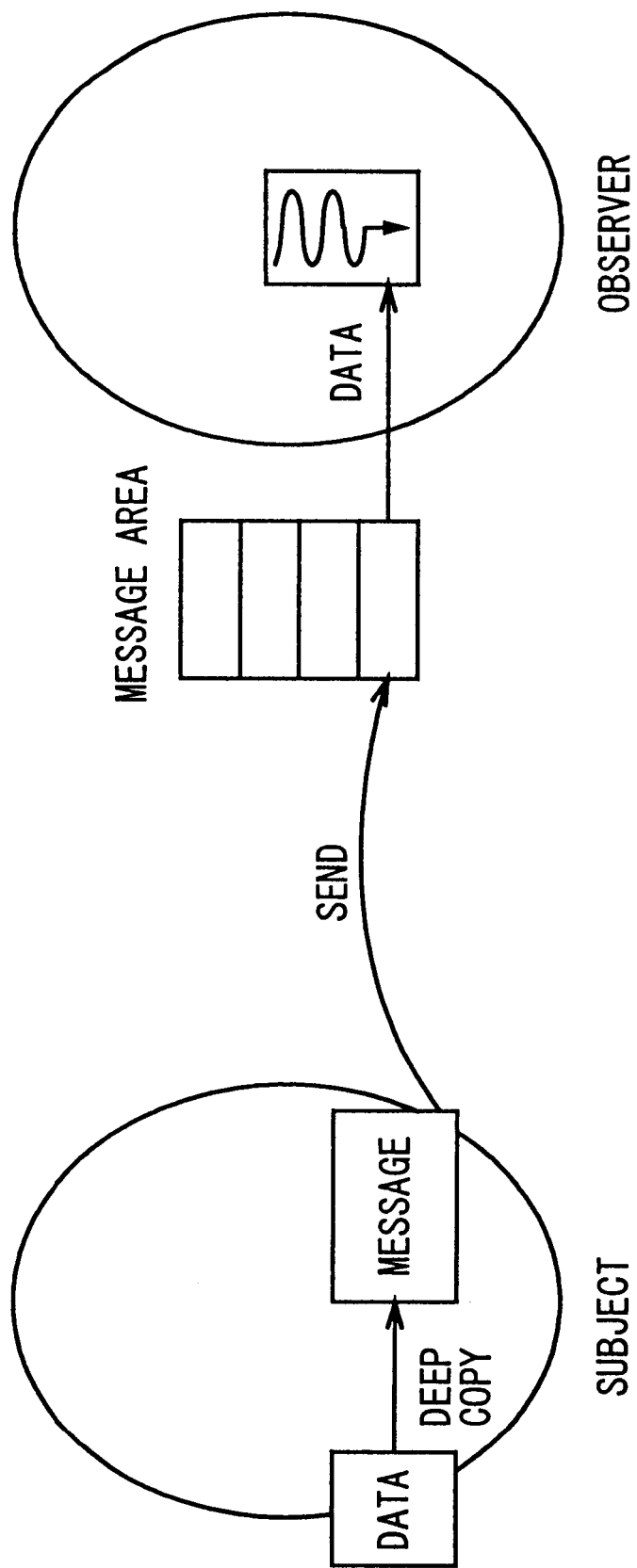
FIG. 49 is a schematic diagram illustrating the communication between objects by copy.

FIG. 49 is a schematic diagram showing the data communication by copying. The subject copies the local data existing in the memory area to the memory area of the observer side, and informs the head address of the copying addressee to the method to be invoked in the observer side. Thus, in the robot, when the data volume is small and the communicating partners are small, data communications can be conducted simply and easily.

Figure 50:
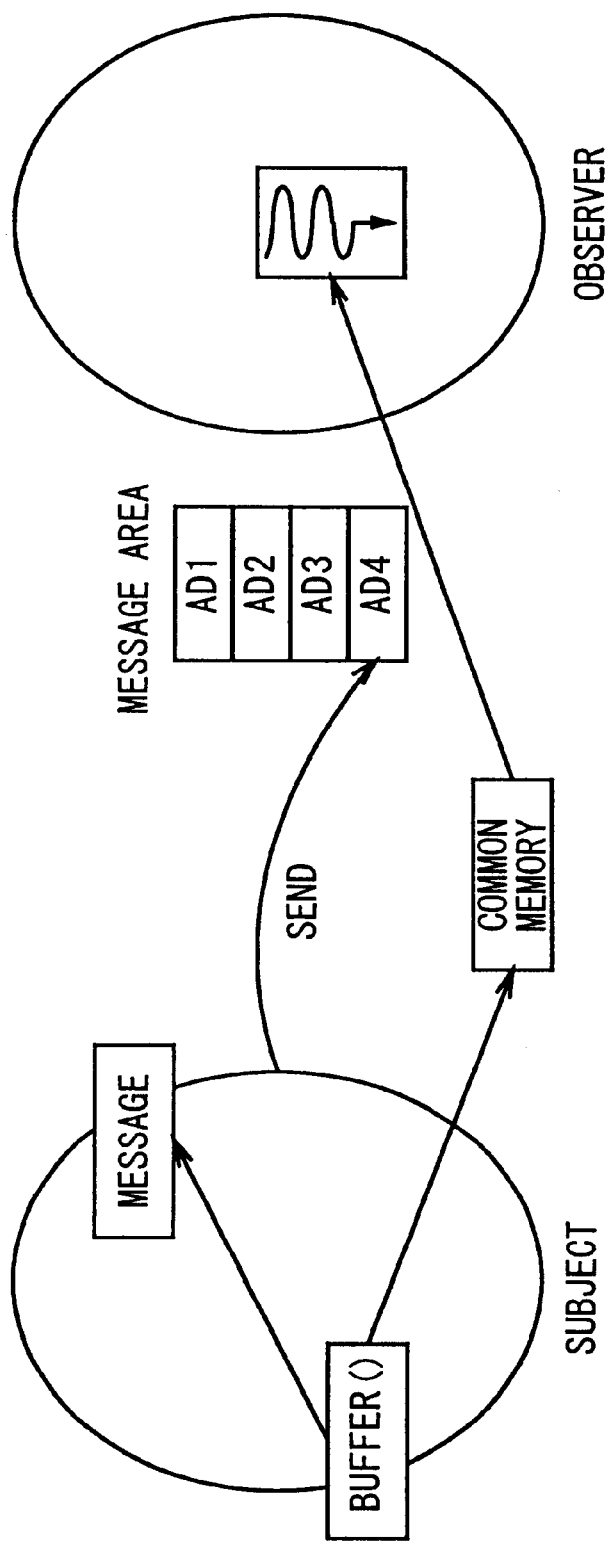
FIG. 50 is a schematic diagram illustrating the communication between objects by the common memory.

On the other hand, FIG. 50 is a schematic diagram showing the data communication using the common memory. The subject writes data in the common memory mapped in the memory area and transmits the address of this common memory to the observer as a message. The observer uses the common memory area after mapping this common memory area to the individual memory area by this informed address. Thus, in the robot, in the case of transmitting a large quantity of data such as image data and audio data, it can be applied to the case of having a large number of communicating destinations, and data can be communicated with ease and certainly.

Figure 51:
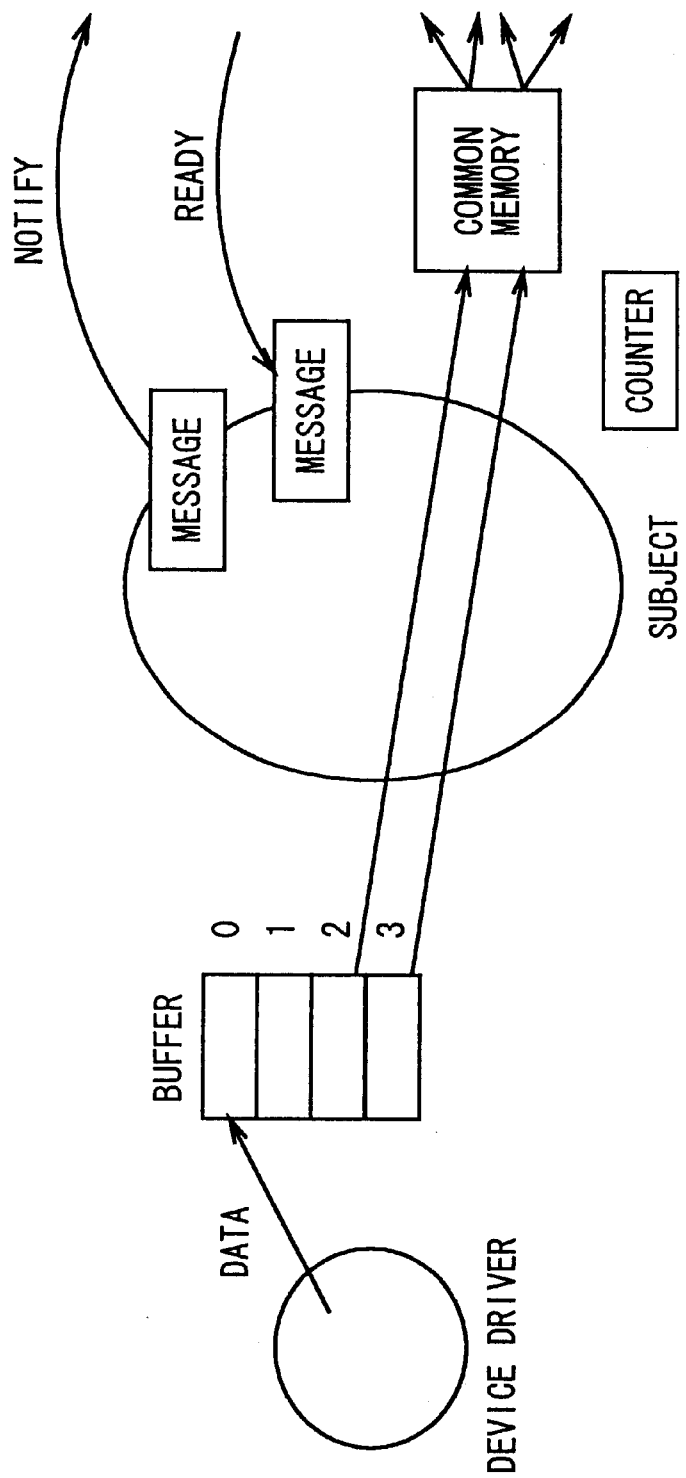
FIG. 51 is a schematic diagram illustrating the common memory monitoring.

Accordingly, in the case of data communicating by the common memory, the number of objects to which the data are delivered can be counted in the object. More specifically, as shown in FIG. 51, in the object in which data can be rewritable, when the data is written in the common memory, the count value of the corresponding counter is set to the value 1. This data rewritable object is the object having the subject that delivered data as a member.

The subject increments the count by the number executed Notify and the object returns the ID in the area used up already in the case of Ready. When the subject receives Ready, increments the counter value of the corresponding common memory by 1.

Thus, this data rewritable object can judge whether the common memory accessing by the other object has been completed or not according to this count value, and as a result, the common memory can be rewritten and data can be protected certainly.

Figure 52:
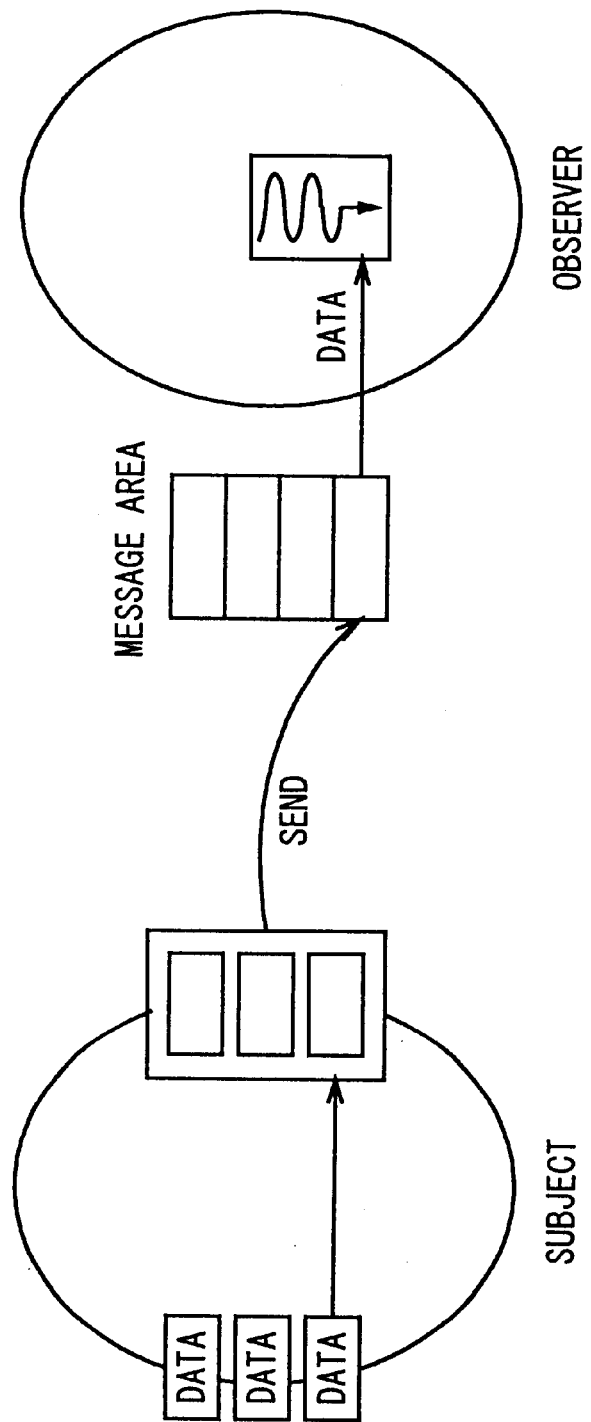
FIG. 52 is a schematic diagram illustrating the data communication in which multiple data are compiled.

Accordingly, in the case of data communicating by copy or common memory, as shown in FIG. 52, in the robot, data to be used for data communication are successively copied in the memory area of the observer by the predetermined command or written in the common memory. And then, these multiple data are address informed so that these are obtainable at the observer by the predetermined command. Thus, in the robot multiple data can be distributed at once and accordingly, the usability can be improved.

According to the second embodiment, in the operating system to process the command such as DoInit by the Call command, the suitable software suited to the current configuration can be set simply and the independability of object can be improved as compared with the conventional device.

(5) Other Embodiments

The embodiment described above has dealt with the case of presetting the selector number such as DoInit. However, the present invention is not only limited to this but also the selector number can be set in various ways by starting the DoInitiaLize of each object by the connection data. Moreover, by starting the DoStart according to the registration of object to the object manager, the selector number may be set in various ways.

Furthermore, the embodiment described above has dealt with the case of constructing objects by the connection data only on the configuration-dependent software. However, the present invention is not only limited to this but also can widely apply to the case of constructing all softwares by the connection data and the case of constructing only device driver layer by the connection data.

Furthermore, the embodiment described above has dealt with the case of applying the preset invention to the robot which utilizes the observer pattern constituted by observer and subject. However, the present invention is not only limited to this but also can widely be applied to such as a sever-client system. In such a case, a client receives the connection data as data input and connects the data to a server, whereby the system can be constructed without requiring the server name to be described in the source code. Thus, the client and the server constitute objects, respectively.

Furthermore, the embodiment described above has dealt with the case of communicating data by Ready, Notify. However, the present invention is not only limited to this but also can widely apply to the communication between objects exchanging data by various methods.

According to the present invention described above, by changing the software corresponding to the configuration based on the comparison result of the information corresponding to the component detection result held in each configuration and the component detection result related to the current configuration, the software suited to the current configuration can be simply set. Moreover, based on the connection data objects can be connected so that data can be exchanged, the independence of object can be improved as compared in the past.

Industrial Applicability

The present invention is utilized for a pet-type robot and a sever-client system.

What is claimed is:

1. A robot having a configuration that is changeable by exchanging components thereof, said robot comprising:

component detection means for detecting the components attached and for outputting the component detection result;

information storing means for storing information corresponding to said component detection result in each configuration obtained by exchanging said components;

software changing means for changing software corresponding to the configuration based on the comparison result between said component detection result and the information stored in said information storing means; and control means for controlling the overall operations according to the software set by said software changing means.

2. A robot as defined in claim 1, wherein said software changing means changes software corresponding to said configuration by changing objects forming said software based on said comparison result.

3. A robot as defined in claim 1, wherein said software comprises:

configuration dependent software that is dependent on the change of said configuration; and configuration independent software that is not dependent on the change of said configuration; and said software changing means changes software corresponding to said configuration by changing said configuration-dependent software.

4. A robot as defined in claim 1, characterized by:

information corresponding to said component detection result is described by text data.

5. An arithmetic processing device for communicating data between objects, comprising:

an object manager for connecting said objects so that data can be exchanged; and connection data providing means for providing the connection data required for connecting said objects to said object manager.

6. An arithmetic processing device as defined in claim 5, wherein said connection data is information to specify objects to be connected and the format of data to be communicated.

7. An arithmetic processing device as defined in claim 5, wherein said connection data providing means provides the connection data after selecting the connection data from a file in which multiple connection data are recorded to said object manager.

8. An arithmetic processing device as defined in claim 5, wherein said object manager, after separating the connection between corresponding objects according to said connection data, changes software comprised of said objects by connecting said objects.

9. An arithmetic processing device as defined in claim 8, characterized by:

the change of said software is the shifting of electric power consumption mode.

10. An arithmetic processing device as defined in claim 5, characterized by:

said connection data is described by text data.

11. An object-to-object communication method for communicating data between objects, comprising:

connecting said objects so that data is exchanged based on connection data to be provided from a predetermined data providing means.

12. An object-to-object communication method as defined in claim 11, wherein said connection data is information to specify objects to be connected and the format of data to be communicated.

13. An object-to-object communication method as defined in claim 11, wherein said connection data is selected from a file in which multiple connection data are recorded and to be provided.

14. An object-to-object communication method as defined in claim 11, characterized by:

said software formed by said objects is changed by connecting said objects after separating the connection between the corresponding objects according to said connection data.

15. An object-to-object communication method as defined in claim 14, characterized by:

the change of said software is the shifting of electric power consumption mode.

16. An object-to-object communication method as defined in claim 1, characterized by:

said connection data is the description by text data.

17. A robot, comprising:

a robot configuration that is changeable by exchanging components thereof; and overall operations are controlled by the software comprised of objects by communicating data between objects; and comprising:

an object manager to connect said objects so that data can be exchanged; and connection data providing means for providing the connection data required for connecting said objects to said object manager.

18. A robot as defined in claim 17, wherein said connection data defines objects to be connected and the format of data to be communicated.

19. A robot as defined in claim 17, characterized by:

said connection data is selected from the file in which multiple connection data are recorded and to be provided.

20. A robot as defined in claim 17, characterized by:

said software is changed after separating the connection between the corresponding objects and by connecting said objects according to said connection data.

21. A robot as defined in claim 20, characterized by:

the change of said software is the shifting of electric power consumption mode.

22. A robot as defined in claim 20, comprising:

detection means for detecting said components; and characterized by:

said software is changed corresponding to said configuration since said connection data is provided according to the detection result of said detection means by said connection data providing means.

23. A robot as defined in claim 17, characterized by:

said connection data is the description by text data.

* * * * *